United States Patent
Böttcher et al.

(10) Patent No.: US 6,653,415 B1
(45) Date of Patent: Nov. 25, 2003

(54) METHOD FOR PRODUCING DEFINED LAYERS OR LAYER SYSTEMS

(76) Inventors: Henrik Böttcher, Am Kleinen Felde 20, 30167 Hannover (DE); Hellmuth Wurm, Alte Strasse 77, 79249 Merzhausen (DE); Manfred L. Hallensleben, Kirchweg 9, 79299 Wittnau (DE)

( * ) Notice: Subject to any disclaimer, the term of this patent is extended or adjusted under 35 U.S.C. 154(b) by 0 days.

(21) Appl. No.: 09/763,588

(22) PCT Filed: Aug. 17, 1999

(86) PCT No.: PCT/EP99/06009
§ 371 (c)(1), (2), (4) Date: Feb. 22, 2001

(87) PCT Pub. No.: WO00/11043
PCT Pub. Date: Mar. 2, 2000

(65) Prior Publication Data
(65)

(30) Foreign Application Priority Data

Aug. 22, 1998 (DE) ......................................... 198 38 241

(51) Int. Cl.⁷ .................................................. C08J 4/06
(52) U.S. Cl. .................. 526/135; 526/145; 526/146; 526/147; 525/242; 525/326.1; 428/402.22; 428/407; 428/496; 428/480; 428/482; 428/483; 428/500; 428/515

(58) Field of Search ............................ 525/242, 326.1, 525/327.3; 428/402.27, 407, 496; 526/135, 145, 146, 147

(56) References Cited

U.S. PATENT DOCUMENTS

| 5,328,956 A | * | 7/1994 | Hasebe et al. ............... 525/316 |
| 5,807,937 A | * | 9/1998 | Matyjaszewski et al. ... 526/135 |
| 6,417,283 B1 | * | 7/2002 | Ikeda et al. ............ 428/402.24 |

* cited by examiner

Primary Examiner—Tatyana Zalukaeva
(74) Attorney, Agent, or Firm—Pendorf & Cutliff

(57) ABSTRACT

The invention relates to a method for producing defined layers or layer systems made of polymers or oligomers on any solid surface and with a controlled structure, according to which the layers are chemically deposited on the solid surface by means of live/controlled free-radical polymerization. Said method comprises the following steps: a) bonding the compounds of the general formula (a) A—L—I to the solid surface via the active group A where A represents an active group, I is the initiating group for ATRP polymerization and L is the binding link between A and I; b) carrying out live/controlled free-radical polymerization by reacting the initiator group I with monomers, macromonomers or mixtures able to undergo free-radical polymerization, which produces the polymer layer on the solid surface. The invention also relates to solid surfaces with oligomer or polymer layers and initiators for carrying out the method.

7 Claims, 34 Drawing Sheets

METHOD FOR PRODUCING DEFINED LAYERS OR LAYER SYSTEMS

BACKGROUND OF THE INVENTION

1. Field of the Invention

The invention concerns a process for producing defined layers or layer systems of polymers or oligomers on any solid surface, with a controlled structure, wherein each layer is chemically deposited on the solid surface by means of a "living"/controlled radical reaction. The invention further concerns solid surfaces provided with oligomer or polymer layers, as well as various compounds with an anchor group as well as a group or functionality from which polymerization growth occurs according to the ATRP mechanism. These types of compounds are referred to in the following as initiators.

The present invention concerns a process based upon this mechanism of "living"/controlled radical reaction and polymerization for chemical modification of various solid surfaces. The solid substrate could be of any freely selected material, could be solid or porous, could be finely spread, could be of natural or synthetic origin, or exhibit a heterogeneous surface structure or heterogeneous surface composition. The physical-mechanical characteristics of the utilized solid substrate are not of consequence in the process, nor are hardness, ductility, deformability or surface roughness.

The term "surface" herein is not limited to the outer surface. in the conventional sense, where it is generally understood to mean the boundary between the solid and the gas or liquid environment. The present invention is equally applicable to internal surfaces of a porous material. Beyond this, when using the inventive surface modifying materials, the term "surface" is also intended to refer in general to various phase boundaries. Thus the surface could also be, for example, an interface between two different components of a composite material. Examples of this type include composites of a polymer matrix and an inorganic reinforcing agent, a polymer filled with a dyestuff, or a polymer-metal composite; generally also included are composites of a polymer matrix and a functional additive.

The surface characteristics of the solid substrate can be tailored by chemical modification to meet requirements. On the one hand, a desired quality can be imparted to the surface; on the other hand, the quality of the physical interactivity of the surface modified solid to other materials, the chemical reactivity, and the ability to form chemical bonds with other materials can be adjusted as required.

If layers or layer systems are applied to the surface, then in certain cases the characteristics of the original surface can be so changed, that the characteristics of the system as a whole will be influenced only by the coating. Thus it is possible, for example, to provide a composite material with mechanical stability by selecting a suitable carrier or backbone material, and on the other hand to adjust the desired mechanical, physical and/or chemical characteristics of the surface by using the layer system.

2. Description of the Related Art

In order to modify solid surfaces by application of polymers, various techniques could be employed. Processes are described in the literature, in which dissolved polymers are sprayed, spin-coated, dip-coated or applied according to the Langmuir-Blodgett-Technique (LB-films). The bonding of the polymers to the surface therewith almost exclusively is of an adhesive nature. The process parameters frequently are difficult to control when using these processes; in addition, particularly in the case of the Langmuir-Blodgett-Technique, this only can be employed on planar surfaces and substantially is limited to amphiphilic or rigid chain molecules.

Polymer molecules also can be bonded to the solid surface chemically, by forming a covalent chemical bond with the solid surface via mostly terminal groups of the polymer molecules ("grafting-to", for example via a condensation reaction). One disadvantage of this process is that the yield with this type of surface reaction, and therewith the graft density of the polymer molecules upon the surface, generally is not very high since previously bonded polymer molecules hinder the approach of subsequent molecules to the surface. Further, the process is limited to polymers with relatively low molar mass, since only with small molecules there is a sufficiently high probability that the functional group of the polymer molecule is within the reach of the bonding sites on the solid surface and thus a chemical reaction between the two would be possible.

In order to circumvent the disadvantages associated with "grafting-to"-processes, in accordance with further developed processes the polymer reaction for forming the polymers is initiated or triggered directly on the solid surface ("grafting-from") [J. Rühe, "Massgeschneiderte Oberflächen", Nachr. Chem. Tech. Lab. 42 (1994) 1237]. Therein, in the state of the art for polymerization reactions beginning with solid materials, the classical radical grafting reaction is generally described: for initiating the radical polymerization reaction conventional initiators are employed, that is, azo compounds, peroxide, among others. If one attaches this type of initiator covalently to the solid surface in order to thereby initiate the grafting reaction, this is associated with the following disadvantage: in symmetrical initiators such as for example azo-bis-isobutyro-nitrile (AiBN) or benzoyl peroxide (BPO) there is, after decomposition, one fragment covalently bonded to the solid as initiating radical, the second radical fragment remains unbound and can for its part initiate a polymerization reaction, which however does not occur on the solid surface, but rather unbound. In a polymerization solution with the above mentioned covalent initiators there is thus formed, besides the bound polymer, always also non-bound polymer.

This situation has lead thereto, that an alternative path has been sought using asymmetric initiators in which, after decomposition, the unbound radical fragment has essentially no reaction initiating effect. This is described in detail for example in the writings of Rühe et al. [O. Prucker, J. Rühe, Macromolecules 31, 592 (1998); O. Prucker, J. Rühe, Macromolecules 31, 602 (1998)].

In addition to this, all until now conventionally initiated radical polymerization reactions are subjected to the classical kinetics of radical polymerization, that is, the graft branch length and the termination reactions can only be insufficiently controlled and the chain length is subjected to the typical chain length distribution of classical radical polymerization [s. Bruno Vollmert, Grundriss der Makromolekularen Chemie, Bd. I, E. Vollmert-Verlag, Karlsruhe, 1979]. Further, the chain ends of the graft branches are no longer reactive after the polymerization reaction, so that for example an additional polymerization for a second generation of polymer is not possible.

This disadvantage of radical polymerization was overcome in large part recently by a new process. If a radical polymerization reaction is carried out using a "living"/ controlled radical mechanism, then defined polymers can be produced, of which the chain length and polydispersity can be controlled substantially better than in the case of classical radical polymerization. Since the number of the chain terminations in this process is strongly reduced, the term "stable free radical polymerization" (SFRP) is also employed. This process experienced a further refinement, as taught by K. Matyjaszewski et al., by the introduction of the concept of the "atom transfer radical polymerization" (ATRP) [K. Matyjaszewski, S. Coca, S. Gaynor, Y. Nakagawa, S. M. Jo, "Preparation of Novel Homo- and Copolymers using Atom Transfer Radical Polymerization", WO 98/01480]. "Living"/controlled radical polymerizations, also in their refinement according to the ATRP-mechanism, have until now only been carried out in the liquid phase, with or without supplemental solvent.

Craig J. Hawker et al. describe in ACS Polym. Preprints [Div. Polym. Chem. (39), 626 (1998)] the synthesis and application of polymers with utilization of "living" radical polymerization reactions. As initiators for the radical polymerization, compounds are employed which contain a nitroxide group. These compounds generally exhibit terminal trichlorosilyl groups which can be bound to surfaces of silica gel and silica wafers by chemical reaction.

Tsujii et al. in Macromolecules 1998, 31, 5934 describe controlled graft polymerization of methyl methacrylate on silicon oxide containing substrates by the combined use of the Langmuir-Blodgett-(LB)-Technique and the ATRP Technique (Atom Transfer Radical Polymerization). As initiator compound 2-(4-chlorosulfonylphenyl)-ethyltrimethoxysilane is used. This compound possesses a chlorosulfonyl group as initiator group for the "living"/controlled polymerization. After depositing a monolayer of the above mentioned initiator, which had been compressed on a water/air interface by means of LB-Technique, on a silicon wafer, the "living"/controlled radical polymerization of methyl methacrylate is carried out on this modified surface.

These processes according to the state of the art exhibit the following disadvantages: In the "stable free radical polymerization" SFRP with use of nitroxides it often occurs that, due to the necessarily high temperatures of 120 to 130° C., frequently simultaneously thermal polymerization reactions proceed, which do not initiate at the surface. Therewith substantial disadvantages are associated with the process for the "living"/controlled radical grafting of solid surfaces, namely a) the production of unbound polymer consumes monomer, b) the growing bonded as well unbonded polymer chains compete for nitroxide and influence therewith the control of the growing chains, c) unbonded polymer is present as reaction product, besides the polymer modified solid surface.

According to the publication of Tsujii et al., 2-(4-chlorosulfonylphenyl)-ethyltrimethoxysilane is employed as initiator compound. Chlorosulfonylphenyl groups are known to be highly reactive and in particular sensitive to hydrolysis, so that they are difficult to work with. Compounds which exhibit such groups, including the therewith modified surface, are unstable.

Further the LB-method described in this publication can only be applied to planar substrate surfaces, and this on limited surface areas and not, however, on solid surfaces of any size, shape and composition, as well as not on materials with open pores on their surfaces. The density of the molecules on the layer can only be incompletely influenced. The testing of the degree of polymerization of the grafted-on polymer molecules is only carried out indirectly, the grafted-on polymer molecules themselves are not involved therein. Further, it is not achieved that the chain ends are capable of further initiation.

SUMMARY OF THE INVENTION

This technical task is solved by a process for production of defined layers or layer systems of polymers or oligomers with controlled structure on any solid surface, wherein the layers are deposited chemically on the solid surface by means of "living"/controlled radical reactions, by the following steps:

a) bonding compounds of the general formula

A—L—I          (1)

to the solid surface via the anchor group A, where A represents an anchor group, I is the initiating group for ATRP polymerization, and L is the linkage between A and I.

b) carrying out "living"/controlled free radical polymerization according to the ATRP-mechanism by reacting the initiator group I bound to the solid surface with monomers, macromonomers or mixtures able to undergo free radical polymerization, which produces the polymer layer on the solid surface.

The invention concerns a process which employs "living"/controlled radical polymerization for simultaneous and defined chemical modification of any solid surfaces. Therein oligomer or, as the case may be, polymer molecules are formed directly on the solid surface via a "living"/controlled radical polymerization reaction. According to the state of the art, prior to the development of the present invention radical polymerization reactions initiated from solid surfaces were not controllable, or could only be controlled with difficulty, with respect to the chain length of the growing polymer chains. According to the invention, now radical reactions, which begin with appropriately chemically modified solid surfaces, can be carried out without termination, that is they can be controlled in a targeted manner. Therewith the graft branch length can be tailored with simultaneously maintaining a narrow chain length distribution; likewise it becomes easily possible to produce block copolymers as graft moieties.

The advantage of this inventive process is comprised therein, that the method of the "living"/controlled radical polymerization can be employed upon any solid surface by using initiator groups which are easy to use and widely employable due to their stability, and which have the characteristic of making it possible to use the "living"/controlled radical polymerization according to the ATRP-mechanism at temperatures below 120° C., without however simultaneously suffering from thermal polymerization.

DETAILED DESCRIPTION OF THE INVENTION

Figure 1:
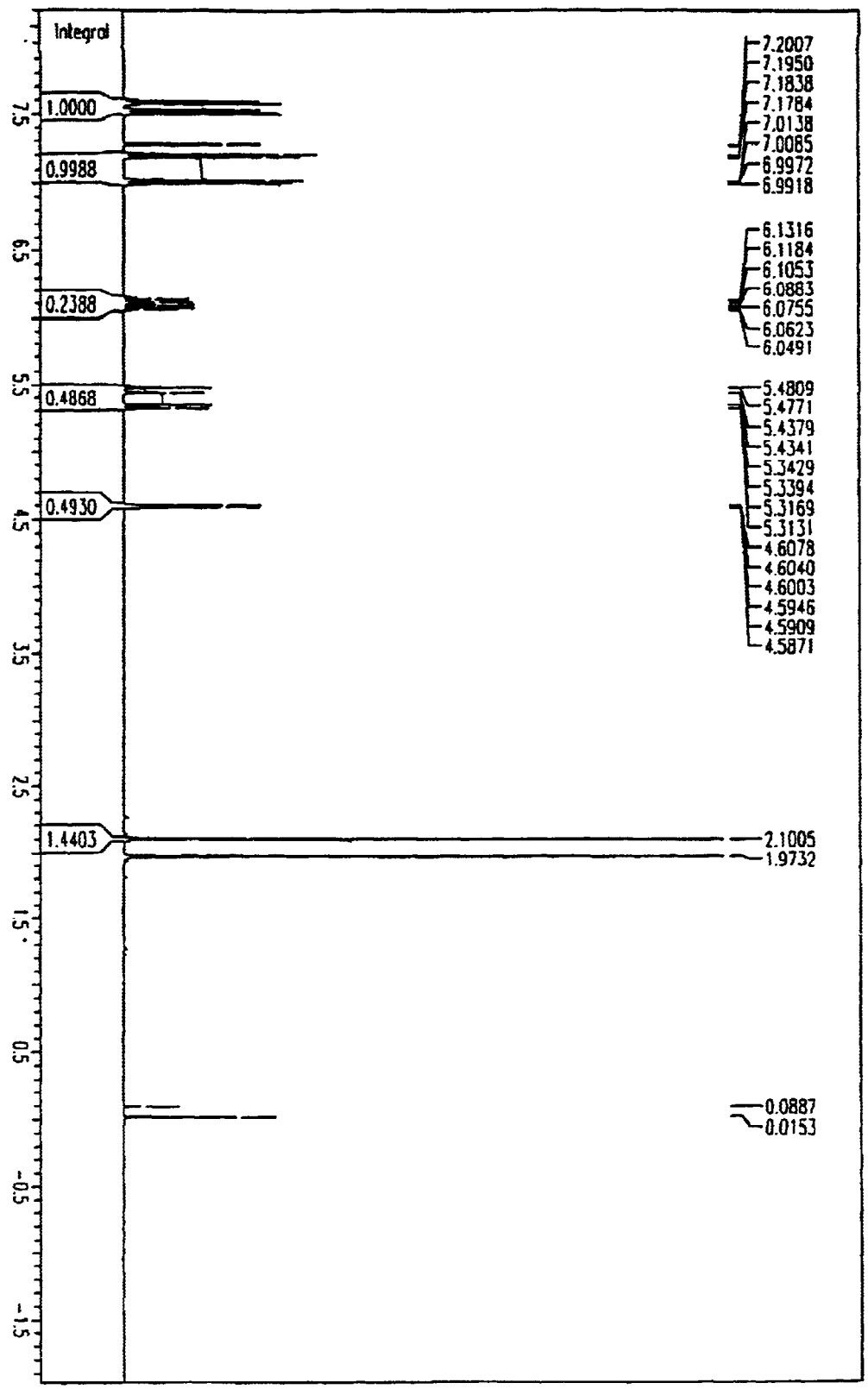
FIG. 1 shows the $^1$H-NMR-spectrum of compound (31).

The solid substrate can be comprised of any material, could be solid or in porous form, could be in finely divided form, could be of natural or synthetic origin, or could exhibit a heterogeneous surface structure or heterogeneous surface composition. The only precondition is that the employed solid already exhibits chemical characteristics on its surface or that chemical characteristics can be imparted to it, which permit the bonding of chemical compounds via primary valency bonds; herein the term "primary valency bond" is to be understood as including the entire spectrum of chemical bonds included within the three categories of covalent, ionic and mechanical bonds as well as transitions between the three categories. Solid substrates which already inherently have the necessary chemical composition for bonding of chemical compounds have on their surface, for example, hydroxyl groups. On the other hand it is known that surfaces of nonpolar materials such as, for example, poly(propylene) or poly(tetrafluoroethylene) can without difficulty be coated or surface modified with reaction participating groups, such as hydroxyl groups, for example by plasma treatment.

Besides hydroxyl groups, examples of further functional groups which are capable on a substrate surface to form primary valency bonds to initiators, which can be applied to the surface, include —O—, —SH, —S—, —S—S—, -halogen, —$NH_2$, —NHR, —$NR_2$, —$NH_3^+$, —$NH_2R^{30}$, —$NHR_2^+$, —$NO_2$, —$NO_3^-$, —C≡N, —CO—, —CRH—CO—, —COOH, —$COO^-$, —COCl, —CO—O—, —CO—NH—, —$SO_3^-$, —$SO_2Cl$, —$PO_3^-$, —$PO_2Cl$, —CO—S—, —CS—O—, —C≡C—, —C=C—, aryl. Therein the substituent R can respectively be selected independently from the group: H, alkyl, preferably methyl through propyl, aryl, also substituted, preferably phenyl, also mixed alkyl and aryl. Reactive substrate surfaces can in suitable manner be chemically modified by the inventive process.

This modification of substrate surfaces is inventively carried out by the following steps:

On a substrate surface to be chemically modified, which is sufficiently reactive to form primary valency bonds to chemical compounds via chemical reactions (see above), there are bound the chemical compounds which in the following are referred to as initiators of general Formula (1) A—L—I. The initiator group I which is present as a component of A—L—I, and from which the polymer growth proceeds according to the ATRP-mechanism, corresponds to C-Z' according to Formula III of the Patent WO 98/01480 from K. Matyjaszewski et al. The selection of the initiator group depends upon the desired reaction conditions and the monomer to be polymerized.

In the compounds of general Formula (1) at least one anchor group A, as defined in greater detail below, must be present, which is in condition to bond the compound (1) to the surface in the manner of a chemical primary valency bond by reacting with the functional groups or functionalities situated on the substrate surface. This bond must be stable under the conditions of the respective predetermined reaction conditions for the "living"/controlled radical polymerization.

Further, the bond formation must itself proceed under reaction conditions under which, depending upon the respective initiator group I, from which the polymer growth occurs according to the ATRP-mechanism, this is stable.

For the carrying out of the bonding of the compounds of general Formula (1) A—L—I to the substrate surface, reaction types come into consideration through which the linkages can be newly connected. Whether a solvent is necessary, and if so, which solvent is to be employed, depends upon the respective reactants. Further, the selection of process chemicals depends upon the respective reaction type with which the linkage of the initiator to the substrate surface is carried out.

These preconditions necessary for the suitability or candidacy of the reactive group can be satisfied by a wide range of groups or as the case may be structural elements. For example the following functional groups could be mentioned:

| Anchor Group A in A—L—I of the general Formula (1) |
| --- |
| A = |
| OH |
| Halogen |
| $SiR^3{}_yR^4{}_zX_{3-(y+z)}$*) |
| CR=CR**) |
| CR=CR$_2$ |
| C≡CR |
| CRO |
| COOR |
| COO$^-$ |
| COCl (Br) |
| CO—O—CO—R |
| CH(OH)(OR) |
| C(OR)$_3$ |
| CO—CH=CR$_2$ |
| CO—NR$_2$ |
| C≡N |
| NH—C≡N |
| NH$_2$ |
| NHR |
| NR$_2$ |
| NH$_3{}^+$ |
| NH$_2$R$^+$ |
| NHR$_2{}^+$ |
| NH—COOR |
| C(NR)—CH=CR$_2$ |
| NR—NR$_2$ |
| NR—OH |
| NH—C(NR)—NH$_2$ |
| CO—NR—NR$_2$ |
| CH=CR—NR$_2$ |
| CO—N=C=S |
| N=C=O |
| N=C=S |
| O—C≡N |
| S—C≡N |
| NO$_3{}^-$ |
| N$^+$≡N |
| N=P(Phenyl)$_3$ |
| CH=P(Phenyl)$_3$ |
| PO$_3{}^-$ |
| O—PO$_2$Cl |
| PO$_2$Cl |
| COSR |
| CSOR |
| CS—NR$_2$ |
| CSSR |
| SH |
| SO$_3$R |
| SO$_2$R |
| SOR |
| SO$_3$Cl |
| SO$_3{}^-$ |
| SO$_2$Cl |
| SOCl |
|  |

| Anchor Group A in A—L—I of the general Formula (1) |
| --- |
| A = |
| 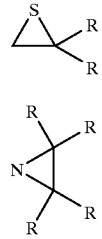 |

*) X = halogen, OR$^6$, NH$_2$, with R$^6$ as well as R$^3$ and R$^4$ = alkyl, also branched, preferably methyl, ethyl, also unsaturated, also cycloalkyl, preferably cyclohexyl, also substituted, aryl, preferably phenyl, also substituted, (y + z) ≦ 2

**) R = a substituent, respectively independently selected from the group: H, alkyl, preferably methyl through propyl, aryl, also substituted, preferably phenyl, also mixed alkyl and aryl; applies for all R in this table, which bear no superscript.

Further the anchor group A can be a metallic residue M, with which A—L becomes a group in the sense of a metalorganic reagent M—L. In chemically useful manner with respect to L, as well as directed to the type of the functional groups on the substrate surface, via which the reaction with the anchor group A=M is to be carried out, M is so selected that, with the reaction partners M—L and the functional groups on the substrate surface, cross-coupling can occur. M—L can therewith be metalorganic groups with lithium (Murahashi), sodium, magnesium (Grignard, Kumada-Tameo, Corriu), boron (Suzuki-Miyaura), aluminum (Nozaki-Oshima, Negishi), zirconium (Negishi), zinc (Negishi, Normant) cooper or copper-lithium or copper-zinc (Normant, Sonogashira), tin (Migita-Kosugi, Stille), silicon (also variance of Hiyama), mercury, cadmium and silver. For carrying out the cross-coupling it is further necessary to employ a suitable catalyst, as well as to match the characteristics of the respective functional groups on the substrate surface to be a suitable leaving group as electrophilic reaction partner. Suitable catalysts, each depending upon metalorganic grouping M—L, include elemental metal or a compound (salt or complex) of the metals Pd(0), Pd(II), Ni(0), Ni(II), Pt(0), Cu(I), Co(II), Co(III), Fe(I), Fe(III), Mn(II). In certain cases mixtures of two catalysts could also be mentioned, or the addition of a co-catalyst (for example tin) or catalyst compounds, which include two metals, such as for example Li$_2$CuCl$_4$. Preferred are Pd- and Ni-catalysts.

With this type of cross-coupling C—C compounds can be linked, in which the C-atoms involved in the bonding are identically or differently hybridized. The reaction conditions to be met in the individual cases are set forth in the literature associated with the above indicated author names.

The structural element L present as component of A—L—I can be selected independently from the following list 1.–3.:

1. L is a structural element which in accordance with Formula III of Patent WO 98/01480 of K. Matyjaszewski et al. can have the there specified and in chemically useful manner, each independently from the other, selected group R$^{11}$, R$^{12}$, R$^{13}$, wherein at least one H or halogen corresponds to A in all three, preferably in two, particularly preferably however in one of the groups R$^{11}$, R$^{12}$, R$^{13}$ (note: only the group definition of R$^{11}$, $R^{12}$, $R^{13}$ correspond to those of the Patent WO 98/01480 of K. Matyjaszewski et al.). Besides this, at least one H or halogen in all three, only in two or also only in one of the groups $R^{11}$, $R^{12}$, $R^{13}$ can be I. Functional groups, which in Patent WO 98/01480 of K. Matyjaszewski et al. are contained within the variability of $R^{11}$, $R^{12}$, $R^{13}$, can here already exercise the function of anchor groups A or they can serve for introduction of A.

2. L is a structural element, in which all groups $R^{11}$, $R^{12}$, $R^{13}$ (according to Formula III) of Patent WO 98/01480 of K. Matyjaszewski et al.) or two of these groups or even only one group are replaced by
   a) oligo(oxyalkylene) with $C_1$ through $C_{20}$, also alternating $C_1$ and $C_2$ groups,
   b) oligo(ethyleneimine),
   c) oligosiloxanyl with $Si_1$, through $Si_{20}$, $SiR^1R^2$ with $R^1$ and $R^2$ being alkyl, preferably methyl, also aryl, preferably phenyl, also mixtures of alkyl and aryl,
   wherein in a) through c) at least one H, in c) at least H or also at least one aryl, in all three, preferably in two, most preferably however in one of the groups $R^{11}$, $R^{12}$, $R^{13}$ is the same as A. Besides this in a) through c) at least one H, or in c) at least one H or one aryl can in all three, only in two or also only in one of the groups $R^{11}$, $R^{12}$, $R^{13}$ can be a further I.

3. L is a structural element, in which in the groups $R^{11}$, $R^{12}$, $R^{13}$ (according to Formula III) of Patent WO 98/01480 of K. Matyjaszewski et al.) an optional contained group $R^5$, which goes beyond the specification in Patent WO 98/01480, is one of the following groups:
   a) oligo(oxyalkylene) with $C_1$ through $C_{20}$, also alternating $C^1$ and $C_2$ groups,
   b) oligo(ethyleneimine),
   c) oligosiloxanyl with $Si_1$ through $Si_{20}$, $SiR^1R^2$ with $R^1$ and $R^2$ being alkyl, preferably methyl, also aryl, preferably phenyl, also mixtures of alkyl and aryl,
   wherein in a) through c) at least one H, in c) at least H or also at least one aryl, in all three, preferably in two, most preferably however in one of the groups $R^{11}$, $R^{12}$, $R^{13}$ is the same as A. Besides this in a) through c) at least one H, or in c) at least one H or one aryl can in all three, only in two or also only in one of the groups $R^{11}$, $R^{12}$, $R^{13}$ can be a further I.

The appropriate selection of L offers, via the therein contained functional group, the possibility of the cleaving off or separating of the polymer layer from the substrate surface.

For the bonding to solid substrates, particularly to those which exhibit OH— groups, and particularly those, which exhibit Si—OH— groups, silyl compounds having the following Formula 2 have been found to work well $$X_{3-(y+z)}R^3{}_yR^4{}_zSi-L-I \qquad (2)$$

always with $(y+z) \leq 2$ wherein X=halogen, $OR^6$, $NH_2$ and $R^6$, $R^3$, $R^4$=alkyl, also branched, preferably methyl, ethyl, also unsaturated, also cycloalkyl, preferably cyclohexyl, also substituted, aryl, preferably phenyl, also substituted, further L=chemical bond or an inorganic or organic group within widely variable limits as defined above, further I=initiator group for the "living"/controlled radical polymerization according to the ATRP-mechanism, specified as above.

The initiator molecule can be bonded to the substrate surface (in this example a silicate surface and y=z=0) via the silyl anchor group A:

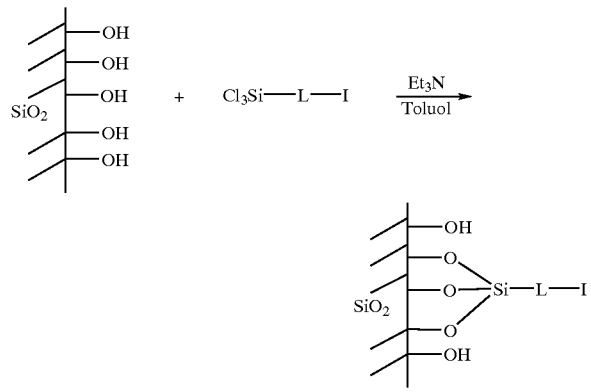

The silyl anchor group A is, depending on the number of the reactive groups, tri-, di-, or monofunctional. Preferably chlorine is employed as the halogen, since a large number of compounds exist and their price is reasonable. The selection of the solvent depends upon the reactants employed. With chlorine as halogen the reaction is preferably carried out in the presence of an ancillary base, for example triethylamine, and in a dry organic solvent.

Besides the above exemplary described coupling or connection of the solid substrate surface to the initiator, also possible are such couplings which can be formed by a sulfide, disulfide, ether, ester, thioester, sulfonate, amide, amine, C—C—, C—N-linkage or by interaction between counter ions. These linkages could also be produced through substitution, addition or condensation reactions. The therefore necessary reactions have long been known in the field of the organic synthesis, as are the preferred solvents and other process chemicals and process parameters.

For the coupling or linkage to solid substrates, especially to such, which exhibit OH— groups, carbonic acid derivatives of Formula (3) have been found effective. Therein L and I are specified as above.

$$Y-CO-L-I \qquad (3)$$

wherein Y=halogen, preferably chlorine, bromine, OH, $OR^7$, wherein $R^7$=alkyl, preferably methyl, ethyl, aryl, preferably phenyl, also substituted, aralkyl, preferably benzyl, acyl, aliphatic or aromatic, trialkylsilyl, preferably trimethylsilyl.

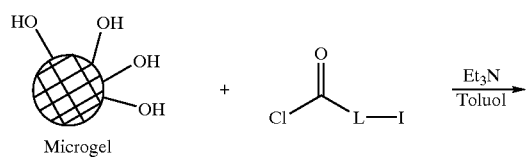

-continued

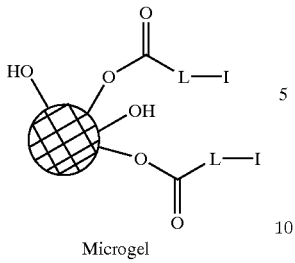

Microgel

For bonding or linking to semiprecious metals or noble metals, of which the solid substrate surface is not functionalized, thiol and disulfide anchor groups of the general Formulas (4) and (5) have been found effective.

HS—L—I  (4)

I—L—S—S—L—I  (5)

Therein L and I are specified as above.

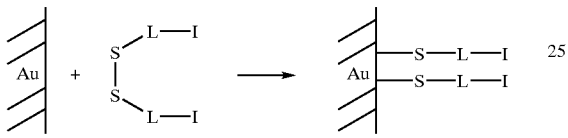

The above and hereafter mentioned initiators of type (1)–(6) can include in their structural element L, specified as above, a compound, for example an ester functionality, which under appropriate conditions can be cleaved. A cleavable linkage is preferably established on the substrate surface in view of the analysis of the formed polymer, when requirements are made of the molar mass, the distribution, and the number of the formed polymer chains.

As initiators, which are capable of initiating a "living"/controlled radical polymerization according to the ATRP-mechanism on substrate surfaces, there are employed compounds of the general formula

A—L—I  (1).

The components A, L and I contained in (1) are each independently selectable from the above provided specifications for A, L, and I.

An advantageous selection from the above specification for A in (1) are the initiator compounds of Formulas (2)–(6):

$X_{3-(y+z)}R^3_y R^4_z Si$—L—I  (2)

Y—CO—L—I  (3)

HS—L—I  (4)

I—L—S—S—L—I  (5)

=—L—I  (6)

Therein X, Y, $R^3$, $R^4$, L, I, y, z are specified as above.

Preferred among the L in (1) in the above specification is a chemical linkage; alkyl with $C_1$ through $C_{20}$, preferably $C_1$ through $C_8$; aryl, preferably phenyl, also substituted; aralkyl with the aryl component preferably phenyl and with the alkyl component $C_1$ through $C_{20}$;

or a structural element, in which as initiators compounds of Formulas (7) through (11) are produced:

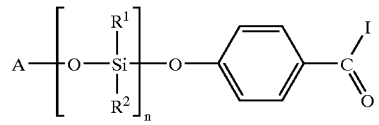

(7)

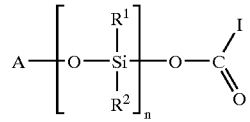

(8)

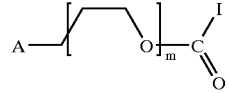

(9)

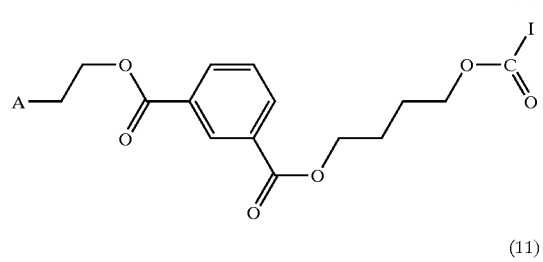

(10)

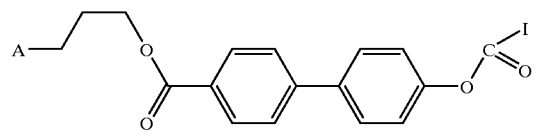

(11)

Therein $R^1$, $R^2$=alkyl, preferably methyl, also aryl, preferably phenyl, also mixtures of alkyl and aryl. Therein further n=1–20 and n=1 through 20. Further A and I are specified as above.

In selecting preferred I from the above specification in (1), there result for example as particularly preferred initiators compounds of the Formulas (12)–(28):

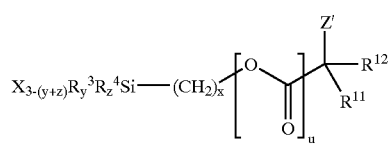

(12)

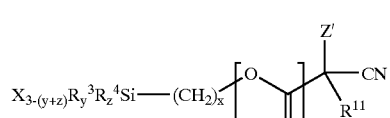

(13)

(14)

(15) 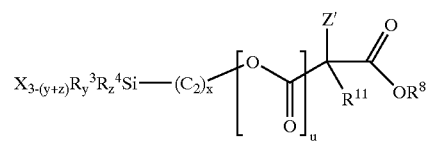

(16) 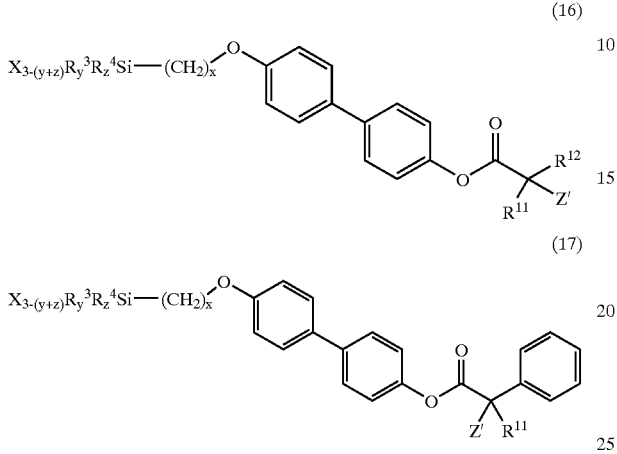

(17)

(18)

(19) 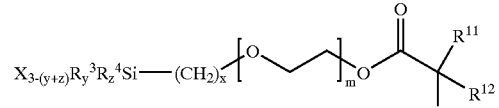

(20) 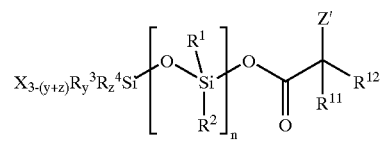

(21) 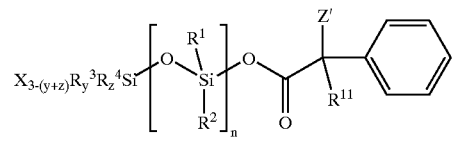

(22) 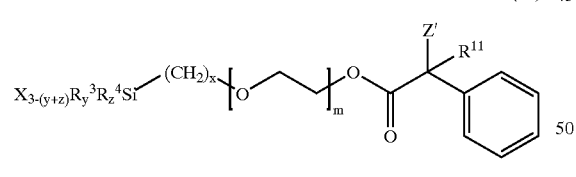

(23) 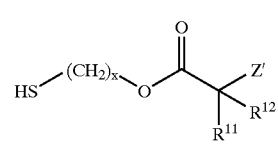

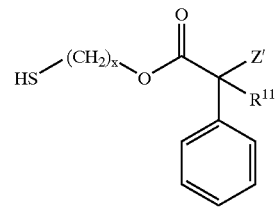

(24) 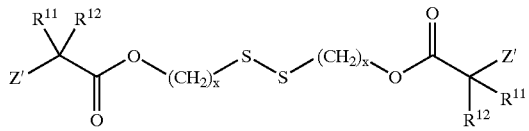

(25) 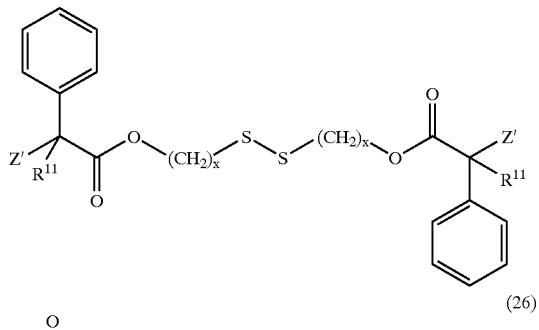

(26) 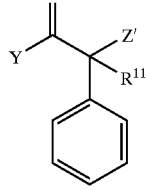

(27) 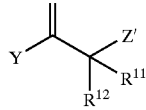

(28)

y, z = 0, 1, 2, wherein $(y+z) \leq 2$
x = 1–20
m = 1–20
n = 1–20
u = 0, 1
$R^1$, $R^2$ = definition in siloxane linkage L, specified as above
$R^3$, $R^4$ = definition of the silyl anchors specified as above
$R^8$ = H, alkyl, preferably methyl, ethyl
$R^{11}$, $R^{12}$ = independently from each other selectable substituents according to Formula III of the Patent WO 98/01480 of K. Matyjaszewski et al.
X = specified as above
Y = specified as above
Z' = transferable atom according to the ATRP-mechanism, of the group according to Patent WO 98/01480 from K. Matyjaszewski et al., preferably Br, Cl.

Beginning with the ATRP-initiators linked to the solid substrate surface, a "living"/controlled radical polymerization is carried out using radical polymerizable monomers. Radical polymerizable monomers are preferably styrene and its derivatives, acrylate, methacrylate, acrylonitrile, however also macromonomers and generally all compounds with a polymerizable C—C-double bond, wherein various monomers can be employed as mixtures or sequentially, in order to produce a copolymer or block copolymer on the solid substrate surface. The oligomer or polymer chains formed in a "living"/controlled radical polymerization reaction on the solid substrate surface can be linear or branched. In a "living"/controlled radical polymerization each chain, started from an initiator, continues to grow as long as monomers are present in the reaction mixture. Since we are concerned with a "living" polymerization, the chain ends continue to remain active after complete incorporation of the monomers, that is, they are capable of further "living"/controlled radical polymerization reactions. For this reason the solid substrate particles, from out of which the "living"/controlled radical polymerization is initiated, are and remain, during the polymerization and also after the polymerization individual solid substrate particles.

Beginning with the still active chain ends of the polymer chains of the first generation, a polymer layer of a second generation can be produced upon the first polymer layer via a renewed "living"/controlled radical polymerization. This polymer layer of second generation can be comprised of polymers or macromonomers species different from the polymer layer of the first generation, or of a mixture of various monomers or macromonomer species or of mixtures of monomers and macromonomers. The polymer layer of the second generation is linked with the polymer layer of the first generation through chemical primary valency bonds.

Further generations of polymer layers can be added by polymerization upon the polymer layer of the second generation, in the same manner, depending upon requirements, so that layer systems tailored to requirements can be produced, wherein the linkages between the layers among each other and between the first layer and the solid substrate, respectively, occur via chemical primary valency bonds.

It is further preferred that the polymer layers can be modified, for example, by chemical conversion of functional groups of the oligomer or polymer chains coupled to the solid substrate, using suitable reactants, while maintaining the degree of polymerization.

Herein the functional groups could be in each individual monomer unit, or also the "living" end group. In the appropriate reagents these could be low molecular or high molecular compounds or mixtures of the same.

It is further preferred to chemically cross-link the produced solid substrate polymer layer into a three dimensional polymer matrix system by cross-linking polymerization reactions.

A further feature of the invention is oligomers or polymer layers, produced by the inventive process, as well as the initiators of the general Formula (1), for which on the one hand the following Formulas (2)–(28), on the other hand and in particular the Formulas (29)–(39) illustrated in Examples 1–11 are exemplary. The components A, L and I contained in Formulas (1)–(11) are each independently selectable from the above provided specifications for A, L and I.

 (1)

 (2)

 (3)

 (4)

 (5)

 (6)

wherein X, Y, $R^3$, $R^4$, y, z are specified as above.

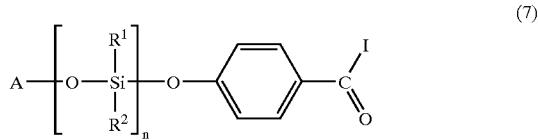 (7)

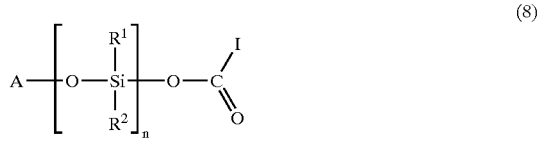 (8)

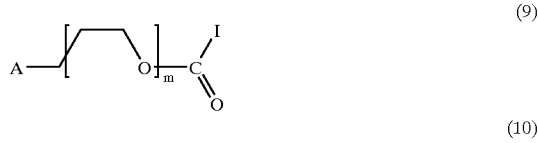 (9)

 (10)

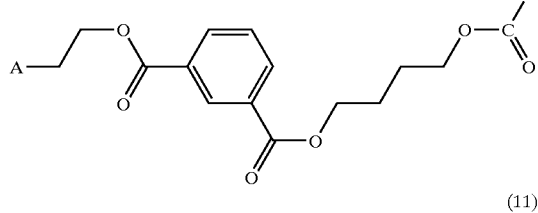 (11)

Therein $R^1$, $R^2$=alkyl, preferably methyl, also aryl, preferably phenyl, also mixtures of alkyl and aryl. Therein further n=1–20 and n=1 through 20. Further A and I are specified as above.

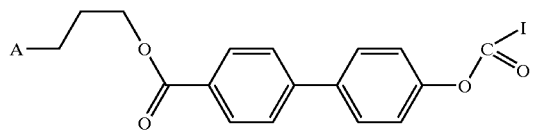 (12)

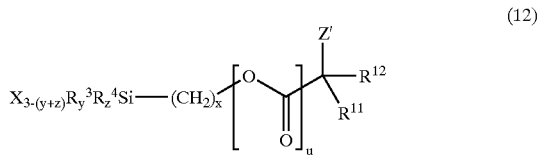 (13)

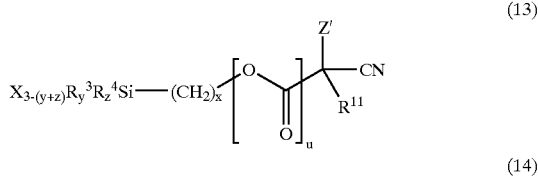 (14)

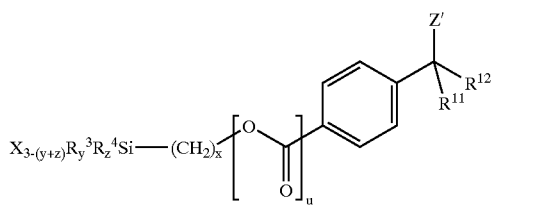 (15)

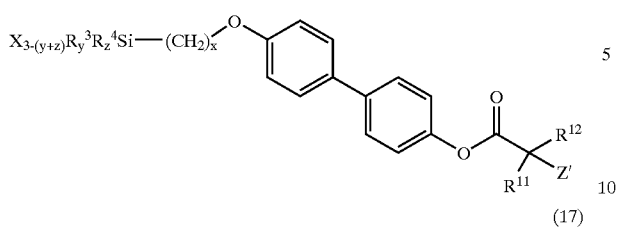
(16)

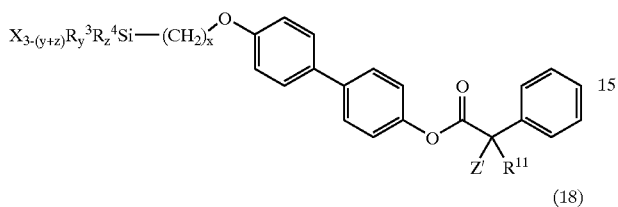
(17)

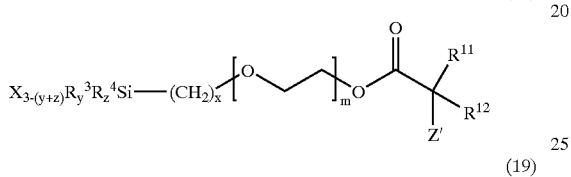
(18)

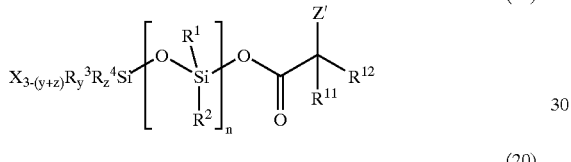
(19)

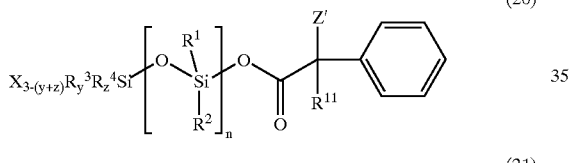
(20)

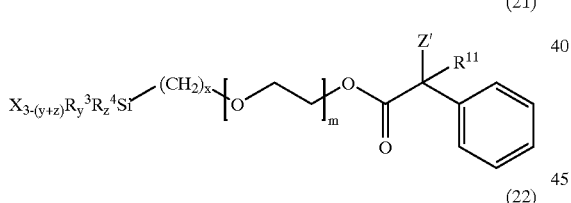
(21)

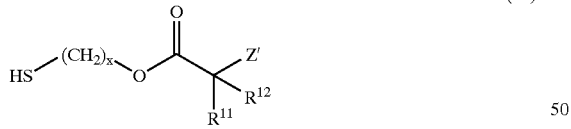
(22)

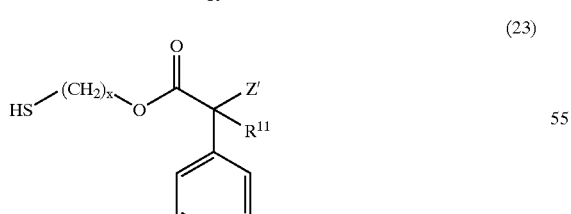
(23)

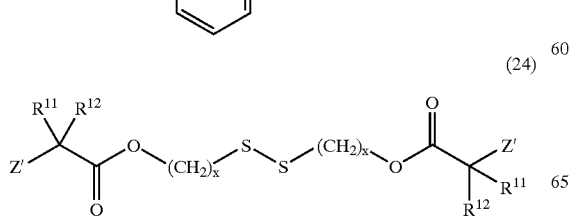
(24)

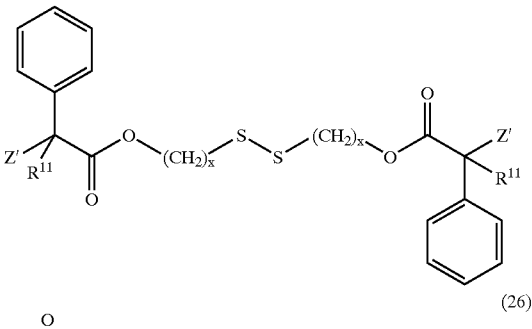
(25)

(26)

(27)

(28)

y, z = 0, 1, 2, wherein (y+z) ≦ 2
x = 1–20
m = 1–20
n = 1–20
u = 0, 1
$R^1$, $R^2$ = definition in siloxane compound of linkage L, specified as above
$R^3$, $R^4$ = definition of the silyl anchors specified as above
$R^8$ = H, alkyl, preferably methyl, ethyl
$R^{11}$, $R^{12}$ = independently from each other selectable substituents according to Formula III of the Patent WO 98/01480 of K. Matyjaszewski et al.
X = specified as above
Y = specified as above
Z' = according to the ATRP-mechanism transferable atom of the group according to Patent WO 98/01480 from K. Matyjaszewski et al., preferably Br, Cl.

With the inventive process, layers or layer systems can be produced, which change the characteristics of the original surface to the extent that the characteristics are determined only by the coating as such.

Typical surface characteristics are—besides the chemical reactivity—for example adhesion and permeation characteristics, surface tension, capability for adsorption, optical characteristics such as for example reflectivity, surface conductivity, appearance, hardness, etc. There are thus countless possible applications for the subject matter of the invention.

The inventive process can be employed for example for production of polymer layers on planar or non planar solid substrate surfaces, in order to adjust the physical or as the case may be chemical characteristics for certain utilities such as for example surface protection (abrasion, corrosion), physical interaction with the environment (anti-friction, hardness), chemical surface reactivity, photoreactivity, optical characteristics, thermal dynamic stability, etc.

for production of for example porous, oligo or polymer coated materials, in order to targetly adjust the permeation and/or sorption of gases and fluids, for example for purposes of separation of different components, for production of polymer layer coated solid substrates and polymer coated highly dispersed solids according to the core-shell principle, in order with them as filler to be able to targetly control a chemical binding of the dispersed phase in the surrounding continuous matrix (for example polymer matrix), for production of polymer layer coated solids and polymer coated highly dispersed solids, with targeted controllable polymer coating materials according to the core-shell principle, for production of new types of composite systems with processing possibilities above the glass transition temperature of the polymer coating.

Further application possibilities lie in the field of medicine. By using the inventive process the surfaces of implants of natural or synthetic origin can be so conditioned, that an improved compatibility with body cells is made possible and therewith a better incorporation of the implant is achieved. By the application of suitable molecules bound chemically to the polymer onto the surface of implants the rejection reaction against the implant could be reduced.

The following examples serve to further illustrate the invention.

EXAMPLES

Initiators

Example 1

Initiator of General Formula (3)

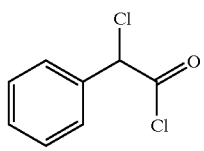

(29)

2-Chloro-2-phenyl-acetic acid chloride (29) represents a suitable, easily obtainable initiator of the general Formula (3); it corresponds to the preferred Formula (26) when Z'=Cl, Y=Cl and R$^{11}$=H.

Example 2

Initiator of General Formula (3)

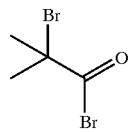

(30)

2-Bromo-2-methylpropionic acid bromide (30) represents a suitable, easily obtainable initiator of the general Formula (3); it corresponds to the preferred Formula (27) when Z'=Br, Y=Br and R$^{11}$=methyl and R$^{12}$=methyl.

Example 3

Initiator of General Formula (6)

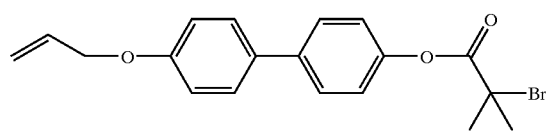

(31)

Tetrahydrofuran (THF) is dried, in that it is heated to boiling over sodium wire under reflux condensation. It is distilled immediately prior to use.

Pyridine is dried over KOH and fractionally distilled. 4-Allyloxy-4'-hydroxy-biphenyl is produced in accordance with known literature [Finkelmann, H.; Lühmann, B.; Rehage, G.; Makromol, Chem. 186, 1095 (1985)]. 2-Bromo-2-methylpropionic acid bromide (30) is fractionally distilled in vacuum. Petroleum ether is fractionally distilled, wherein the fraction with the boiling point between 40° C. and 65° C. is employed. Diethylether is distilled.

2.26 g (10 mmol) 4-allyloxy-4'-hydroxybiphenyl are dissolved in 100 ml absolute THF. Into this solution is introduced 1 ml (12 mmol) pyridine and the solution is cooled to 0° C. in an ice bath. To this there is then dropwise added a solution of 1.5 ml (12 mmol) 2-bromo-2-methylpropionic acid bromide (30) in 20 ml absolute THF. After completion of the addition it is warmed to room temperature and for further 6 hours stirred while excluding moisture.

The precipitate is filtered and the solvent is removed in vacuum. The residue is dissolved or taken up in diethyl ether and the organic phase washed with 0.5N HCl, NaHCO$_3$ and water. The organic phase is dried over Na$_2$SO$_4$ and the solvent removed in vacuum. After column chromatographic purification on SiO$_2$ with petroleum ether/diethyl ether (1/1 v/v) as eluent, the compound (31) was obtained.

| | |
|---|---|
| Yield: | 1.7 g of the initiator (31) |
| Analysis: | $^1$H-NMR, $^{13}$C-NMR |

FIG. 1 shows the $^1$H-NMR-spectrum of compound (31)

Figure 2:
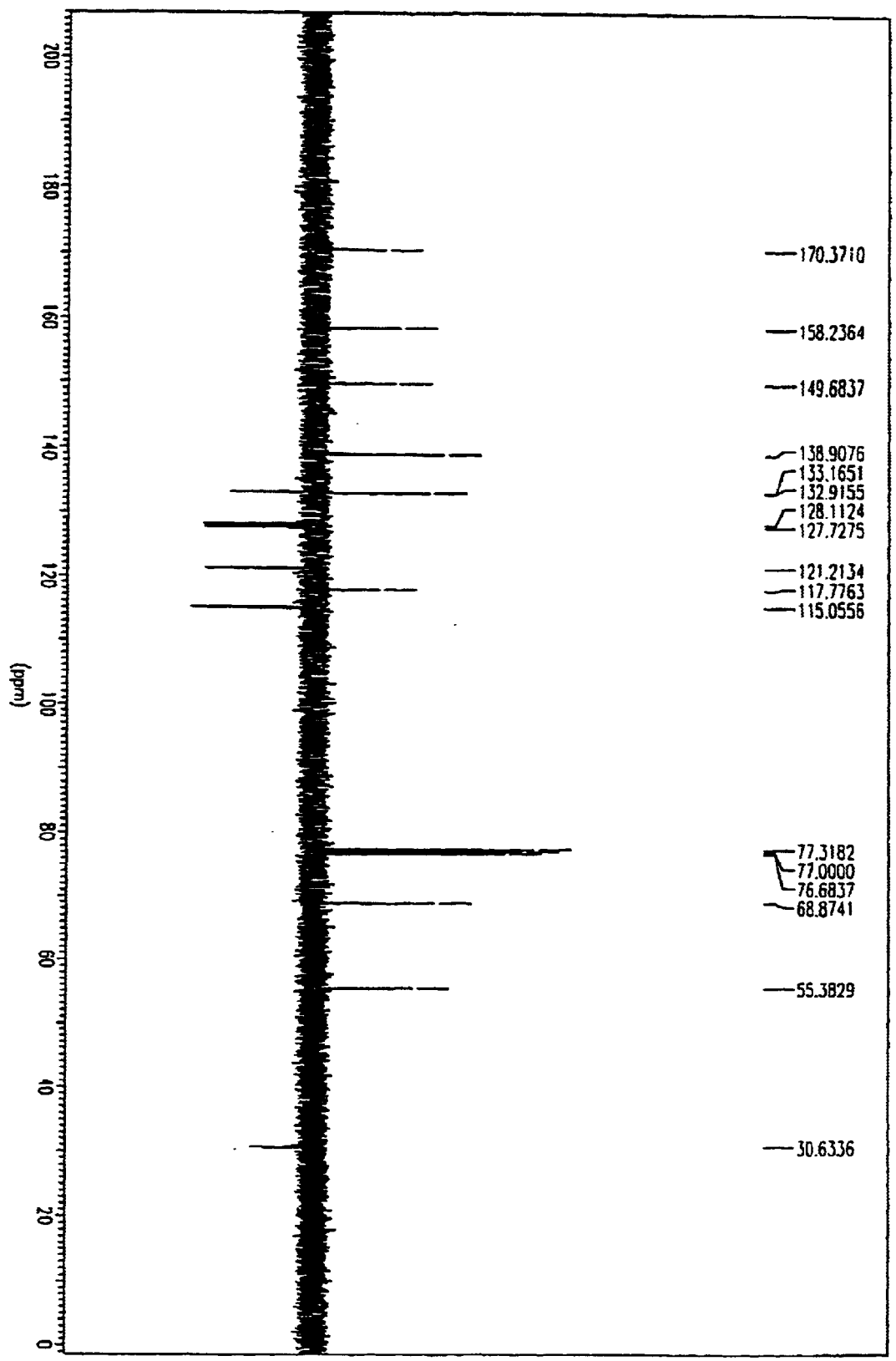
FIG. 2 shows the $^{13}$C-NMR-spectrum of compound (31).

FIG. 2 shows the $^{13}$C-NMR-spectrum of compound (31)

Recording conditions: Solution of the initiator (31) in CDCl$_3$ with TMS as internal standard.

Example 4

Initiator of General Formula (6)

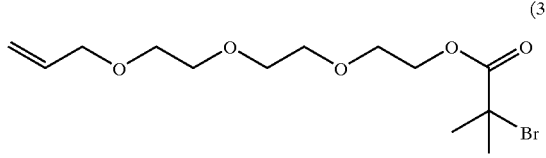
(32)

Dichloromethane is dried over CaH$_2$, distilled and stored over molecular sieve of 4 Å. Acetic acid ethyl ester is distilled. 2-(2-(2-Allyloxy-ethoxy)-ethoxy)-ethanol is produced in accordance with conventional literature [Mitchell, T. N.; Heesche-Wagner, J.; J. Organomet. Chem. 436, 43 (1992)]. The preparation of other chemicals and solvents is described in the above Example 3.

2.85 g (15 mmol) 2-(2-(2-allyloxy-ethoxy)-ethoxy)-ethanol and 1.6 ml (20 mmol) pyridine are dissolved in 150 ml absolute dichloromethane. The solution is cooled to 0° C. in an ice bath under exclusion of moisture. To this there is then dropwise added a solution of 2.3 ml (19 mmol) 2-bromo-2-methylpropionic acid bromide (30) in 20 ml absolute dichloromethane. After completion of the addition it is warmed to room temperature and stirred for additional 6 hours.

The precipitate is filtered off and the solvent is removed in vacuum. The residue is dissolved in acetic acid ethyl ester and the organic phase is washed with 0.5N HCl, NaHCO$_3$ and water. The organic phase is dried over Na$_2$SO$_4$ and the solvent removed in vacuum. After column chromatographic purification on SiO$_2$ with acetic acid ethyl ester as eluent the compound (32) is obtained.

| Yield: | 3.82 g of the initiator (32) |
|---|---|
| Analysis: | $^1$H-NMR, $^{13}$C-NMR |

Figure 3:
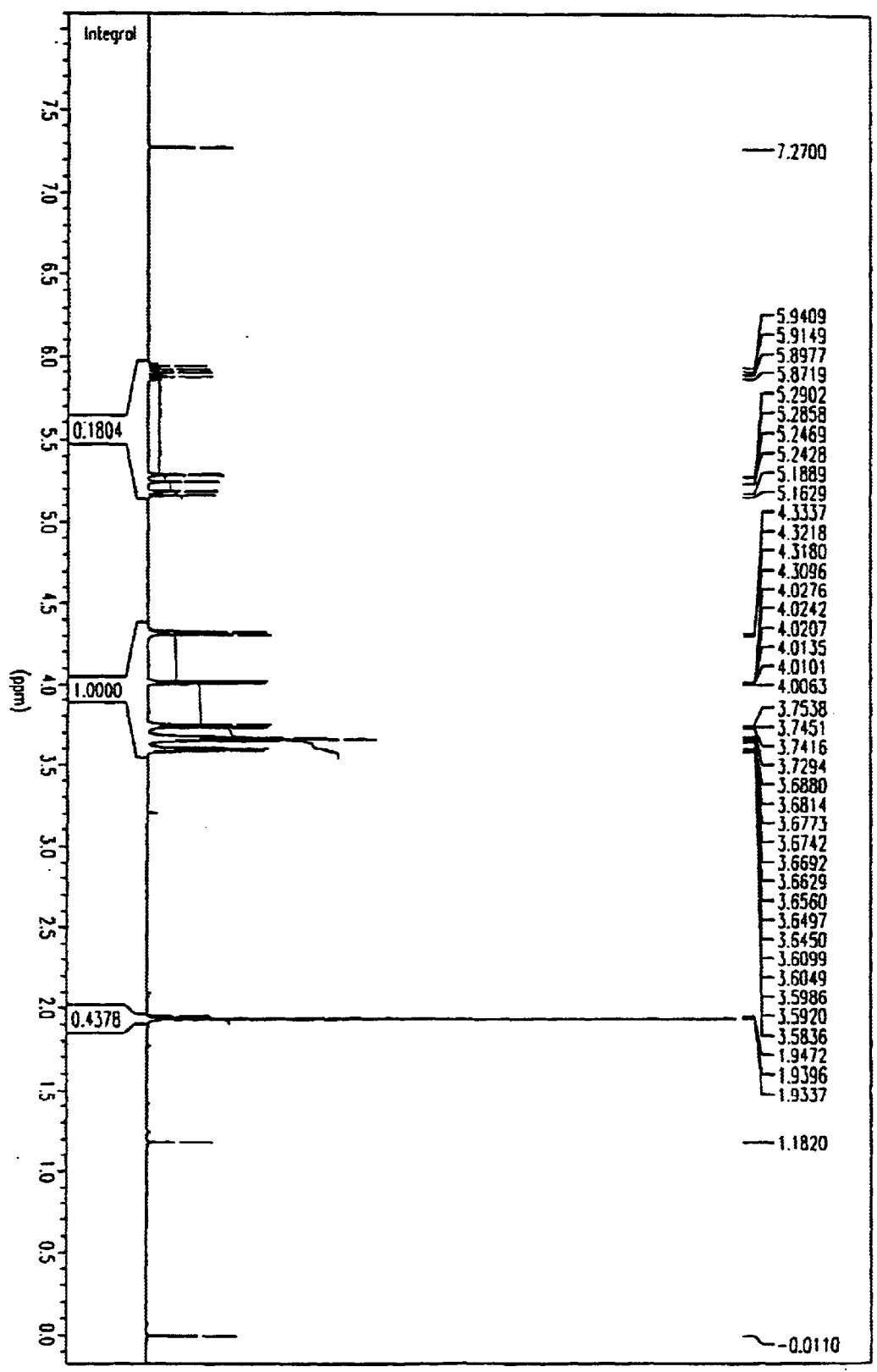
FIG. 3 shows the $^1$H-NMR-spectrum of compound (32).

FIG. 3 shows the $^1$H-NMR-spectrum of compound (32)

Figure 4:
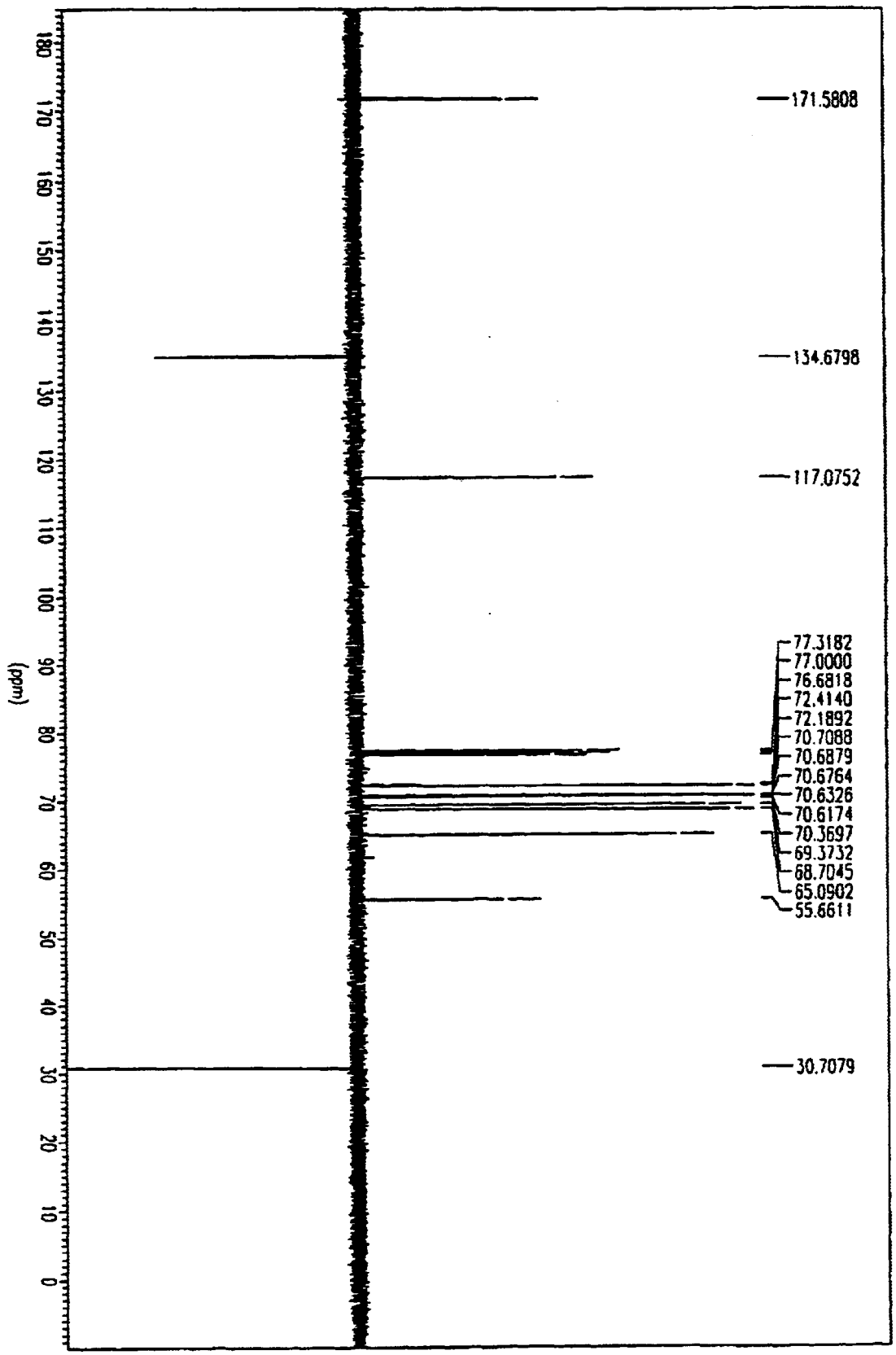
FIG. 4 shows the $^{13}$C-NMR-spectrum of compound (32).

FIG. 4 shows the $^{13}$C-NMR-spectrum of compound (32)

Recording conditions: Solution of the initiator (32) in CDCl$_3$ with TMS as internal standard.

Example 5

Initiator of General Formula (6)

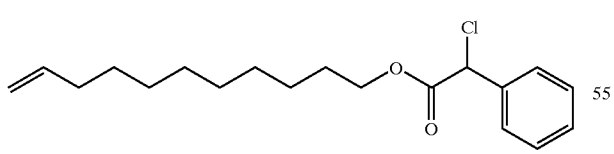
(33)

2-Chloro-2-pheny acetic acid chloride (29) is fractionally distilled in vacuum. Triethylamine is dried over CaH$_2$ and distilled under an inert atmosphere. 10-undecene-1-ol is used without further purification. The pretreatment of other chemicals and solvents is as described above in Examples 3 and 4.

6 ml (29.8 mmol) 10-undecene-1-ol and 4.6 ml (33 mmol) triethylamine are dissolved in 150 ml dichloromethane. The solution is cooled in an ice bath to 0° C. and at this temperature with exclusion of moisture and light a solution of 4.8 ml (33.1 mmol) 2-chloro-2-phenyl acetic acid chloride (29) in 50 ml absolute dichloromethane is added. After completion of addition the reaction mixture is warmed to room temperature and stirred for additional 6 hours.

The reaction mixture is transferred to a separatory funnel and is washed with respectively 150 ml 0.5N HCl, NAHCO$_3$ and distilled water. The organic phase is separated, dried over Na$_2$SO$_4$ and the solvent is removed in vacuum. The product 2-chloro-2-phenyl-acetic-acid-(10'-undecenyl)ester (33) is isolated after SiO$_2$ column chromatographic purification with petroleum ether/acetic acid ethyl ester (10/1 v/v).

| Yield: | 5.7 g of the initiator (33) |
|---|---|
| Analysis: | $^1$H-NMR, $^{13}$C-NMR |

Figure 5:
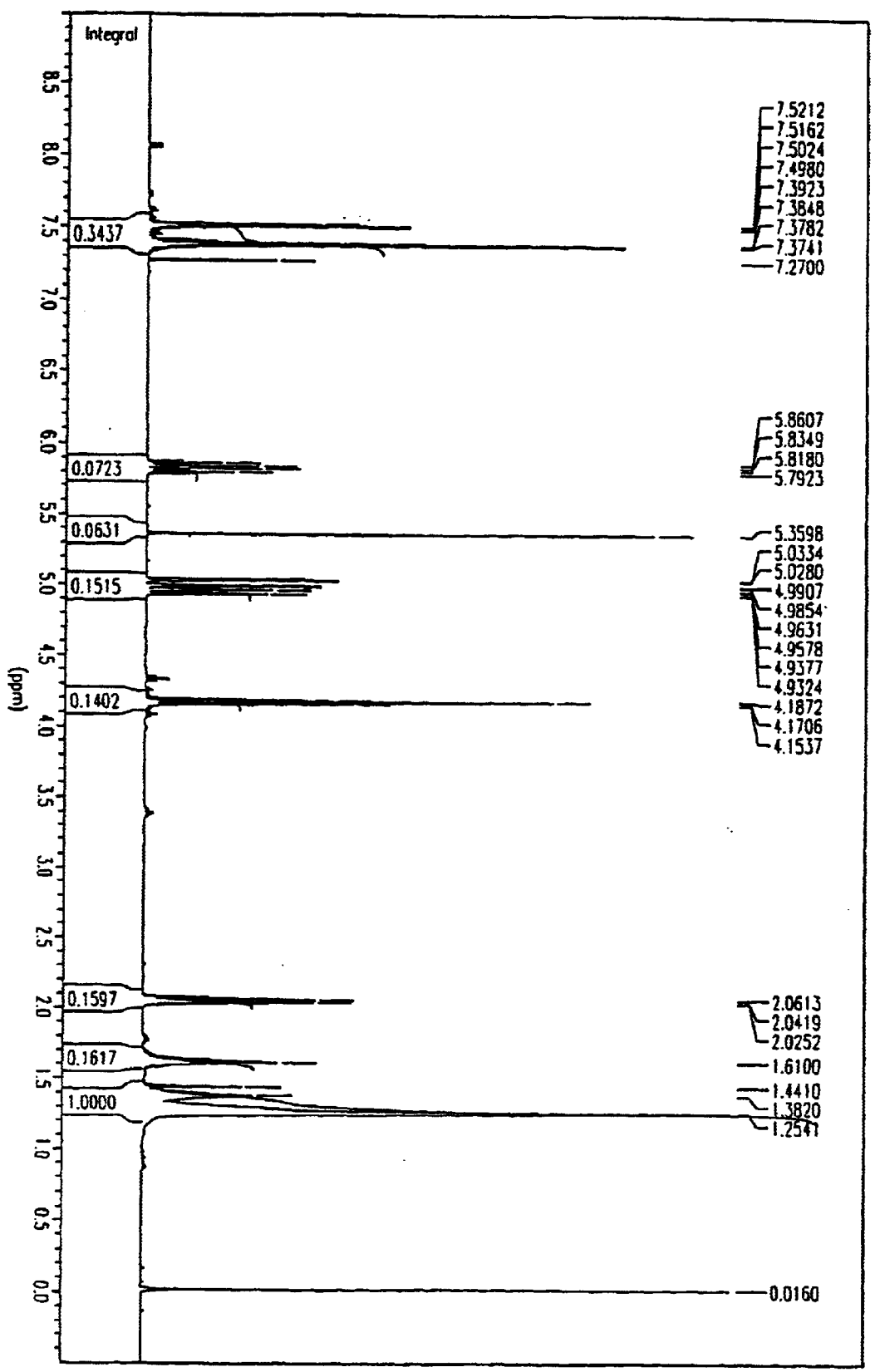
FIG. 5 shows the $^1$H-NMR-spectrum of compound (33).

FIG. 5 shows the $^1$H-NMR-spectrum of compound (33)

Figure 6:
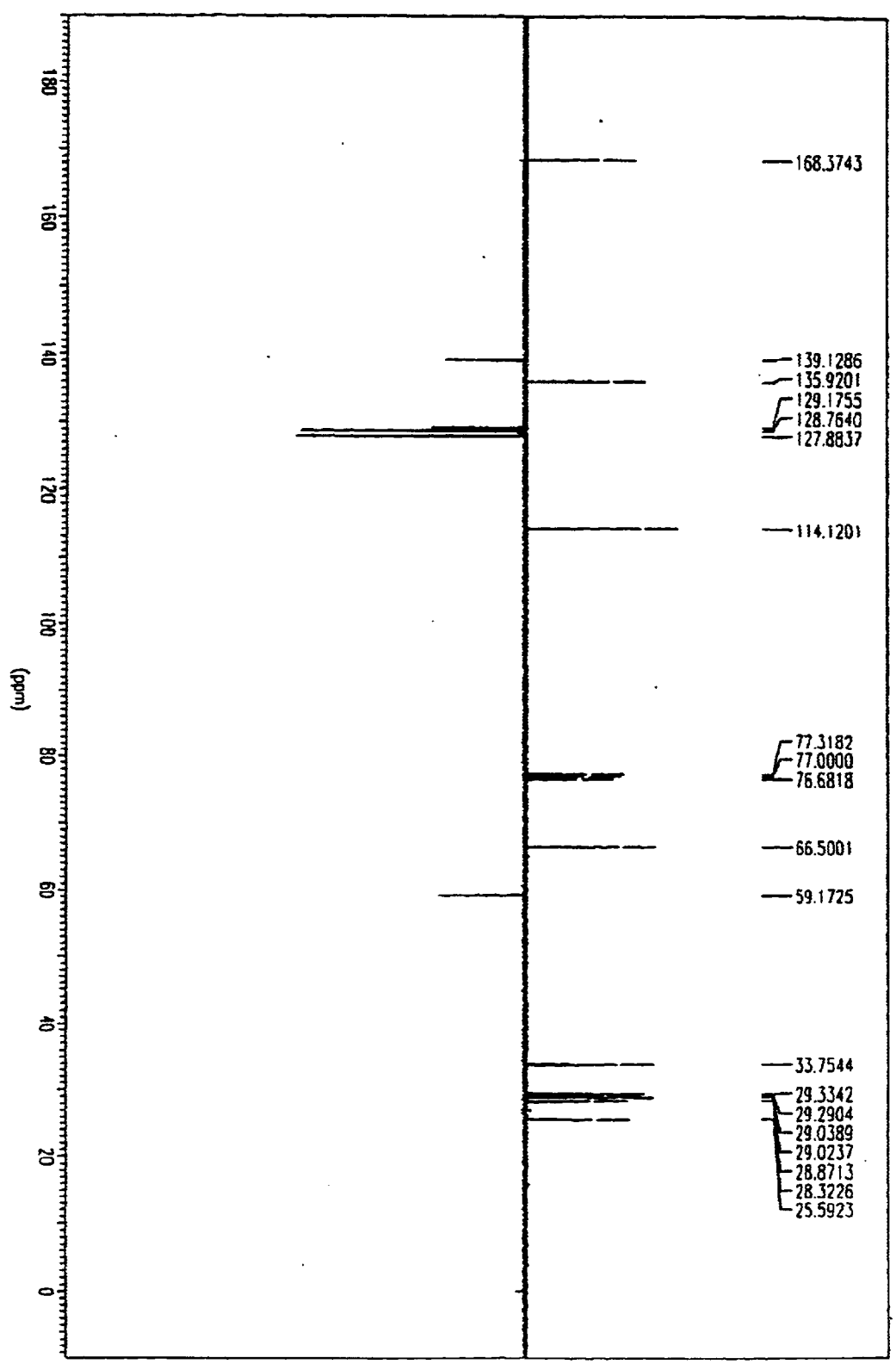
FIG. 6 shows the $^{13}$C-NMR-spectrum of compound (33).

FIG. 6 shows the $^{13}$C-NMR-spectrum of compound (33)

Recording conditions: Solution of the initiator (33) in CDCl$_3$ with TMS as internal standard.

Example 6

Initiator of General Formula (6)

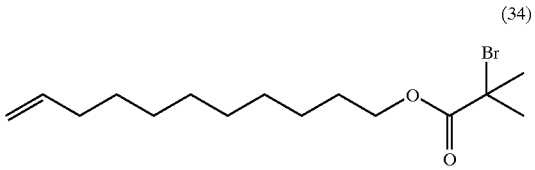
(34)

2-Bromo-2-methylpropionic acid bromide (30) is distilled in vacuum. The preparation of other chemicals and solvents is described in the above Examples 3–5.

The carrying out, work up of the reaction and isolation of the product (34) is performed as described in Example 5. In contrast, instead of (29) 4 ml (32.4 mmol) 2-bromo-2-methylpropionic acid bromide (30) is employed.

| Yield: | 6.7 g of the initiator (34) |
|---|---|
| Analysis: | $^1$H-NMR, $^{13}$C-NMR |

Figure 7:
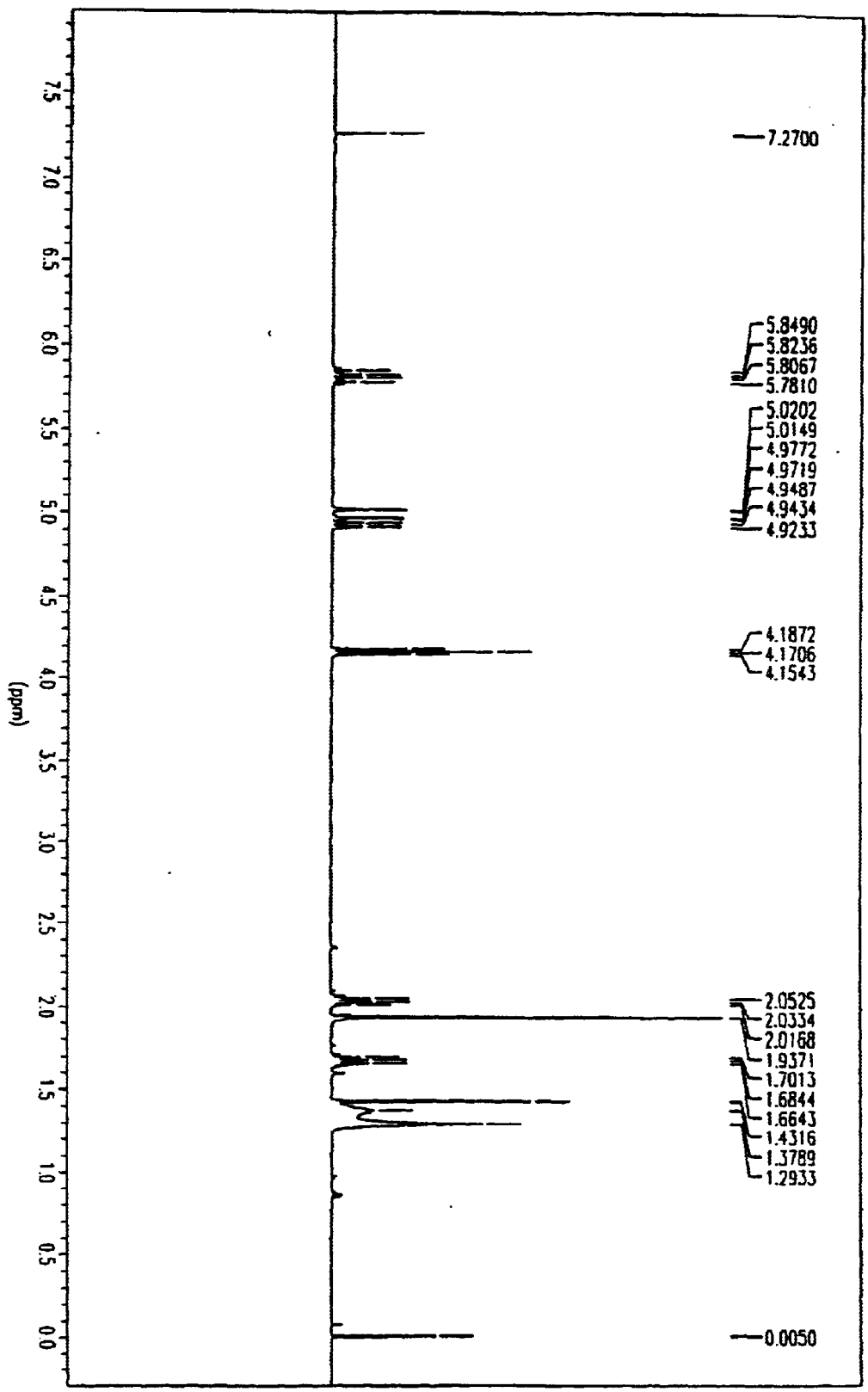
FIG. 7 shows the $^1$H-NMR-spectrum of compound (34).

FIG. 7 shows the $^1$H-NMR-spectrum of compound (34)

Figure 8:
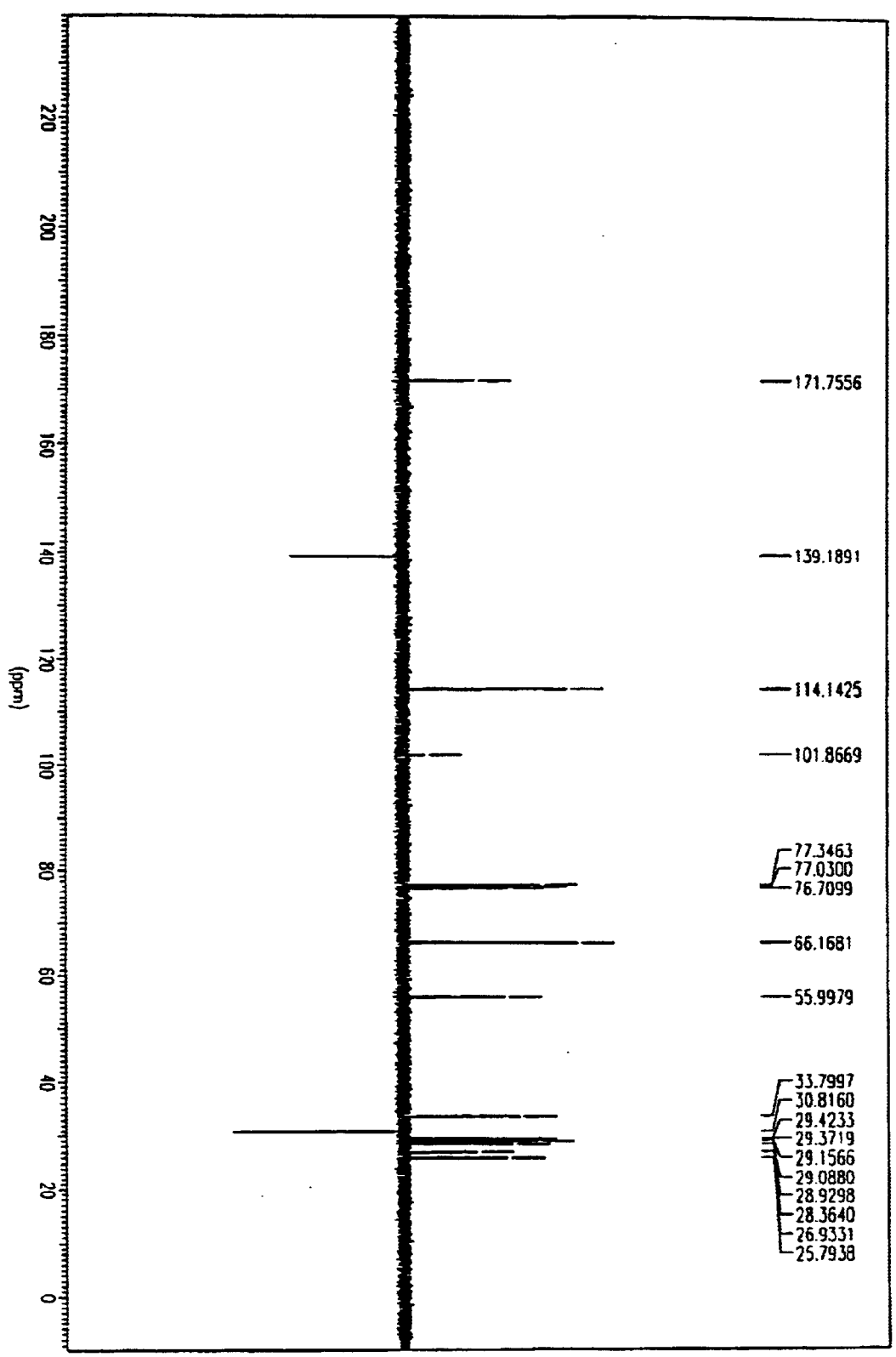
FIG. 8 shows the $^{13}$C-NMR-spectrum of compound (34).

FIG. 8 shows the $^{13}$C-NMR-spectrum of compound (34)

Recording conditions: Solution of the initiator (34) in CDCl$_3$ with TMS as internal standard.

Example 7

Initiator of General Formula (2)

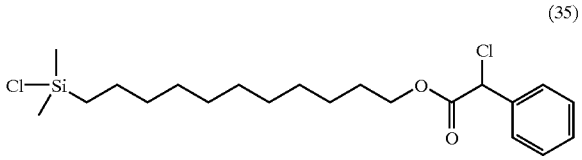
(35)

Chlorodimethylsilane is distilled with exclusion of moisture. Ethanol is distilled. Hexachloroplatinic acidhexahydrate and dimethoxyethane are employed without further purification. The preparation of dichloromethane is described in the above Example 4.

5 g (15.5 mmol) of the compound (33) is added to 40 ml (368 mmol) chlorodimethylsilane. With exclusion of moisture a solution of 30 mg hexachloroplatinic acidhexahydrate in 0.5 ml dimethoxyethane/ethanol (1/1 v/v) are added and the reaction mixture is stirred at room temperature under inert gas overnight.

For work up or recovery the excess chlorodimethylsilane is distilled off and the residue is taken up in 20 ml absolute dichloromethane. The solution is filtered over finely powered $Na_2SO_4$ and the solvent is removed in vacuum. The initiator (35) is employed without further purification.

The initiator (35) corresponds to the special formula (12), wherein u=1, x=11, y=1, z=1, Z'=Cl, X=Cl, $R^3$=methyl, $R^4$=methyl, $R^{11}$=phenyl and $R^{12}$=H.

| Yield: | approximately 6 g of the initiator (35) |
|---|---|
| Analysis: | FT-IR |

Figure 9:
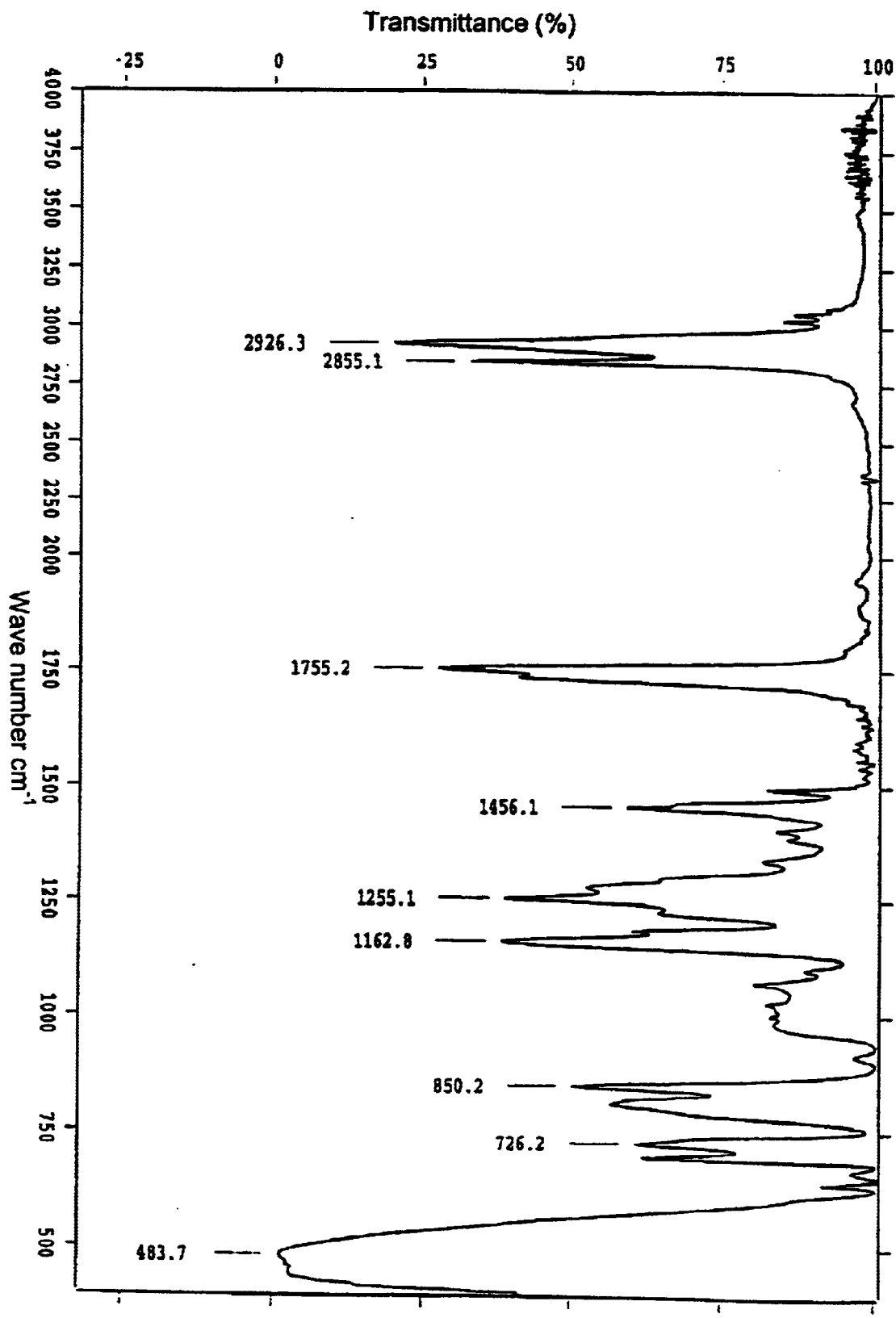
FIG. 9 shows the FT-IR spectrum of initiator (35).

FIG. 9 shows the FT-IR spectrum of initiator (35)
Recording technique: transmission spectrum of (35) as film between NaCl-windows.

Example 8

Initiator of General Formula (2)

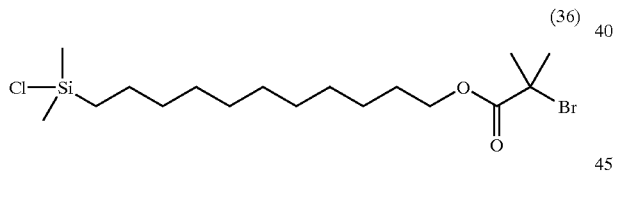

(36)

The carrying out and work up of the reaction and the isolation of the product (36) is carried out as described in Example 7. In contrast instead of (33), 4.9 g (15.4 mmol) of 2-bromo-2-methylproponic acid (10'-undecenyl) ester (34) is employed.

The initiator (36) corresponds to the special formula (12) wherein u=1, x=11, y=1, z=1, Z'=Br, X=Cl, $R^3$=methyl, $R^4$=methyl, $R^{11}$=methyl and R 12=methyl.

| Yield: | approximately 5.9 g of the initiator (36) |
|---|---|
| Analysis: | FT-IR |

Figure 10:
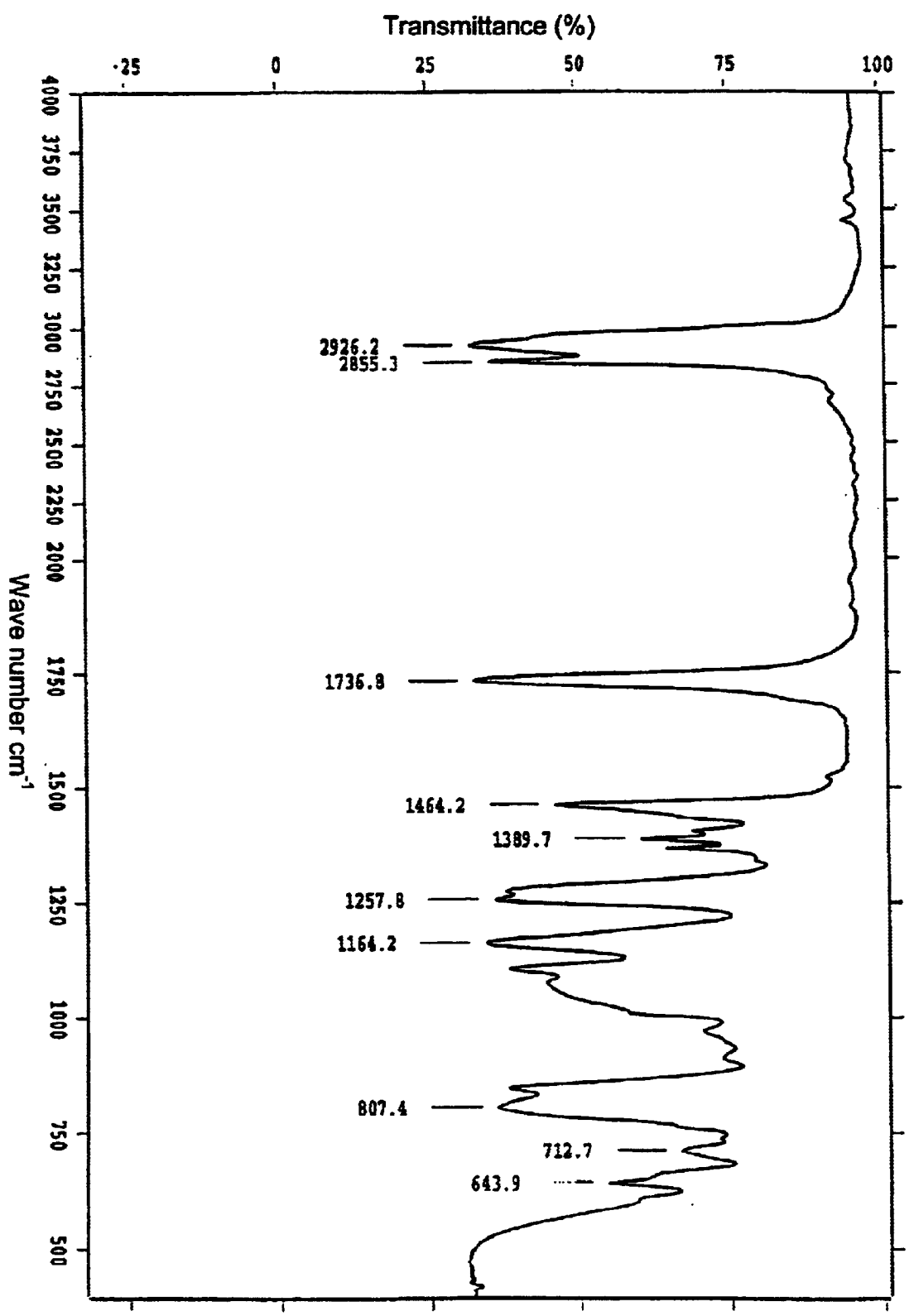
FIG. 10 shows the FT-IR spectrum of initiator (36).

FIG. 10 shows the FT-IR spectrum of initiator (36)
Recording technique: transmission spectrum of (36) as film between NaCl-windows.

Example 9

Initiator of General Formula (2)

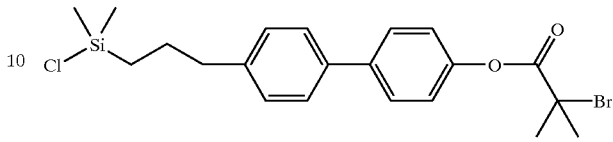

(37)

The carrying out and work up of the reaction and the isolation of the product (37) is carried out as described in Example 7. In contrast, instead of (33) 1.8 g (4.8 mmol) of 2-bromo-2-methylproponic acid (4'-allyloxybiphenyl-4-yl) ester (31), 20 ml (184 mmol) chlorodimethylsilane and 15 mg hexachloroplatinic acid-hexahydrate in 0.25 ml dimethoxyethane/ethanol (1/1 v/v) are employed.

The initiator (37) corresponds to the special formula (16), wherein x=3, y=1, z=1, Z'=Br, X=Cl, $R^3$=methyl, $R^4$=methyl, $R^{11}$=methyl and $R^{12}$=methyl.

Yield: approximately 2 g of the initiator (37)

Example 10

Initiator of General Formula (2)

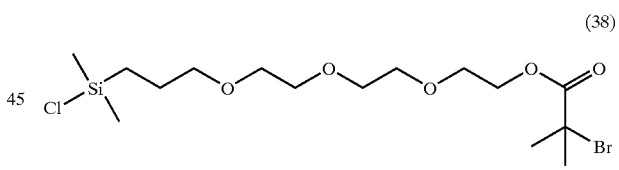

(38)

The carrying out and work up of the reaction and the isolation of the product (38) is carried out as described in Example 7. In contrast, instead of (33) 1.7 g (5 mmol) of 2-bromo-2-methylproponic acid(2-(2-(2-allyloxyethoxy)-ethoxy)-ethyl)ester (32), 20 ml (184 mmol) chlorodimethylsilane and 15 mg hexachloroplatinic acid- hexahydrate in 0.25 ml dimethoxyethane/ethanol (1/1 v/v) are employed.

The initiator (38) corresponds to the special formula (18), wherein x=3, m=3, y=1, z=1, Z'=Br, X=Cl, $R^3$=methyl, $R^4$=methyl, $R^{11}$=methyl and $R^{12}$=methyl.

Yield: approximately 1.9 g of the initiator (38)

Example 11

Initiator of General Formula (5)

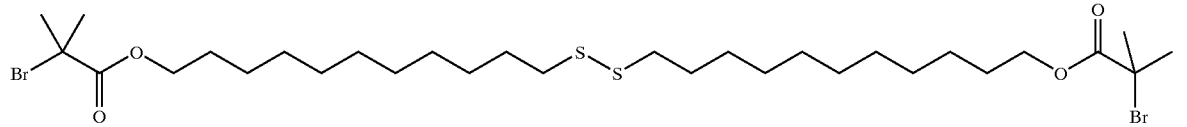

(39)

Bis(11-hydroxyundecyl)disulfide is prepared in accordance with known literature [Bain, C. B.; Troughton, E. B.; Tao, Y. T.; Evall, Jr.; Whitesides, G. M.; Nuzzo, R. G., J. Am. Chem. Soc. 111, 321 (1989)]. N,N-dimethylaminopyridine is employed without further purification. The preparation of other chemicals and solvents is described in the above Examples 3 and 5.

A solution of 3.2 ml (25.9 mmol) 2-bromo-2-methylpropionic acid bromide (30) in 20 ml absolute THF is dropwise added under inert gas to a solution of 5.02 g (12.3 mmol) di-(11-hydroxyundecyl)-disulfide, 3.8 ml (27.3 mmol) triethylamine and 12 mg (10 μmol) N,N-dimethylaminopyridine in 100 ml absolute THF. The solution was stirred at room temperature for additional 2 hours.

Solvent is evaporated in a rotation evaporator and the residue is taken up in diethylether. The organic phase is washed with 50 ml 2N sodium hydroxide solution and three times with 50 ml distilled water. The organic phase is dried over sodium sulfate and the solvent removed in vacuum. Column filtration with aluminum oxide (neutral) with petroleum ether as eluent produces the product (39) as a whitish, waxy oil. (39) corresponds to the special formula (24) when $x=11$, $Z'=Br$, $R^{11}$=methyl and $R^{12}$=methyl.

| Yield: | 7.36 g of the initiator (39) |
|---|---|
| Analysis: | FT-IR |

Figure 11:
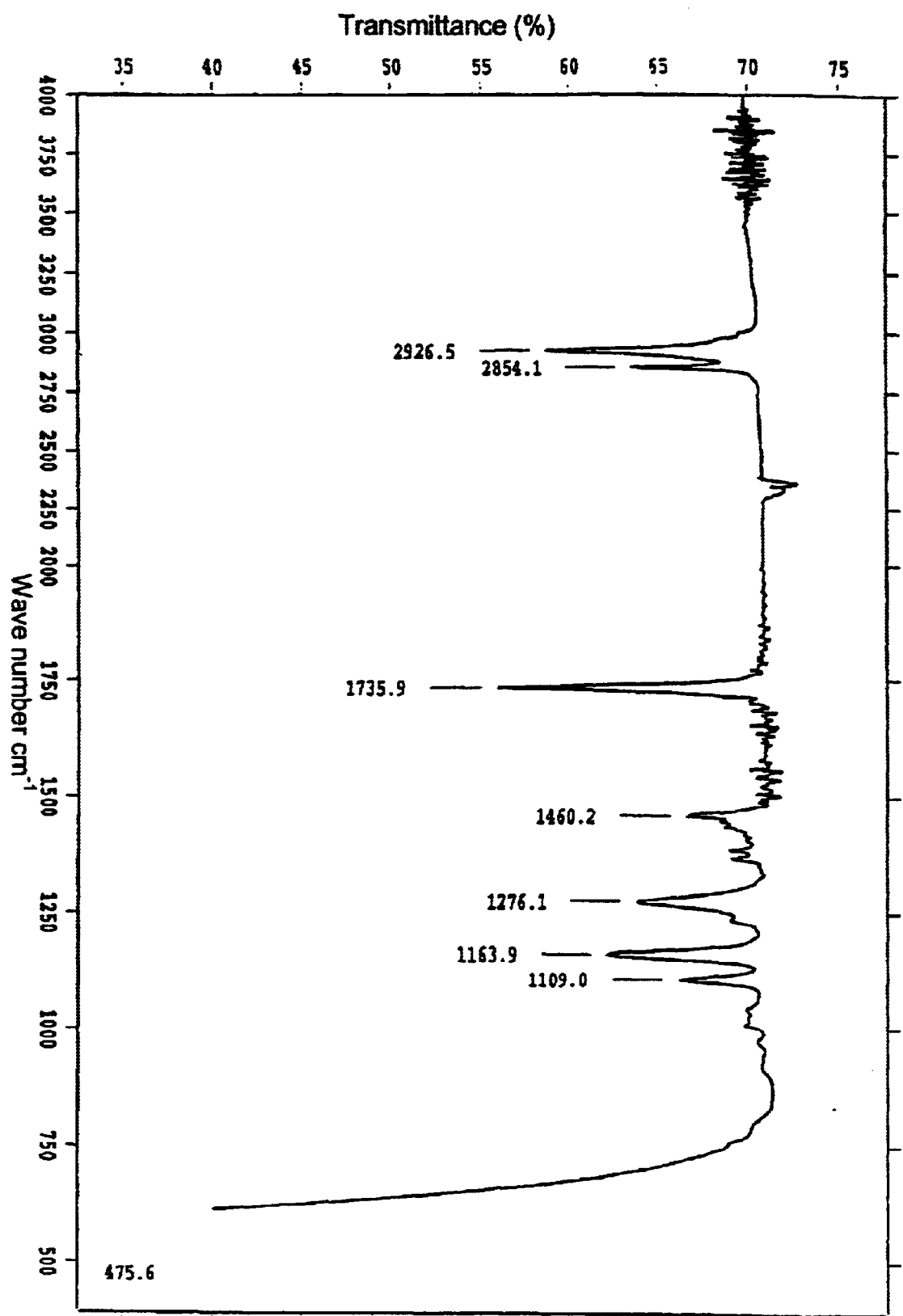
FIG. 11 shows the FT-IR spectrum of compound (39).

FIG. 11 shows the FT-IR spectrum of compound (39)

Recording technique: transmission spectrum of the film of the compound (39) between NaCl-windows.

Linkage of the Initiators to Solid Substrate Surfaces

Example 12

Initiator (30) Bonded to Poly(p-hydroxystyrene-co-divinylbenzene)

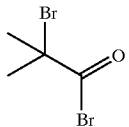

(30)

Poly(p-hyroxystyrene-co-divinybenzene) is prepared in accordance with known literature [Spittel, A., Diplomarbeit, Universität Hannover (1991)]. Ethanol is distilled. The preparation of other chemicals and solvents is described in the above Examples 3 and 4.

5 g poly(p-hyroxystyrene-co-divinylbenzene)-microgel is introduced into a heated round-bottomed flask and stirred with 200 ml absolute dichloromethane under inert gas for 24 hours. Then 1.4 ml (17.3 mmol) pyridine is added. The reaction mixture is cooled in an ice bath and a solution of 2 ml (16.5 mmol) 2-bromo-2-methylpropionic acid bromide (30) in 20 ml absolute dichloromethane slowly is added dropwise. After completion of the addition the solution is heated to room temperature and stirring is continued for additional 12 hours.

The microgel covered with (30) is filtered off and sequentially washed with respectively 100 ml diethylether, ethanol, ethanol/water (1/1 v/v), ethanol and diethylether. The product is dried in vacuum (10 mbar) at 50° C.

Yield: 5.65 g microgel covered with initiator (30), corresponding to 3.87 mmol initiator (30) per g microgel

Example 13

Initiator (35) Bond to Silica Gel

Silica gel (ultrasil 3370, Degussa) is dried for 36 hours at 110° C. at 10 mbar. Toluene is dried over sodium-wire under reflux. It is distilled off directly prior to use. The preparation of other chemicals and solvents is as described in the above Examples 3, 5 and 7.

To a suspension of 3 g silica gel in 200 ml dry toluene 2 ml (14.4 mmol) triethylamine and a solution of 2 g (4.8 mmol) 2-chloro-2-phenyl-acetic acid-(11'-(chlorodimethylsilyl)undecyl)ester (35) in 5 ml dry toluene are added under inert gas. The reaction mixture is stirred for 24 hours at room temperature under inert gas.

For work up or recovery the silica gel is separated from the reaction solvent over a diffuser and subsequently washed in portions with respectively 150 ml toluene, ethanol/water (1/1 v/v) at pH 3, ethanol/water (1/1 v/v), ethanol and diethylether. The silica gel coated with (35) is then dried to constant weight at 30° C. and 10 mbar.

| Yield: | approximately 3.3 g of silica gel coated with (35), corresponding to 0.24 mmol initiator (35) per g silica gel |
|---|---|
| Analysis: | FT-IR |

Figure 12:
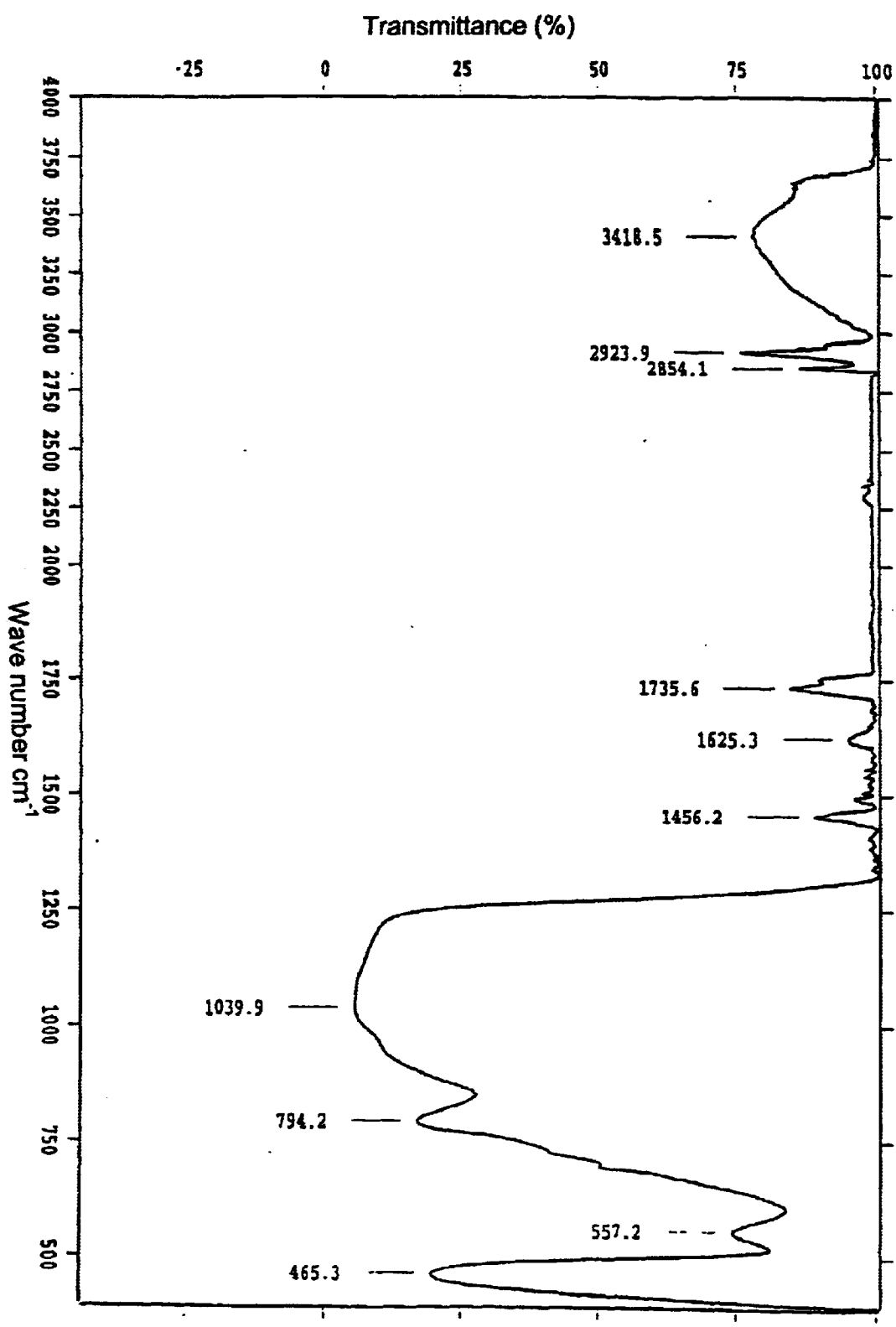
FIG. 12 shows the FT-IR spectrum of the silica gel with the initiator (35) bonded to the surface.

FIG. 12 shows the FT-IR spectrum of the silica gel with the initiator (35) bonded to the surface.

Recording technique: transmission measurement of a film, produced by vaporization of a suspension agent onto a KBr-pressed disk.

Example 14

Initiator (36) Bonded to Silica Gel

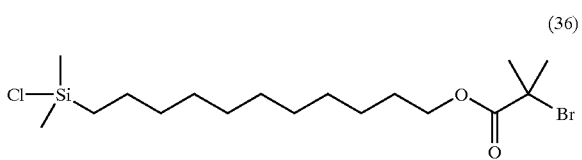
(36)

The steps of the carrying out and work up or recovery of the initiator compound on the solid is described in Example 13.

Starting from Example 13, 5 g of silica gel suspended in 300 ml toluene, 3.6 ml (25 mmol) triethylamine and instead of initiator (35) 2-bromo-2-methylproponic acid(11'-(chlorodimethylsilyl)undecyl)ester (36) in 10 ml absolute toluene is employed. For the work up, a sequence of 200 ml toluene, ethanol/water (1/1 v/v) of pH 3, ethanol/water (1/1 v/v), ethanol and diethylether is applied.

| | |
|---|---|
| Yield: | approximately 5.5 g with (36) covered silica gel, corresponding to 0.27 mmol initiator (36) per g silica gel |
| Analysis: | FT-IR |

Figure 13:
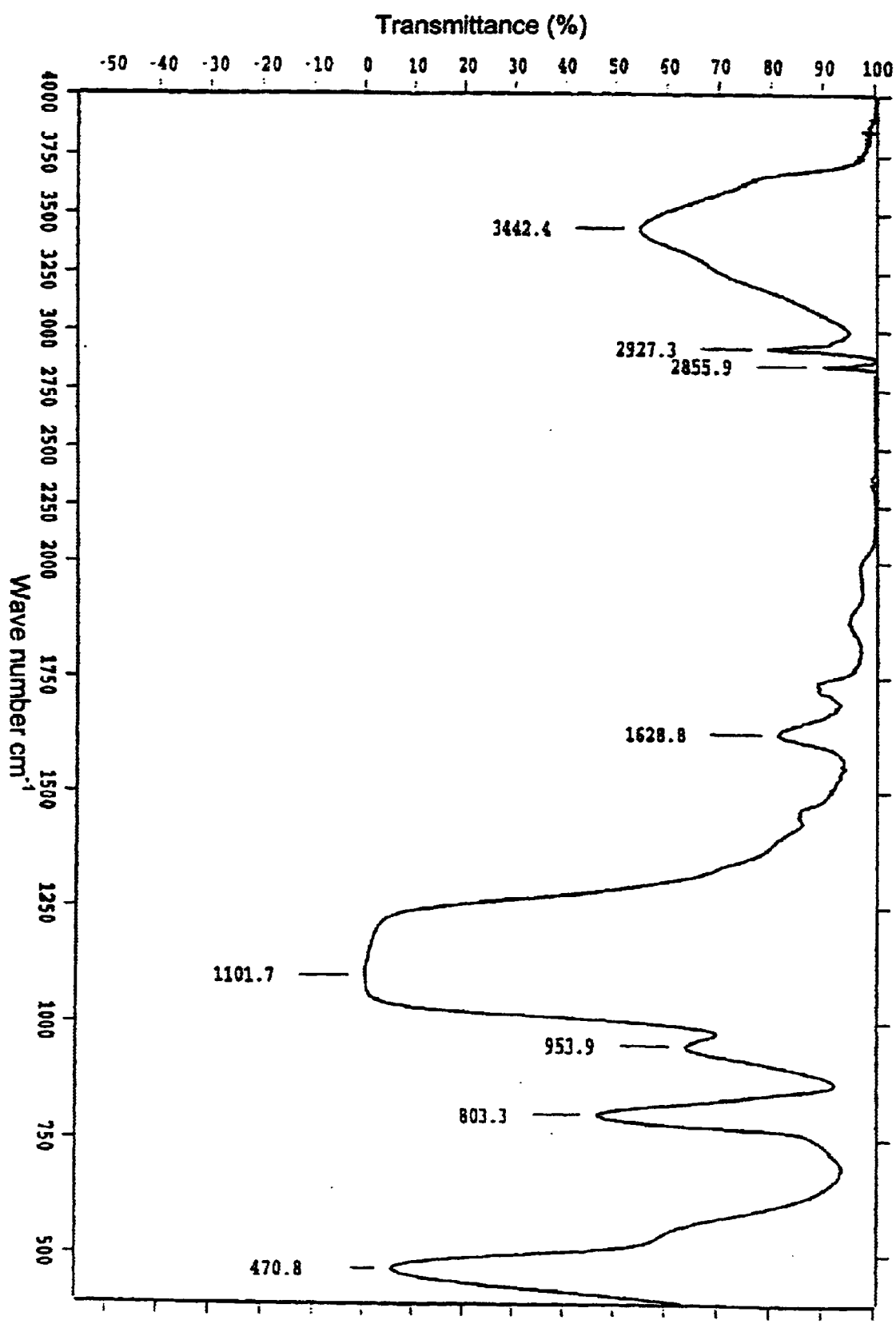
FIG. 13 shows the FT-IR spectrum of the silica gel with the initiator (36) bonded to the surface of the silica gel.

FIG. 13 shows the FT-IR spectrum of the silica gel with the initiator (36) bonded to the surface of the silica gel.

Recording technique: transmission measurement of a film, which was produced by vaporizing a suspension material onto a KBr-pressed disk.

Example 15

Initiator (36) Bonded to Glass Beads

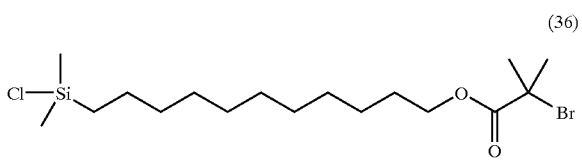
(36)

In order to increase the number of reactive silanol groups on the surface of glass beads (170 mesh), 3 g of glass beads are etched at boiling heat in a 4N sodium hydroxide solution for 4 hours. The glass beads are filtered off and washed with approximately 250 ml distilled water. The glass beads are dried for 36 hours in vacuum (10 mbar) at 80° C. These steps for carrying out the recovery of the solid substrate with bound initiator occurs analogously to Example 13.

2 g of the glass beads are suspended in a heated round bottom flask in 50 ml absolute toluene under inert gas. To this 1.3 ml (9.4 mmol) triethylamine and 3.92 g (9.5 mmol) of the initiator (36) are added. The reaction is carried out for 18 hours at room temperature under inert gas.

The glass beads are separated from the reaction solution and sequentially washed with 70 ml toluene, ethanol/water (1/1 v/v), pH 3, ethanol/water (1/1 v/v), ethanol and diethylether. The product is dried for 48 hours at room temperature in vacuum (10 mbar).

Analysis: FT-IR

Figure 14:
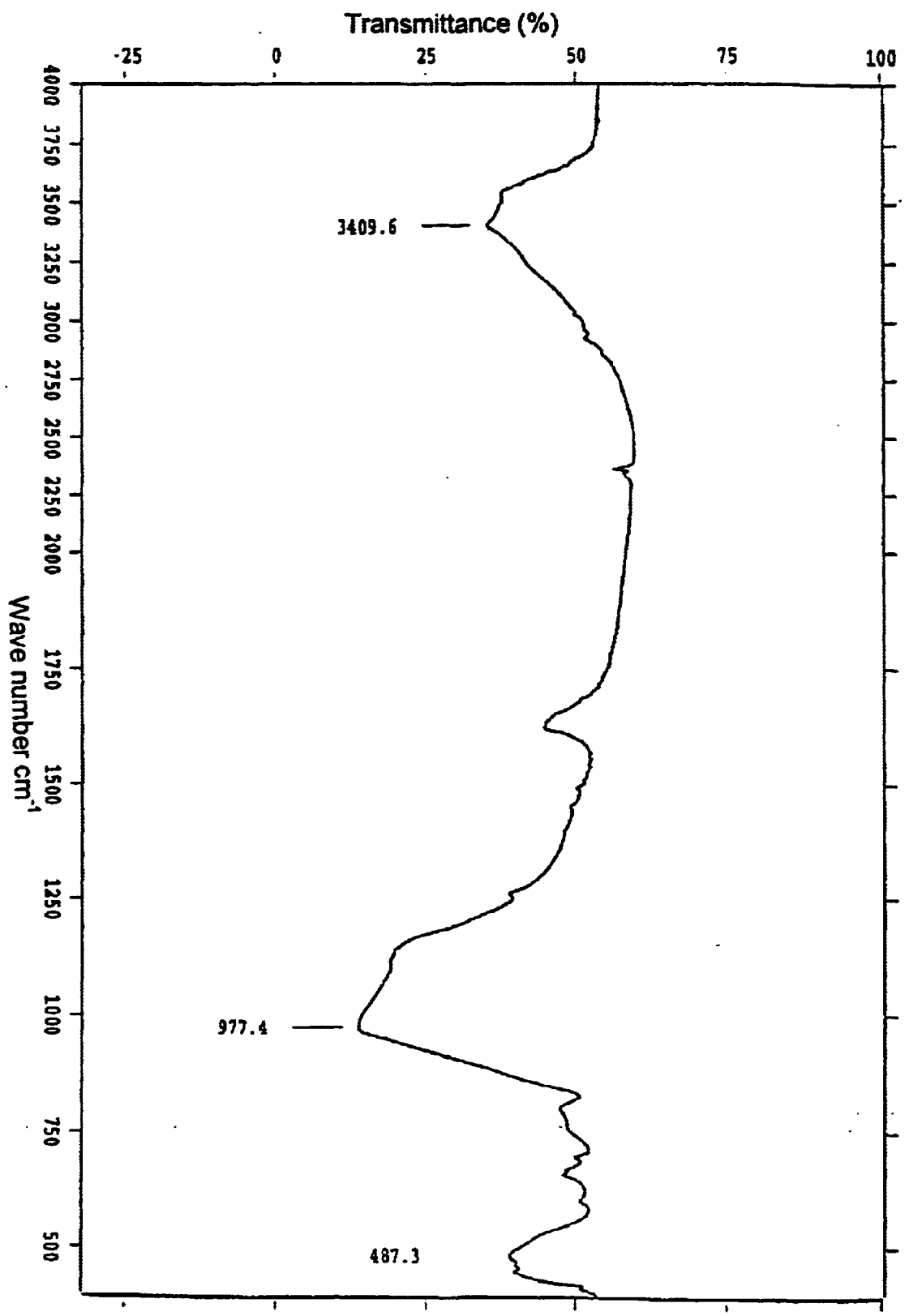
FIG. 14 shows the FT-IR spectrum of the glass beads with the initiator (36) bonded to the surface.

FIG. 14 shows the FT-IR spectrum of the glass beads with the initiator (36) bonded to the surface.

Recording technique: transmission measurement of a KBr-pressed disk.

Example 16

Initiator (39) Bonded to Colloidal Gold

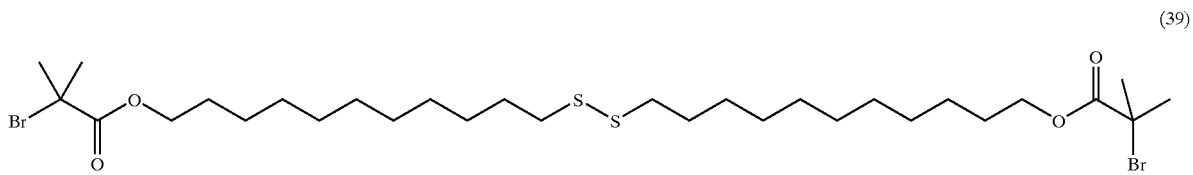
(39)

Colloidal gold in toluene is produced as described in the literature [Burst, M.; Bethell, D.; Kiely, C. J.; Schiffrin, D. J, Adv. Mater., 7, 795 (1995)]. Didodecyldisilfide is produced drawing from the literature [Bain, C. B.; Troughton, E. B.; Tao, Y. T.; Evall, J.; Whitesides, G. M.; Nuzzo, R. G., J. Am. Chem. Soc. 111, 321 (1989)].

To a dispersion of 178 mg (0.9 mmol) colloidal gold (particle diameter approximately 8 nm) in 750 ml distilled toluene there is slowly added a solution of 135 mg (0.336 mmol) didodecyidisulfide and 60 mg (0.085 mmol) of initiator (39) in 80 ml distilled toluene and stirred at room temperature for additional 3 hours.

The organic solvent is evaporated to dryness and the residue is intensively washed with ethanol and acetone. Subsequently the product is again dispersed in toluene and again brought to dryness and the residue is again washed with ethanol and acetone. In total this procedure is carried out three times.

| | |
|---|---|
| Yield: | 0.205 g with (39) covered, colloidal gold |
| Analysis: | FT-IR |

Figure 15:
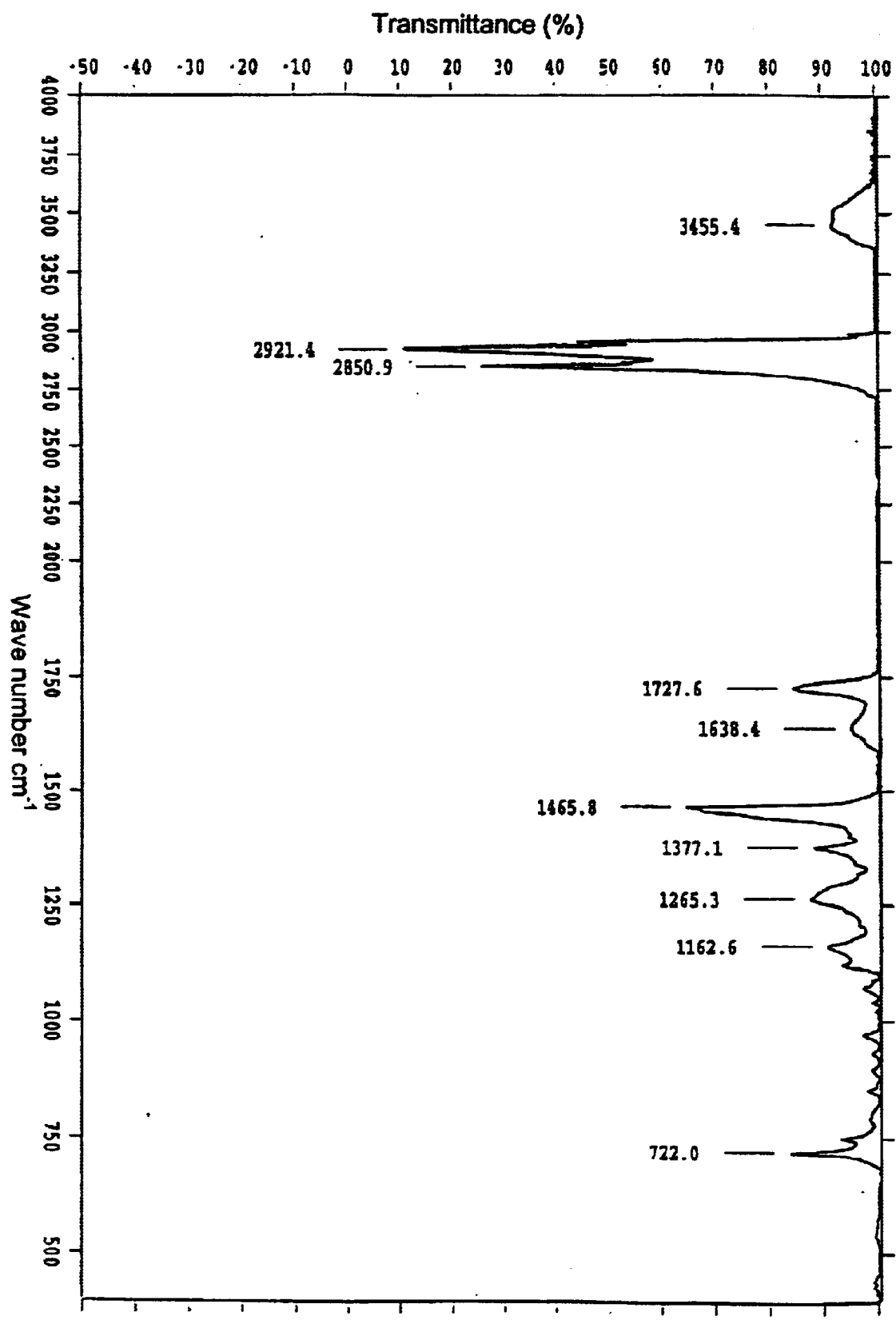
FIG. 15 shows the FT-IR spectrum of the gold colloid with initiator (39) bonded to the surface.

FIG. 15 shows the FT-IR spectrum of the gold colloid with initiator (39) bonded to the surface.

Recording technique: transmission spectrum of a KBr-pressed disk.

Example 17

Variation of the Concentration of the Initiator (35) on the Silica Gel Surface The steps for carrying out and recovering the initiator bonded to substrate is described in Example 13. In contrast to Example 13, the employed ratio of initiator (35) to silica gel is varied (see Table 1). The ratio of initiator (35) to absolute triethylamine is 1 to 3 in all examples.

TABLE 1

Feed ratio of Initiator (35) to silica gel and the resulting surface concentration of (35) on the silica gel

| Sample | (35)/silica gel (mmol/g)[a] | (35) (mmol/g)[b] |
|---|---|---|
| 1 | 0.27 | 0.14 |
| 2 | 0.73 | 0.28 |
| 3 | 1.78 | 0.30 |

[a] ratio of initiator (35) to silica gel in the reaction mixture
[b] concentration of initiator (35) on the silica gel surface in the product, determined by TGA

| Yield: | see Table 1, last column |
|---|---|
| Analysis: | TGA |

Figure 16:
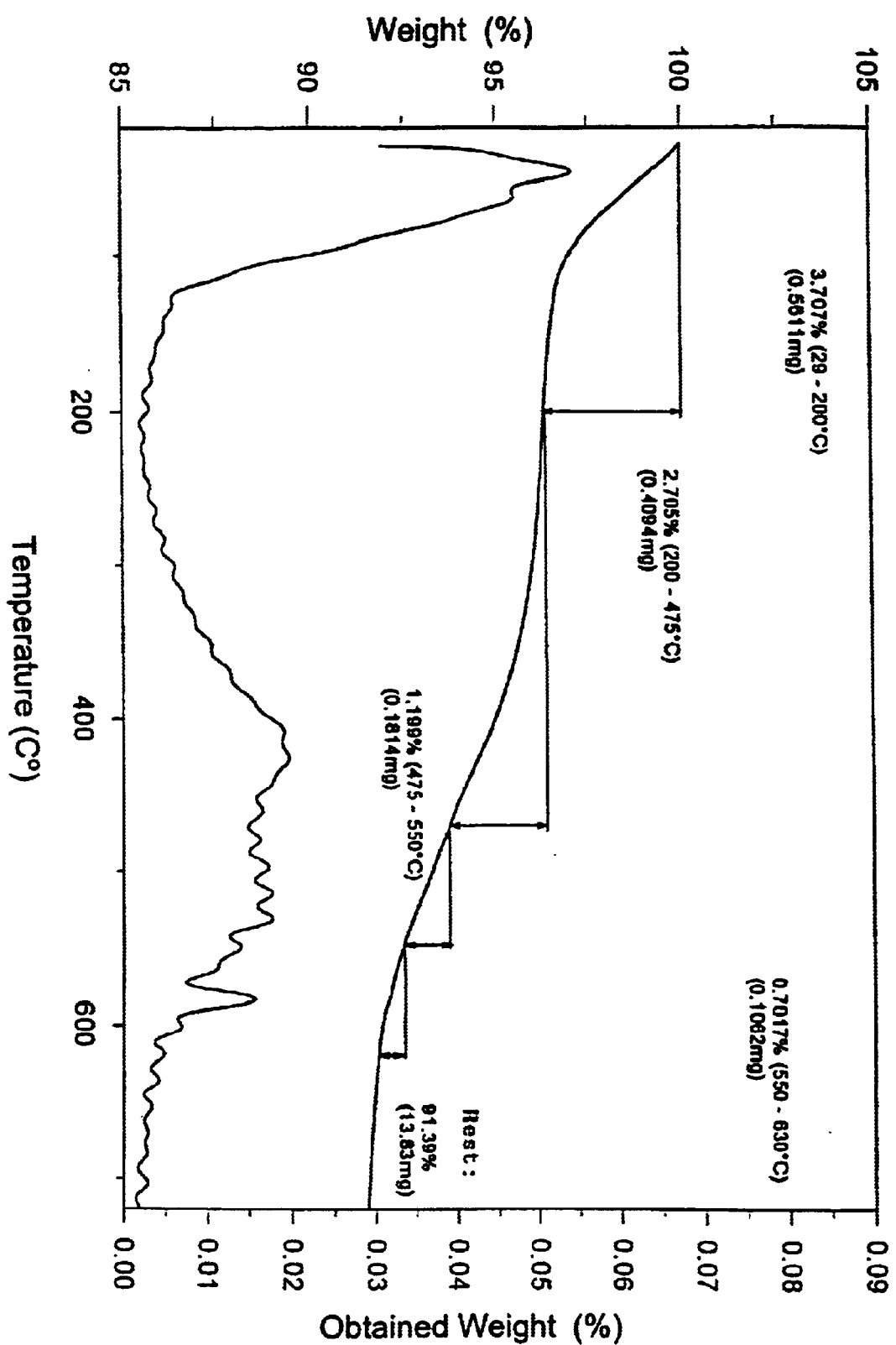
FIGS. 16–18 show the diagram of the thermogravimetric analysis of the Samples 1–3.
Figure 17:
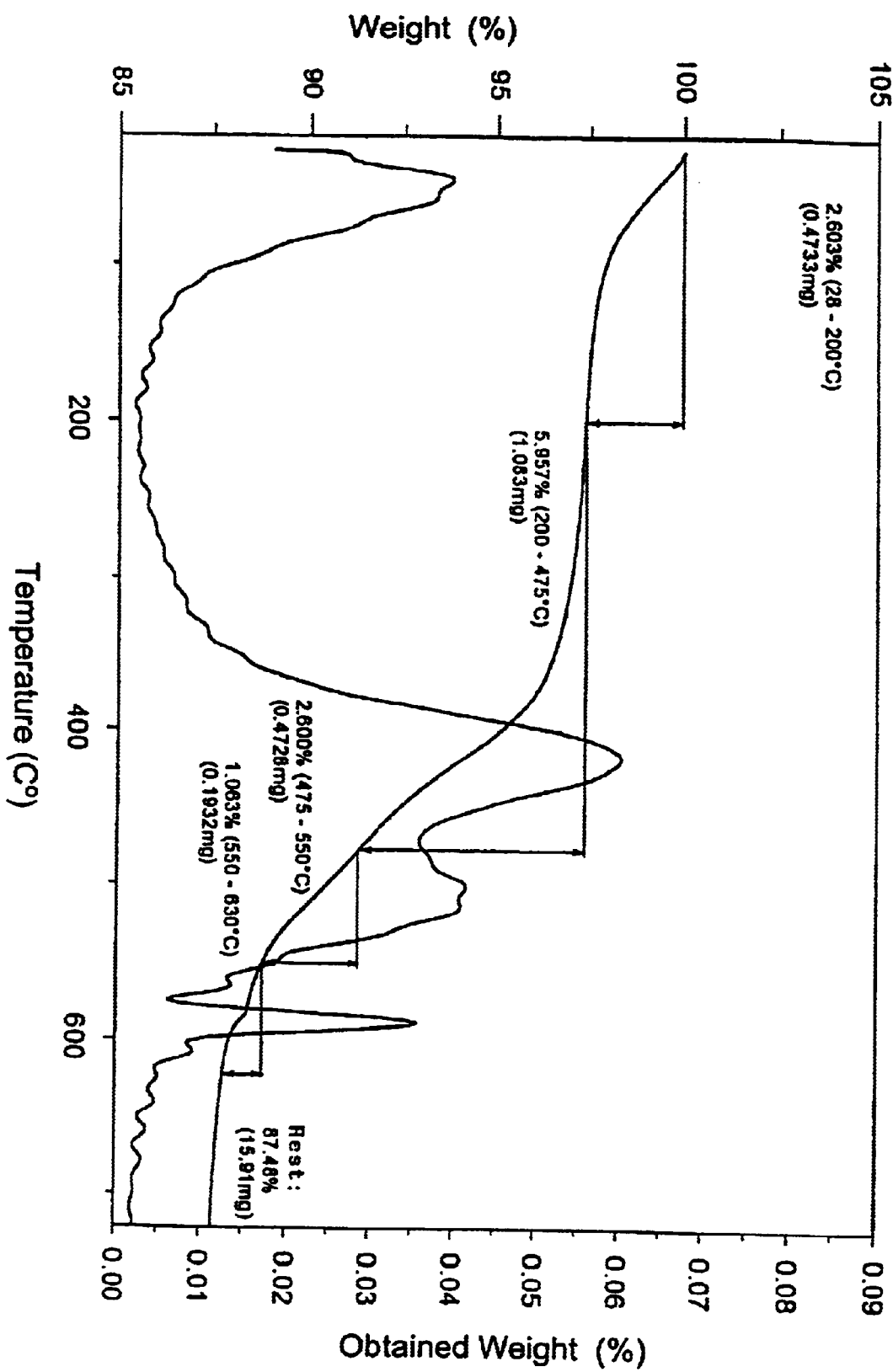
Figure 18:
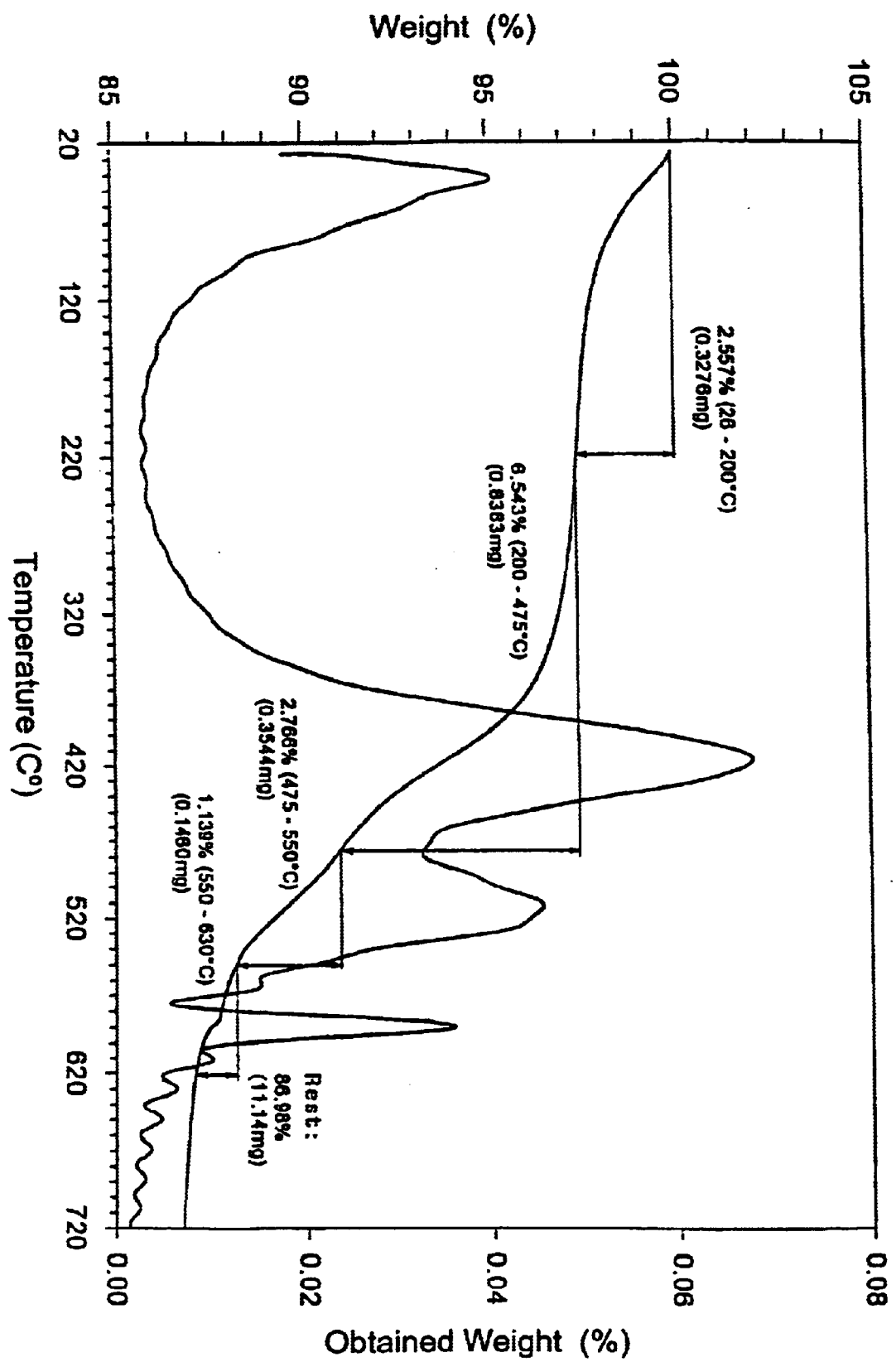

FIGS. 16–18 show the diagram of the thermogravimetric analysis of the Samples 1–3.

Analysis conditions: heating under nitrogen atmosphere from 30° C. to 550° C., then under air from 550° C. to 750° C., heating rate=20° C. per minute. Therein the weight loss of the sample is detected.

Polymerization With Initiators

Example 18

Solution Polymerization of Methyl Methacrylate at 60° C. in Toluene With Initiator (39)

Methyl methacrylate is dried over $CaH_2$, distilled at reduced pressure, flushed with argon and stored at −20° C. CuBr is washed with concentrated acetic acid, water and ethanol. N-(n-butyl)-2-pyridylmethanimine is produced in accordance with known literature [Haddleton, D. M.; Jasieczek, C. B.; Hannon, J. J.; Shooter, A. J., Macromolecules 30, 2190 (1997)]. The preparation of the remaining chemicals and solutions is described in the above Examples 3 and 13.

10 ml (94 mmol) methyl methacrylate, 10 ml absolute toluene, 135 mg (0.94 mmol) CuBr and 305 mg (1.9 mmol) N-(n-butyl)-2-pyridylmethanimine are introduced into a Schlenk flask, then degassed 3 times in vacuum and respectively ventilated with nitrogen. Subsequently 664 mg (0.94 mmol) of the initiator (39) in nitrogen is added. The reaction vessel was closed with a septum and the reaction mixture was rapidly heated in an oil bath to 60° C. and maintained at this temperature for 24 hours.

After this time the polymer was filtered over a small, aluminum oxide (neutral) filled column. Distilled THF served as eluent. After concentrating the solution in vacuum the polymer was precipitated in distilled petroleum ether.

| Yield: | 7.8 g poly(methyl methacrylate) |
|---|---|
| Analysis: | GPC |

Figure 19:
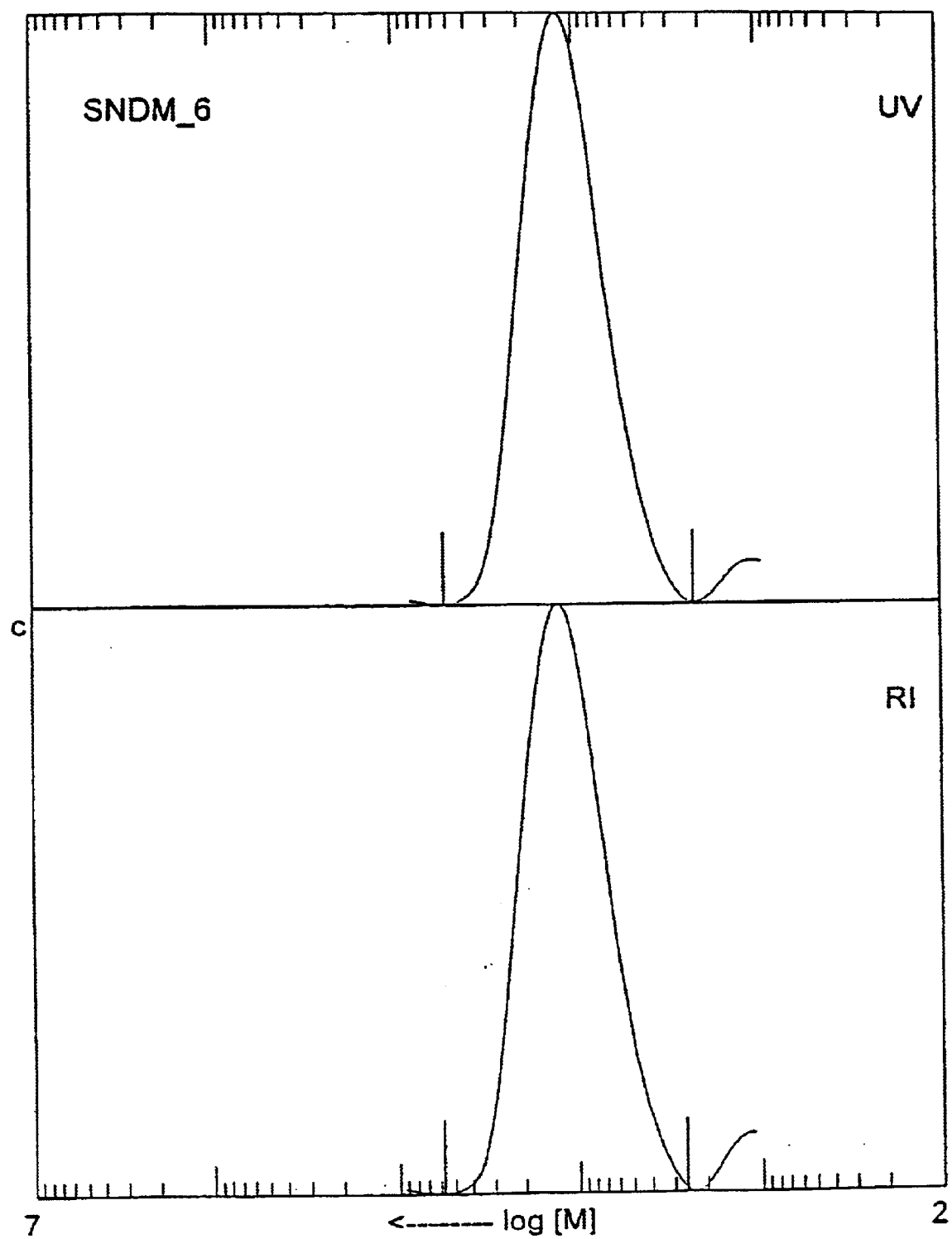
FIG. 19 shows the GPC-chromatogram of the poly (methylmethacrylate).

FIG. 19 shows the GPC-chromatogram of the poly (methyl methacrylate).

Chromatographic conditions: Eluent: THF, detection: UV and RI, Calibration: poly(styrene)-standard.

From UV: Mw=12657, Mn=10020, U=0.26; from RI: Mw=13116; Mn=10335, U=0.27.

Example 19

Polymerization of Methyl Methacrylate at 60° C. With Initiator (30) Bonded to Microgel The pretreatment of other chemicals and solutions occurs according to Example 18.

In a heated Schlenk flask 1.13 9 of microgel coated with initiator (30) from Example 12 are suspended in 10 ml (94 mmol) methyl methacrylate and 10 ml absolute toluene. To this 490 mg (3 mmol) N-(n-butyl)2-pyridylmethanimine are added and the suspension is rinsed for 10 minutes in argon. Then 148 mg (1 mmol) CuBr are added in weak inert gas counter current and the reaction vessel is closed with a septum. The polymerization is carried out for 24 hours at 60° C.

The batch is cooled in an ice bath and with THF. The microgel is separated and extracted in a Soxhlet-Extractor with THF for 24 hours. The product is dried in vacuum (10 mbar) at 50° C. to constant weight.

Yield: 6.83 g poly(methyl methacrylate) grafted microgel

Example 20

Polymerization of tert-Butylacrylate With Initiator (30) Bonded to Microgel Diphenylether is washed with concentrated $H_2SO_4$, dried over $CaCl_2$ and distilled under reduced pressure. 4,4'-Diheptyl-2,2'-bipyridine is produced according to known literature [Leduc, M. R.; Hawker, C. J.; Dao, J.; Frechet, J. M. J., J. Am. Chem. Soc., 118, 11111 (1996)]. Tert-butylacrylate is dried over $CaCl_2$ and distilled in vacuum, then stored under inert gas at 0° C. The preparation of other chemicals and solutions occurs according to Example 18.

In a heated Schlenk flask 1.13 g of microgel covered with initiator (30) from Example 12 is suspended in 10 ml (68.9 mmol) tert-butylacrylate and 10 ml diphenylether. To this 704 mg (2 mmol) 4,4'-diheptyl-2,2'-bipyridine is added and the suspension is flushed with argon for 10 minutes. Then 150 mg (1 mmol) CuBr is added under inert gas counter current and the reaction vessel is closed with a septum. The polymerization is carried out for 12 hours at 90° C.

The batch is cooled in an ice bath and diluted with THF. The microgel is separated and extracted in a Soxhlet-Extractor for 24 hours with THF. The product is dried in vacuum (10 mbar) at 50° C. to constant weight.

Yield: 3.34 g poly(tert-butylacryate) grafted microgel

Example 21

Polymerization of Styrene at 120° C. With Initiator (35) Bonded to Silica Gel Styrene is dried over $CaH_2$, distilled under reduced pressure, flushed with argon and stored at −20° C. CuCl is washed with 5N HCl, water and ethanol. 2,2'-Bipyridine is recrystallized in distilled petroleum ether. Methanol is distilled. (±)-Propylene carbonate is used without purification.

In a heated Schlenk flask, to 1.1 g of the silica gel covered with (35) from Example 13 are added 150 mg CuCl (1.5 mmol), 480 mg bipyridine (3.1 mmol), 8 ml styrene (70 mmol) and 8 ml (+)-propylene carbonate. By repeated evacuating and filling with argon the reaction batch is freed from oxygen. The polymerization occurs under inert gas and intensive stirring for 24 hours at a temperature of 120° C.

After a predetermined time the batch is cooled in an ice bath in order to terminate the reaction. The suspension is transferred to centrifugal glasses and the silica gel now covered with poly(styrene) is centrifuged off. In the centrifuge glasses the silica gel is repeatedly washed with toluene and then with methanol. In order to free the residue from still attached Cu-salts, the silica gel is suspended in an Erlenmeyer flask in chloroform and water is added over the suspension. The mixture is strongly stirred and the aqueous phase is exchanged so long until no blue color can be recognized in the aqueous phase any longer. The organic phase is separated from the aqueous phase. Then the organic suspension agent is substantially removed in vacuum.

The product is dried at 60° C. and 10 mbar to constant weight.

| Yield: | 2.25 g poly(styrene) grafted silica gel, corresponding to approximately 1.25 g poly(styrene) per g silica gel |
|---|---|
| Analysis: | DSC, FT-IR |

Figure 20:
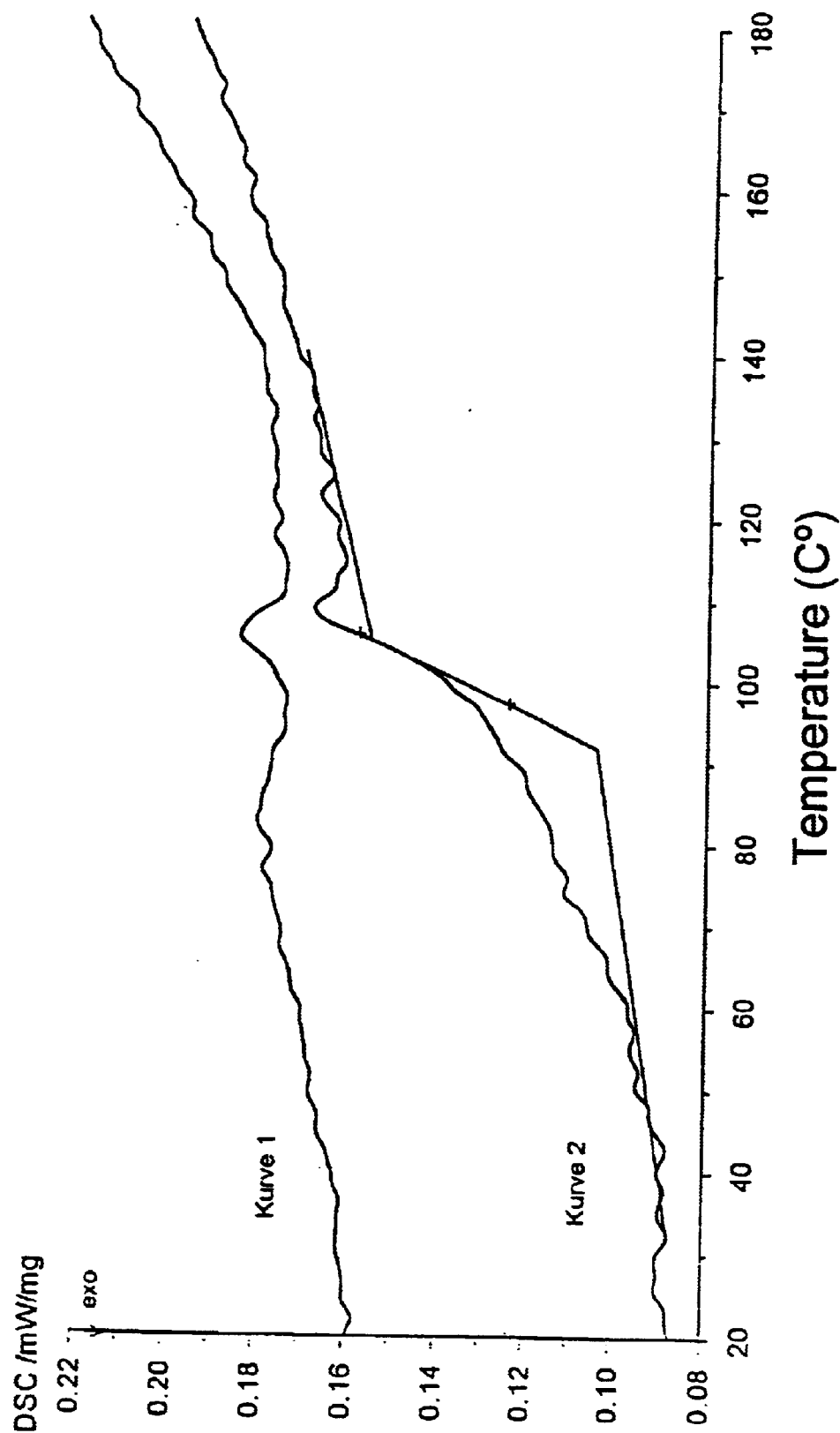
FIG. 20 shows the DSC-curve of the poly(styrene) of first generation on the silica gel surface.

FIG. 20 shows the DSC-curve of the poly(styrene) of first generation on the silica gel surface.

Curve 1 is the DSC-signal, which can be recognized in the first heating. Curve 2 is the DSC-signal, which is obtained during a second heating, after a programmed cooling followed the first heating. In curve 2 one sees the glass transition step of poly(styrene) in the range of between approximately 100° C. and 110° C.

Figure 21:
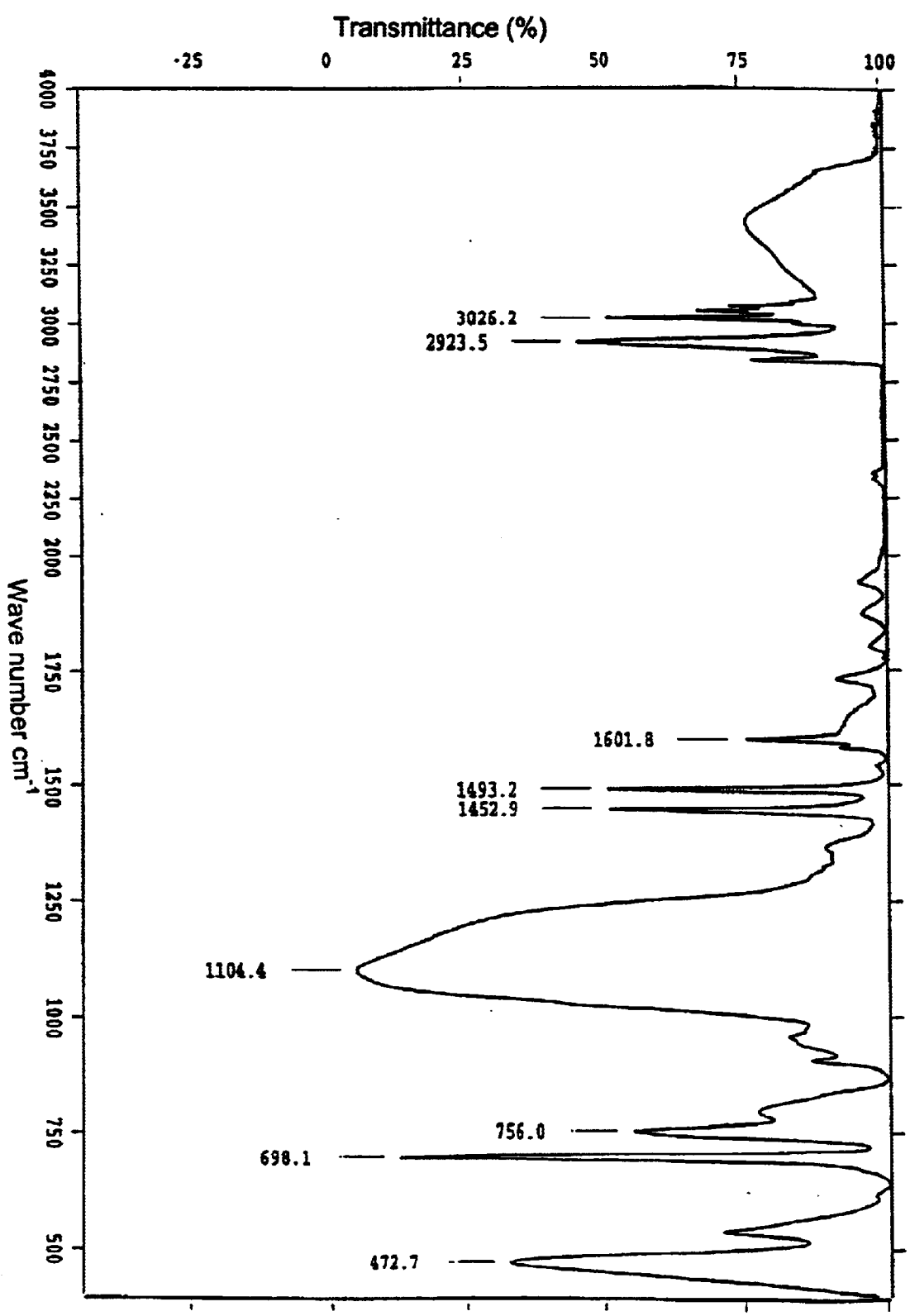
FIG. 21 shows the FT-IR spectrum of the poly(styrene) of first generation on the silica gel surface.

FIG. 21 shows the FT-IR spectrum of the poly(styrene) of first generation on the silica gel surface.

Recording technique: transmission spectrum of a cast film.

Example 22

Polymerization of Styrene at 90° C. With Initiator (35) Bonded to the Silica Gel The reaction is carried out analogously to the above Example 21, however the reaction temperature is adjusted to 90° C. The recovery of the poly(styrene) grafted silicon gel occurs in similar manner.

| Yield: | 820 mg poly(styrene) per g silica gel |
|---|---|
| Analysis: | TGA |

Figure 22:
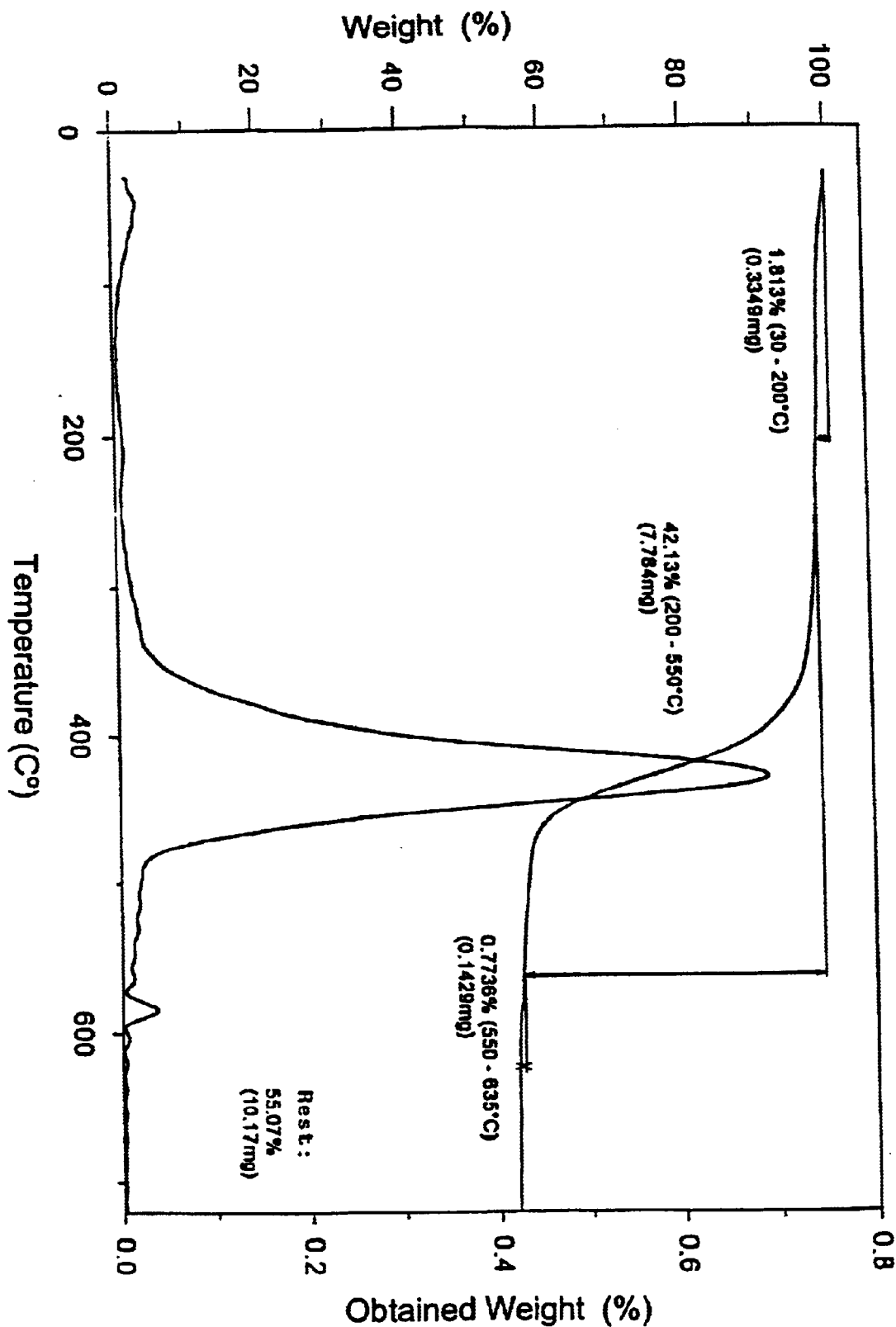
FIG. 22 shows the diagram of the thermogravimetric analysis of the poly(styrene) grafted silica gel.

FIG. 22 shows the diagram of the thermogravimetric analysis of the poly(styrene) grafted silica gel.

Analysis conditions: heating under nitrogen atmosphere from 30° C. to 550° C., then in air from 550° C. to 750° C., heating rate=20° C./min. The weight loss of the sample is detected.

Example 23

Polymerization of Isoprene With Initiator (35) Bonded to Silica Gel

Isoprene is washed with sodium hydroxide solution and water and dried over $CaH_2$. It is distilled under inert gas and stored under inert gas at −20° C. The pretreatment of other chemicals and solutions is described in the above Examples 13 and 21.

In the screw lid with submerged agitator under ice cooling 250 mg of silica gel covered with (35) is added. Thereto 10 ml (100 mmol) isoprene and 312 mg (2 mmol) 2,2'-bipyridine are added. The reaction mixture is flushed with argon, in order to remove oxygen. Then in weak protective gas stream 102 mg (1.02 mmol) CuCl is added and the reaction vessel is closed tightly. Under inert gas the reaction mixture is heated for 14 hours at 130° C.

The reaction is cooled in an ice bath and the suspension is transferred to a round bottom flask. To this is added 20 ml toluene and the excess isoprene is removed in vacuum. The silica gel covered with poly(isoprene) is separated by centrifugation and extracted multiple times with toluene. The product is dried at room temperature in vacuum (10 mbar) to constant weight.

| Yield: | 1.5 g poly(isoprene) grafted silica gel, corresponding to 5 g poly(isoprene) per g silica gel |
|---|---|
| Analysis: | FT-IR, DSC |

Figure 23:
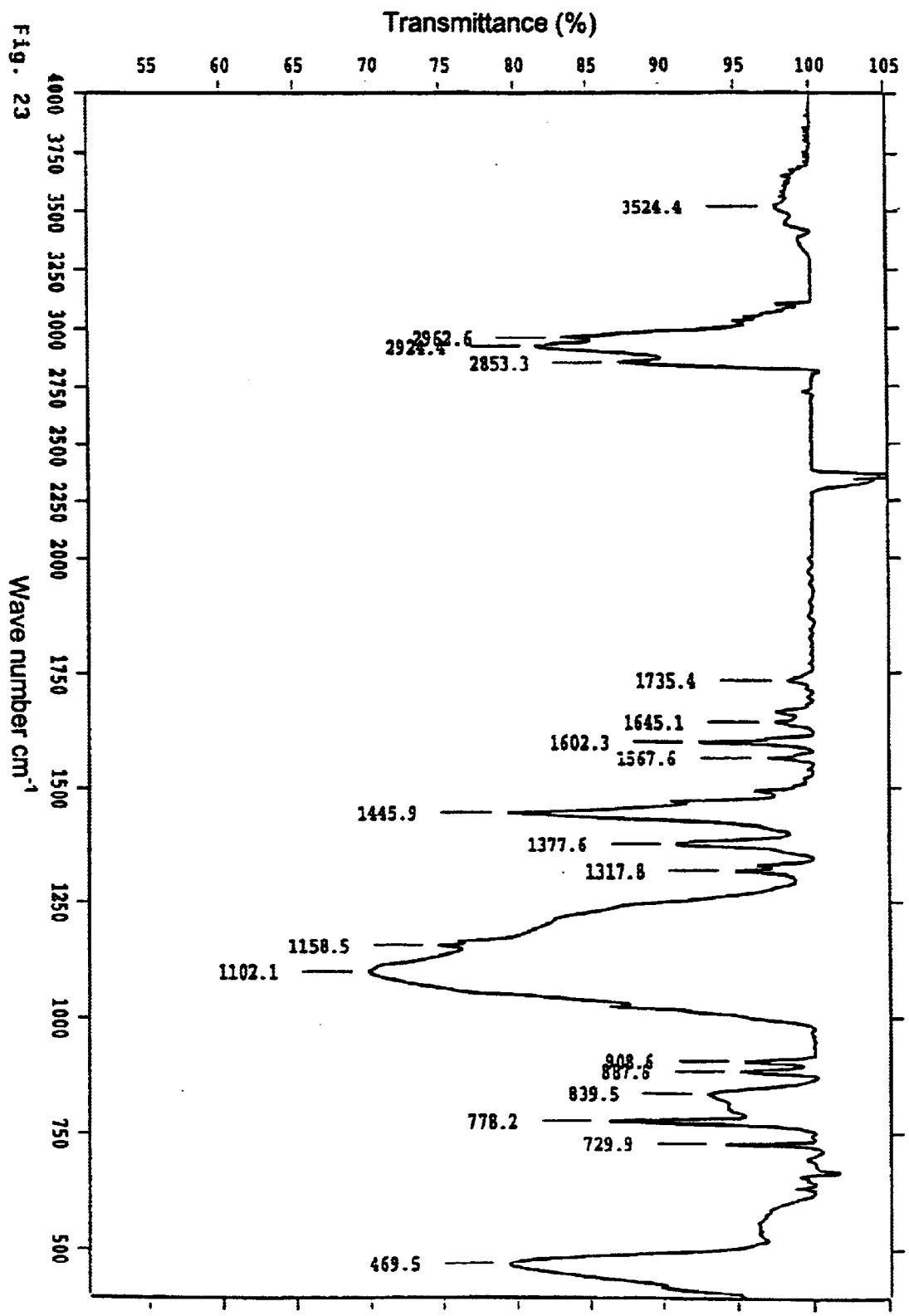
FIG. 23 shows the FT-IR spectrum of the poly(isoprene) coated silica gel.

FIG. 23 shows the FT-IR spectrum of the poly(isoprene) coated silica gel.

Recording technique: transmission spectrum of a KBr-pressed disk.

Figure 24:
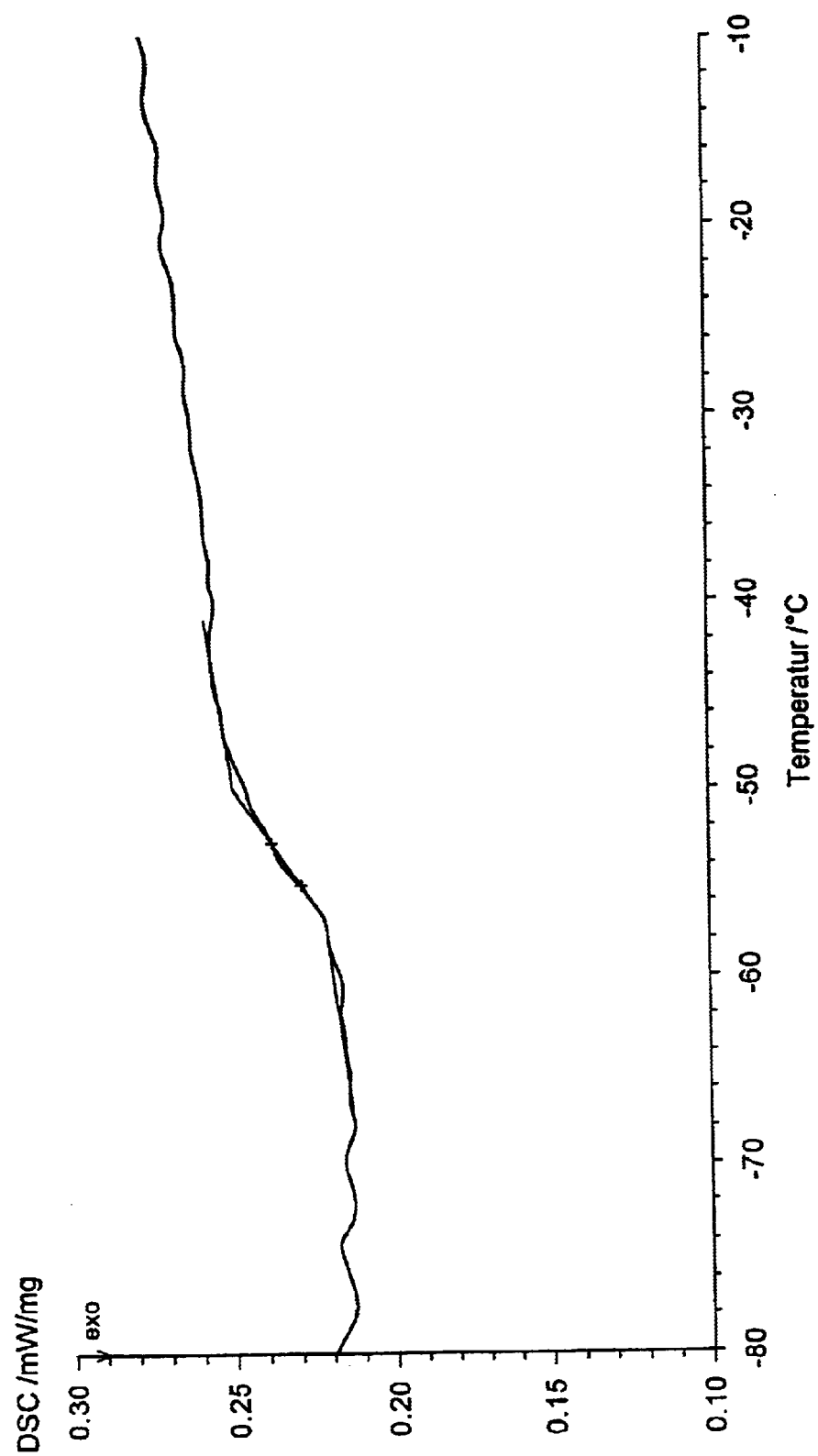
FIG. 24 shows the DSC-curve of the silica gel covered with poly(isoprene).

FIG. 24 shows the DSC-curve of the silica gel covered with poly(isoprene).

In the DSC-curve one sees the glass transition step of the poly(isoprene) between −57° C. and −50° C.

Example 24

Polymerization of Methyl Methacrylate With Initiator (36) Bonded to Silica Gel The pretreatment of the employed chemicals and solvents is described in the above Examples 18 and 20.

Into a heated Schlenk flask 300 mg of silica gel covered with (36) from Example 14, 4 ml (37 mmol) methyl methacrylate, 4 ml diphenylether and 71 mg (0.2 mmol) 4,4'-diheptyl-2'-bipyridine are added. The solution is flushed with argon for 10 min. Then 14 mg (0.1 mmol) CuBr is added to the reaction mixture, again flushed with argon and the reaction vessel is closed with a septum. The reaction batch is heated in an oil bath for 18 hours at 90° C.

After cooling of the batch in an ice bath, the reaction mixture is diluted with THF and the described silica gel is separated by centrifugation. The silica gel is extracted in a Soxhlet-Extractor with THF.

Yield: 2.49 g poly(methyl methacrylate) grafted silica gel, corresponding to 7.3 g poly(methyl methacrylate) per g silica gel

Example 25

Polymerization of Methyl Methacrylate With Initiator (36) Bonded to Glass Beads The pretreatment of the employed chemicals and solvents is described in the above Example 18.

1 g of glass beads covered with (36) from Example 15 is introduced in a heated round bottom flask. To this 2 g (20 mmol) methyl methacrylate, 2.5 ml absolute toluene, 30 mg (0.2 mmol) CuBr and 70 mg (0.43 mmol) N-(n-butyl)2-pyridylmethaneamine are added. The reaction mixture is flushed with argon for 10 min. After this, the reaction vessel is closed with a septum and polymerization is carried out for 18 hours at 90° C.

After the reaction, the excess solvent is removed and the coated glass beads are washed multiple times with respectively 20ml THF. The product is then extracted with THF in a Soxhlet-Extractor for 48 hours.

| Yield: | 1.04 g of glass beads grafted with poly(methyl methacrylate), corresponding to 0.04 g poly (methyl methacrylate) per g glass beads |
|---|---|
| Analysis; | FT-IR |

Figure 25:
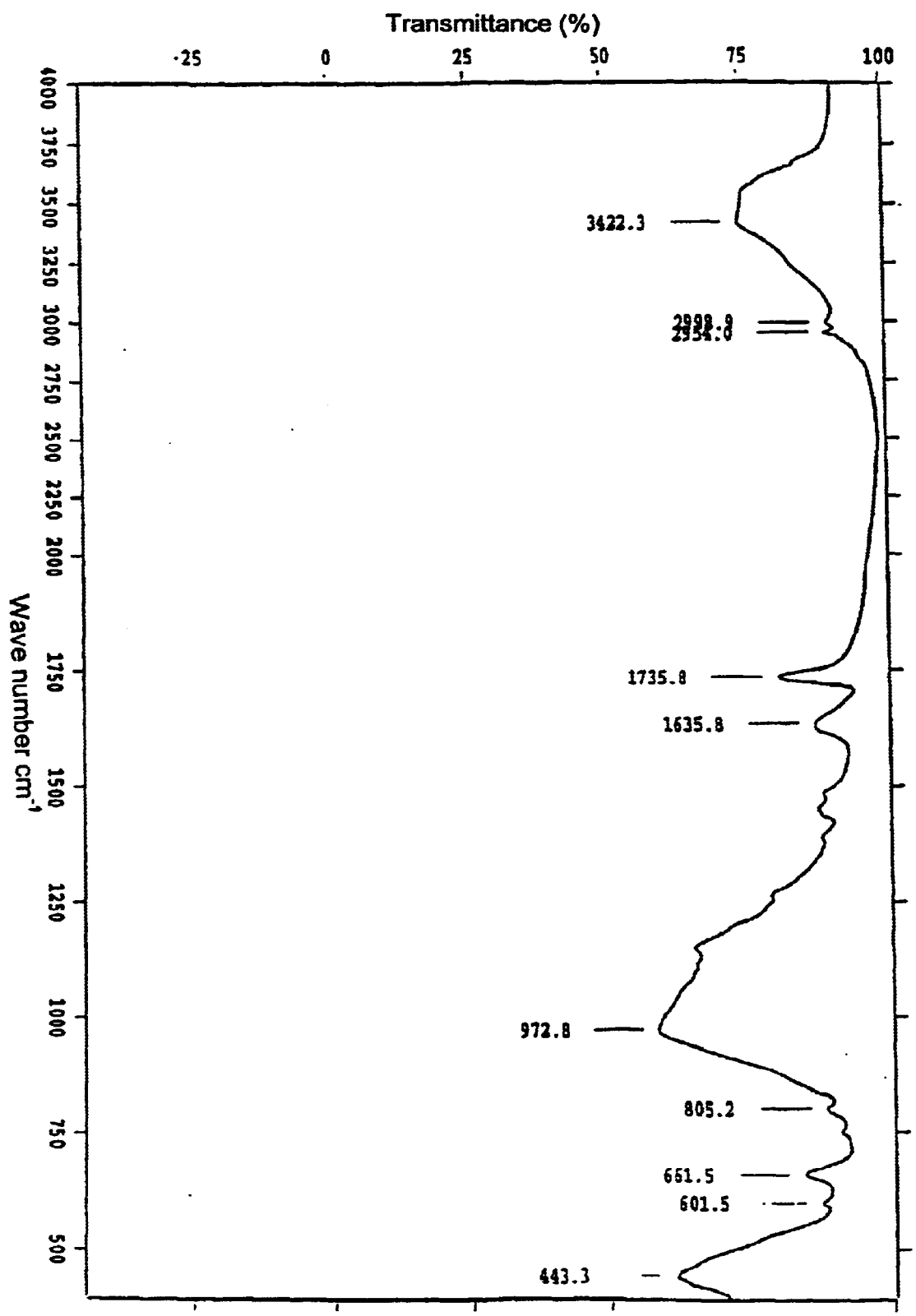
FIG. 25 shows the FT-IR-Spectrum of the glass beads covered with poly(methylmethacrylate).

FIG. 25 shows the FT-IR-Spectrum of the glass beads covered with poly(methyl methacrylate).

Recording Technique: Transmission measurement of a KBr-pressed disk

Production of second polymer generation

Example 26

Formation of a Poly(styrene) Layer Second Generation on the Silica Gel Surface The pre-treatment of various chemicals and solvents is described in Example 21.

Into a heated Schlenk flask 1 g of the poly(styrene)-silica gel produced in Example 21, 150 mg CuCl (1.5 mmol), 470 mg bipyridine (3 mmol), 10 ml styrene (87 mmol) and 10 ml (±)-Propylene carbonate are added. By repeated evacuation and fill in with argon the reaction batch is freed from oxygen. The polymerization occurs under inert gas and intensive stirring for 36 hours at a temperature of 120° C.

The reaction is stopped by cooling in an ice bath. The silica gel covered with a second poly(styrene) layer is removed from the solution by centrifugation and washed multiple times with toluene and methanol. In order to remove any remaining Cu-salts, the poly(styrene)-silica gel is suspended in chloroform, covered with water, and the aqueous phase is exchanged until no blue color can be recognized any longer in the aqueous phase. Thereafter, the poly(styrene)-silica gel is filtered off and extracted in a Soxhlet-Extractor for 12 hours with toluene.

The product is dried at 60° C. and 10 mbar until constant weight.

| Yield: | 2.14 g poly(styrene) grafted silica gel of the second generation, corresponding to approximately 3.75 g poly(styrene) per g silica gel |
|---|---|
| Analysis: | DSC, FT-IR |

Figure 26:
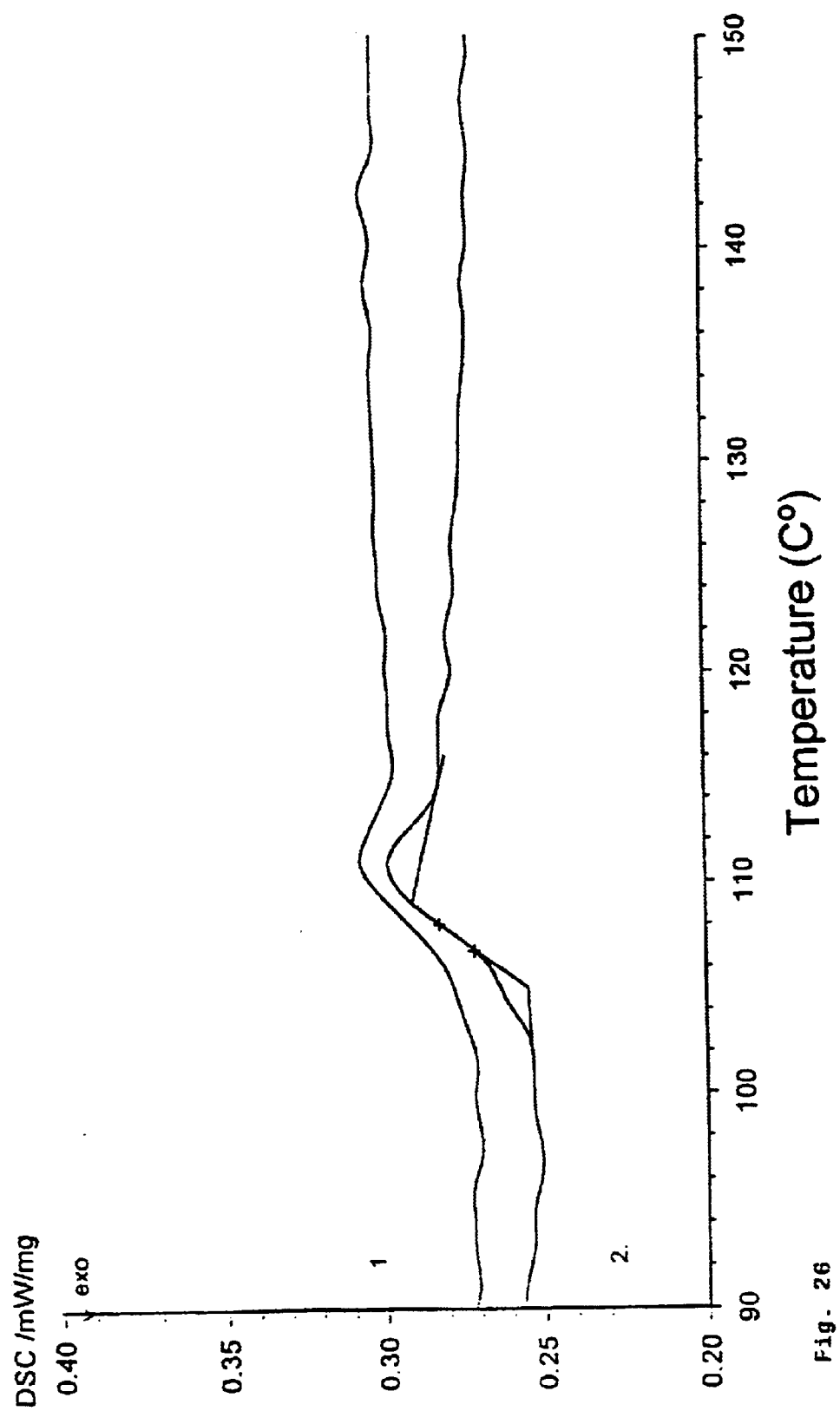
FIG. 26 shows the DSC-curve of the poly(styrene) formed in first and second generation on the silica gel surface.

FIG. 26 shows the DSC-curve of the poly(styrene) formed in first and second generation on the silica gel surface.

Curve 1 and curve 2 are obtained in sequential heating curves, wherein subsequent to the first heating, a programmed cooling off occurs. In both curves, the last transition point of poly(styrene) is seen in the range between 105° C. and 110° C.

Figure 27:
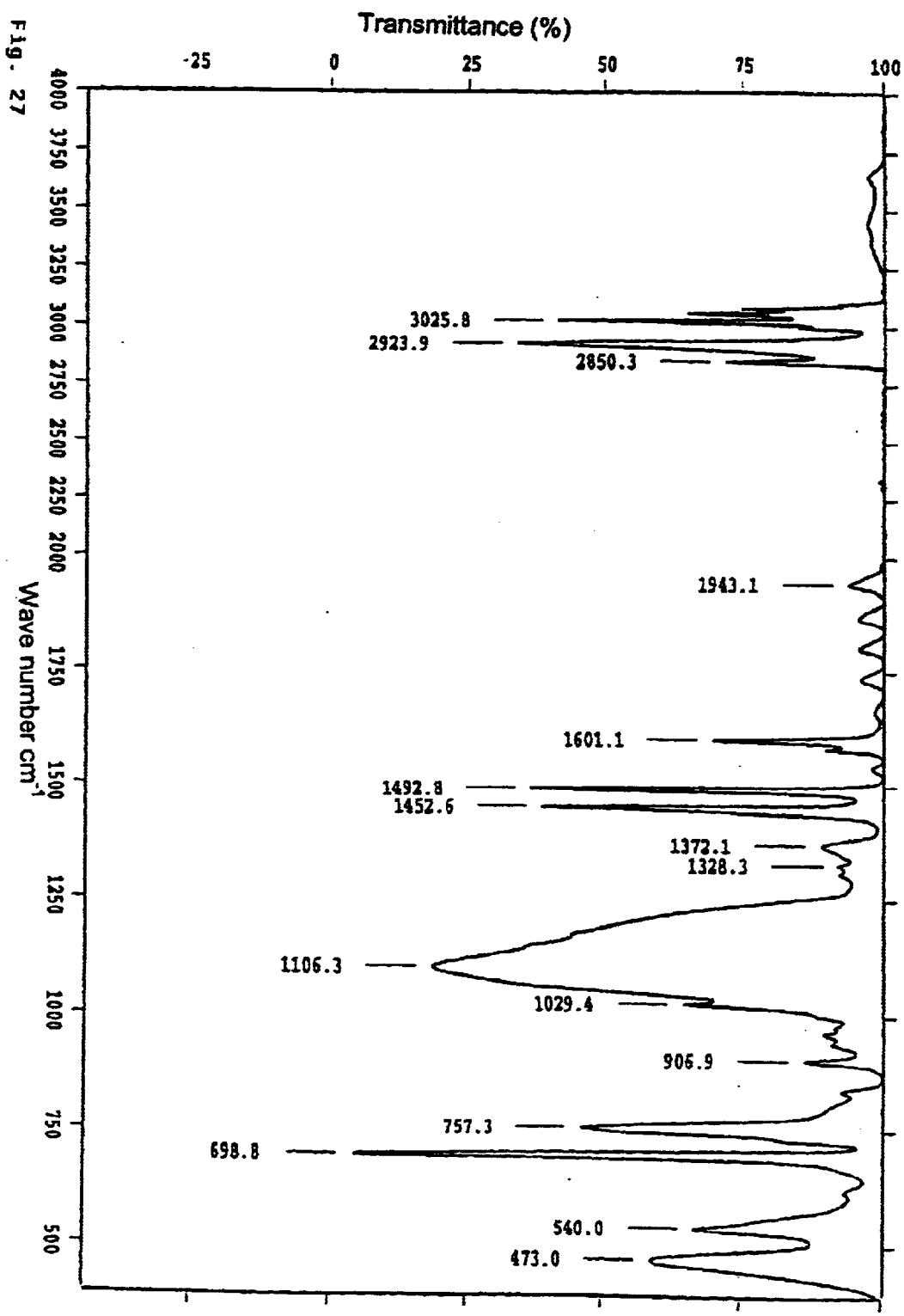
FIG. 27 shows the FT-IR spectrum of the poly(styrene) forming the first and second generation on the silica gel surface.

FIG. 27 shows the FT-IR spectrum of the poly(styrene) forming the first and second generation on the silica gel surface.

Recording technique: Transmission spectrum of a cast film

Example 27

Formation of Poly(styrene-block-p-tert.-butyl styrene) on Silica Gel Surface p-Tert.-butyl styrene is dried over $CaH_2$ and distilled under reduced pressure under inert gas, then stored under inert gas at −20° C. The pre-treatment of further employed chemicals and solvents is described in the above examples 20 and 21.

Into a pre-heated Schlenk flask to a suspension of 0.505 g of poly(styrene) coated silica gel in 6.4 ml Diphenylether and 6.4 ml (35 mmol) p-tert.-butyl styrene are added 72 mg (0.73 mmol) CuCl and 530 mg (1.5 mmol) 4, 4'-diheptyl-2.2'-bipyridine. The reaction mixture is flushed with argon for 10 min., then the polymerization reaction is carried out for 24 hours at 130° C.

The reaction is stopped by cooling in an ice bath. After diluting the reaction mixture with toluene, the poly(styrene-block-p-t.-butyl styrene) coated silica gel is separated from the reaction solution by centrifugation. The solid substrate is washed multiple times with toluene and subsequently with methanol. In order to remove any remaining Cu-salts, the poly(styrene-block-p-ter.-butyl styrene) grafted silica gel is suspended in toluene, covered with water and the aqueous phase is exchanged until no blue color is recognized in the aqueous phase. Thereafter, the poly(styrene-block-p-tert.-butyl styrene)-silica gel is separated from the organic phase and extracted in a Soxhlet-extractor for 12 hours with toluene.

| Yield: | 1.1 g poly(styrene-block-p-tert.-butyl styrene) grafted silica gel |
|---|---|
| Analysis: | FT-IR, DSC |

Figure 28:
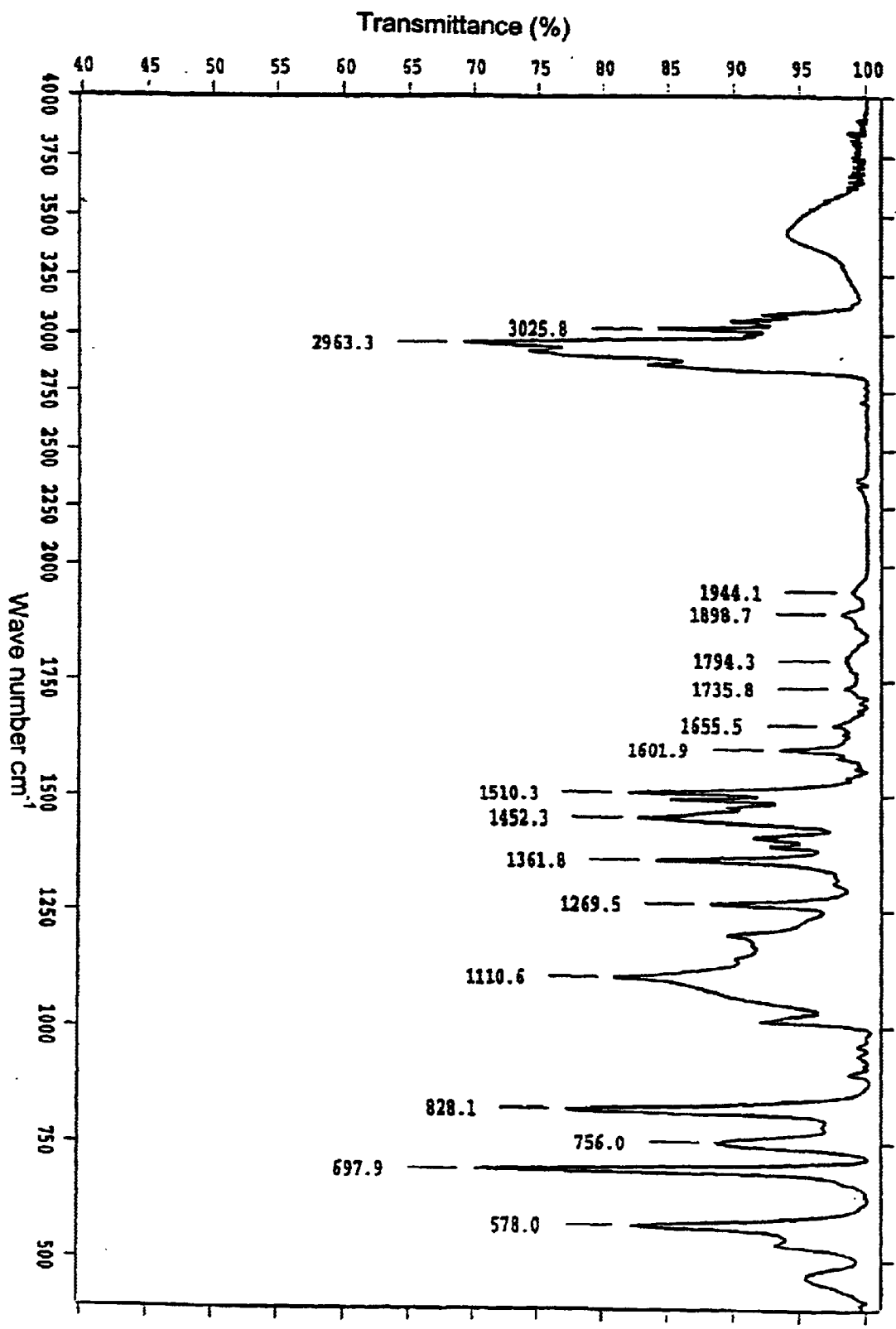
FIG. 28 shows the FT-IR-spectrum of the poly(styrene-block-p-tert.-butylstyrene) grafted to the silica gel.

FIG. 28 shows the FT-IR-spectrum of the poly(styrene-block-p-tert.-butyl styrene) grafted to the silica gel.

Recording Technique: Transmission spectrum of a cast film.

Figure 29:
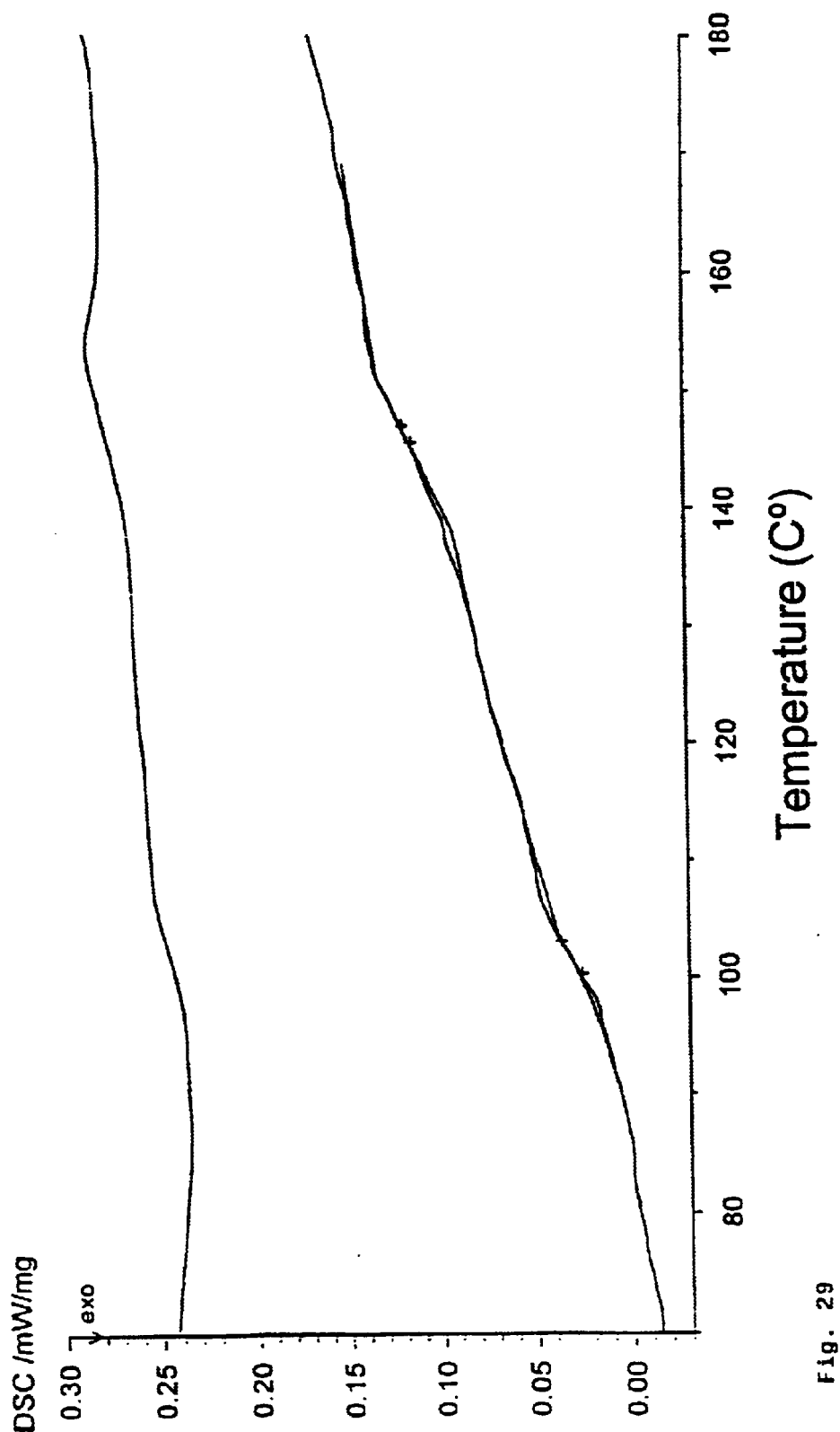
FIG. 29 shows the DSC-curve of the poly(styrene-block-p-tert.-.butylstyrene) formed on the silica gel.

FIG. 29 shows the DSC-curve of the poly(styrene-block-p-tert.-butyl styrene) formed on the silica gel.

The upper curve and the lower curve are the sequentially obtained heating curves, wherein following the first heating a programmed cooling off is carried out. In the lower curve two glass transition temperatures are clearly to be seen in the area between 100° C. and 105° C. and in the area between 137° C. and 145° C. The first transition is the poly(styrene)-block, the second transition is associated with the poly(p-tert.-butyl styrene)-block.

Polymer Analogous Conversion of Polymer Grafted Substrates

Example 28

Partial Ester Cleavage of the Poly-(acrylic acid-co-tert.-butyl Acrylic Acid) Grafted Micro-gel Trifluoroacetic acid is used without purification. The pre-treatment of dichloromethane is described in the above Example 4.

500 mg of the micro-gel grafted with poly(tert.-butyl acrylate) from Example 20 is suspended in 20 ml dichloromethane. To this 0.5 ml (6.5 mmol) trifluoroacetic acid is added. Under exclusion of moisture, the reaction mixture is stirred at room temperature for 24 hours.

Over a sinterd glass filter, the grafted micro-gel is separated and washed with ethanol, ethanol/water (1/1 v/v), ethanol and diethylether. The product is dried in vacuum at 60° C. and 10 mbar.

Yield: 443 mg poly(acrylic acid-co-tert.-butyl acrylic acid) grafted micro gel

Cleavage of the Polymer From the Solid Substrate Surface

Example 29

Cleavage of the Poly(styrene) From the Silica Gel Surface for Analysis of the Poly(styrene)

p-Toluenesulfonic acid-monohydrate is used without purification. Methanol is distilled. The pre-treatment of toluene is described in Example 13.

500 mg of the poly(styrene) grafted silica gel from Example 21 is suspended in 150 ml toluene. To this suspension are added 100 mg p-toluenesulfonic acid-monohydrate and 10 ml methanol and the reaction mixture is heated to reflux for 16 hours. The poly(styrene)-solution is separated from the silica gel by centrifugation. The silica gel is washed with toluene a total of three times and centrifuged, in order to remove any possible poly(styrene) attached to the silica gel.

| Yield: | 250 mg poly(styrene) |
|---|---|
| Analysis | GPC |

Figure 30:
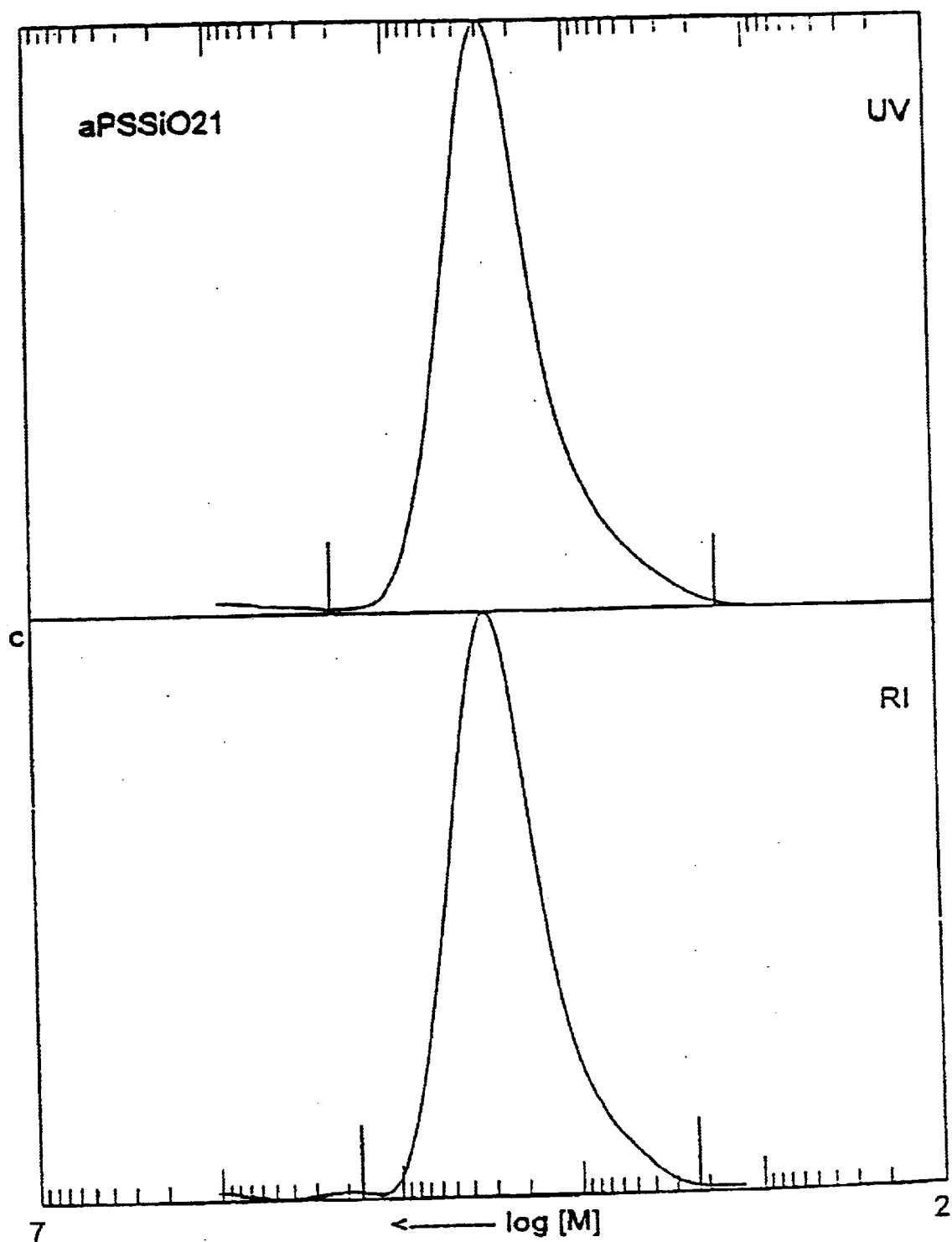
FIG. 30 shows the GPC-chromatogram of the degrafted poly(styrene) of the first generation.

FIG. 30 shows the GPC-chromatogram of the degrafted poly(styrene) of the first generation.
Chromatographic conditions: Eluent: THF, Detection: UV and RI, Calibration: poly(styrene)-standard
From UV: Mw=29499, Mn=18349, U=0.61; from RI: Mw=30766, Mn 21085, U=0.46.

Example 30

Cleavage of the Poly(styrene) From the Silica Gel Surface for Analysis of the Poly(styrene)

Silica gel grafted with poly(styrene) from Example 22 is used. The carrying out and recovery occurs as described in Example 29.

| Yield: | 190 mg poly(styrene) |
|---|---|
| Analysis: | GPC |

Figure 31:
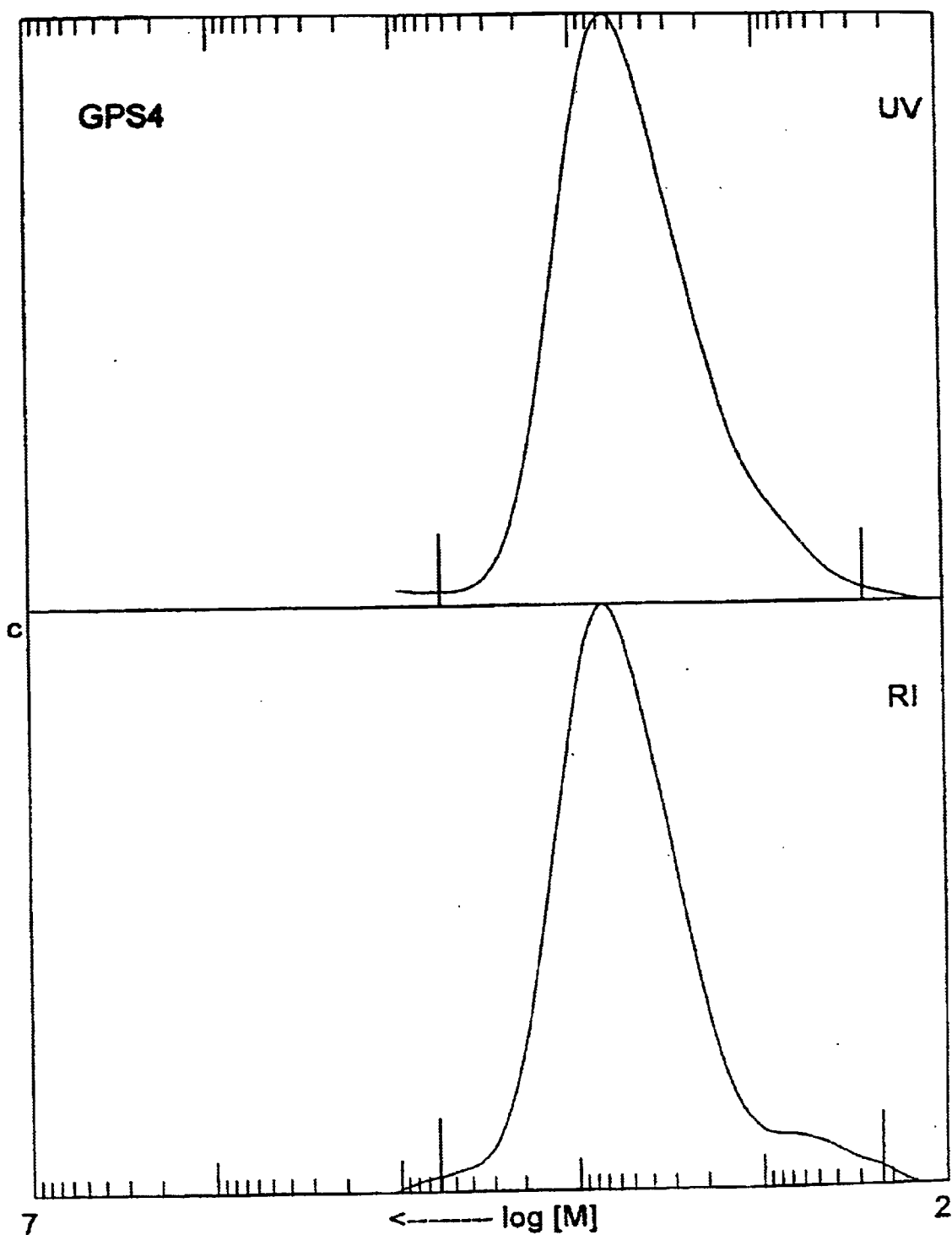
FIG. 31 shows the GPC-chromatogram of the degrafted poly(styrene).

FIG. 31 shows the GPC-chromatogram of the degrafted poly(styrene). Chromatographic conditions: Eluent: THF, Detection: UV and RI, Calibration: poly(styrene)-standards
From UV: Mw=6748, Mn=3477, U=0.94; from RI: Mw=7624, Mn=3932, U=0.94

Example 31

Cleavage of the Poly(methyl Methacrylate) From the Silica Gel Surface 250 mg silica gel grafted with poly(methyl methacrylate) from Example 24, 75 ml toluene, 5 ml methanol and 50 mg p-toluenesulfonic acid-monohydrate are used. The carrying out and recovery is the same as in the description in Example 29. The silica gel is washed with THF in place of toluene.

| Yield: | 200 mg poly(methyl methacrylate) |
|---|---|
| Analysis: | GPC |

Figure 32:
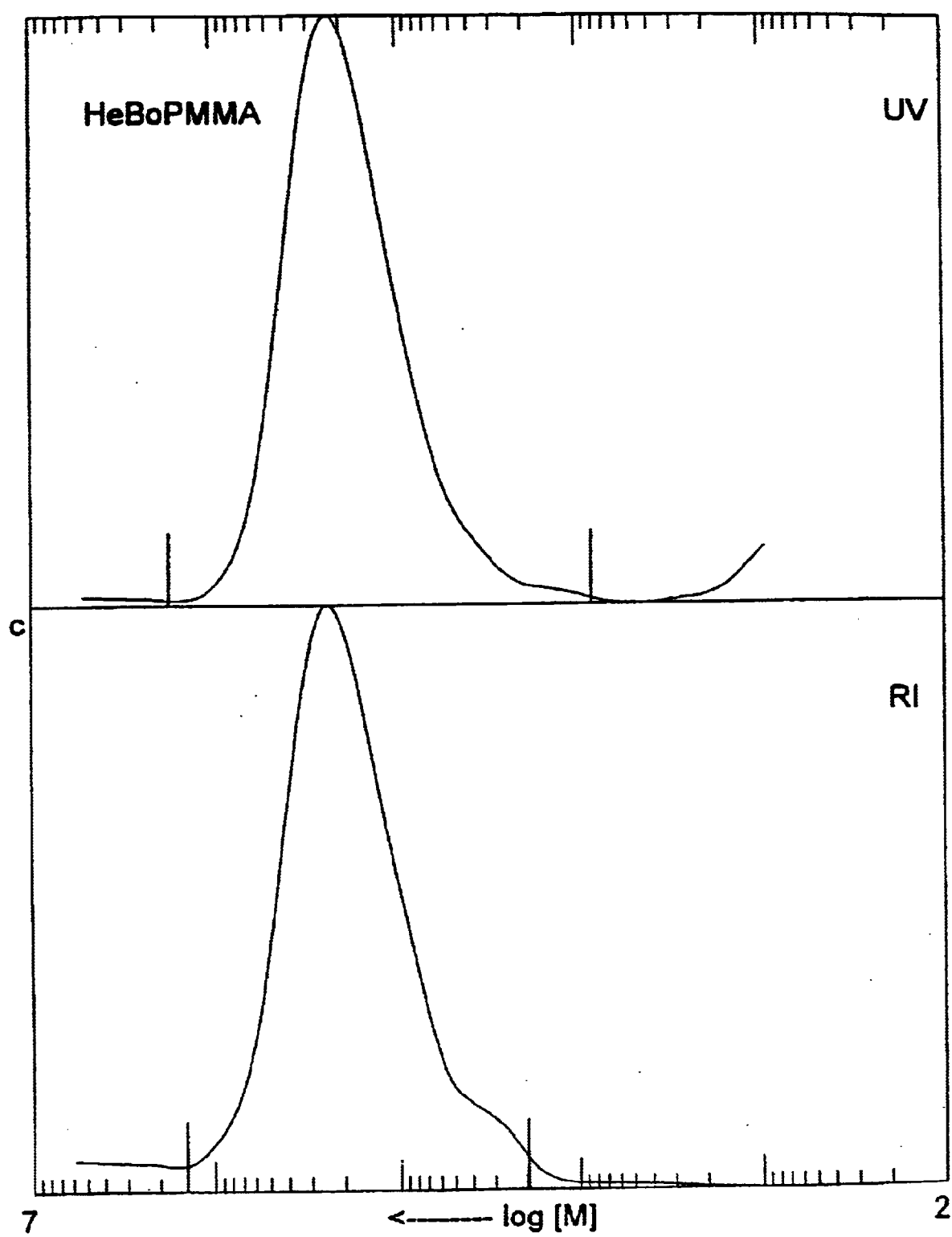
FIG. 32 shows the GPC-chromatogram of the cleaved poly(methylmethacrylate.

FIG. 32 shows the GPC-chromatogram of the cleaved poly(methyl methacrylate.
Chromatographic conditions: Eluent: THF, Detection: UV and RI, Calibration: poly(styrene)-standards
From UV: Mw=230031, Mn=137187, U=0.68; from RI: Mw=240377, Mn=146811, U=0.64

Example 32

Cleavage of the First and Second Generation of Poly(styrene) From the Silica Gel Surface The poly(styrene) grafted silica gel from Example 26 is used. The carrying out and recovery occur as described in Example 29.

| Yield: | 390 mg poly(styrene) |
|---|---|
| Analysis: | GPC |

Figure 33:
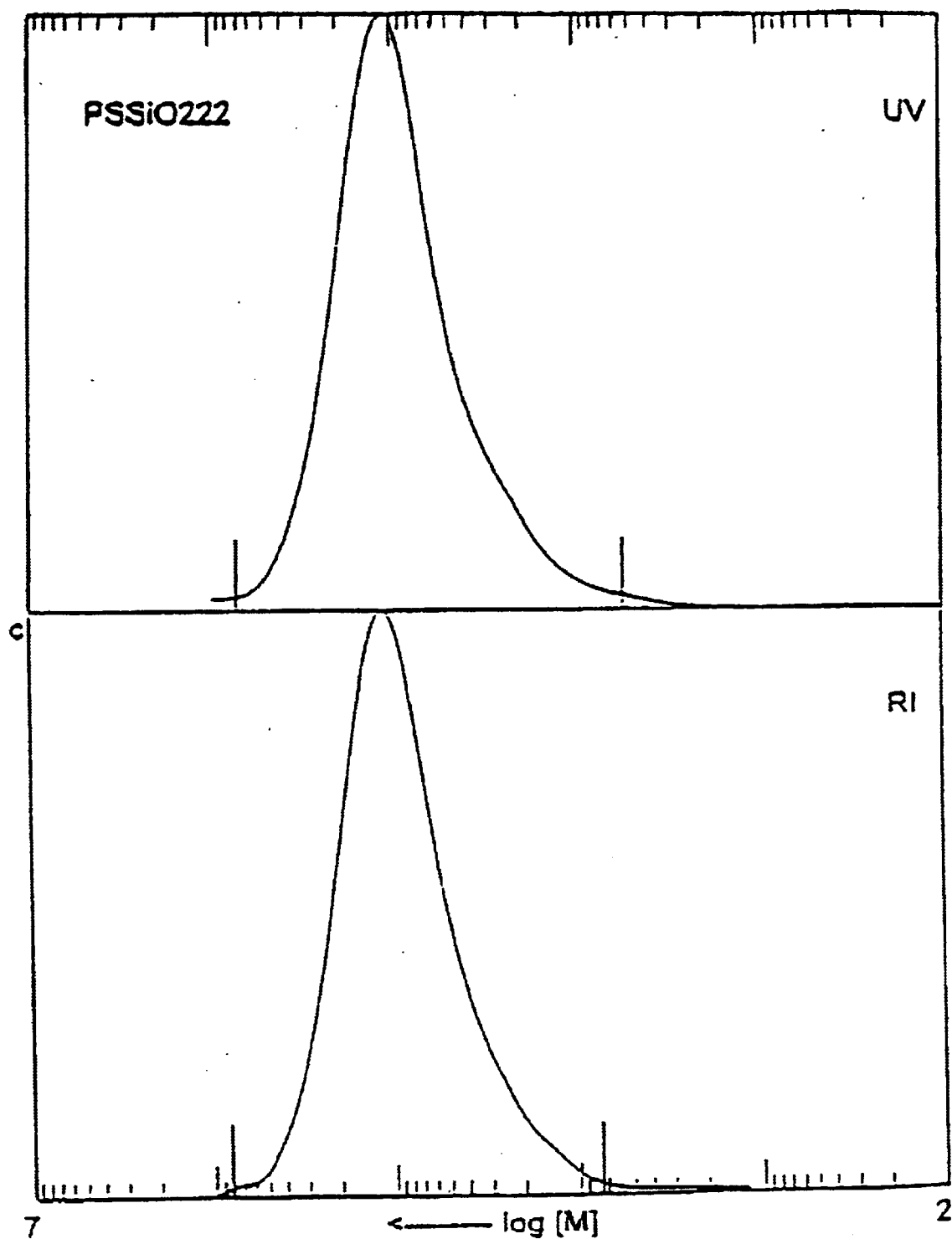
FIG. 33 shows the GPC-chromatogram of the cleaved poly(styrene) of first and second generation.

FIG. 33 shows the GPC-chromatogram of the cleaved poly(styrene) of first and second generation.
Chromatographic conditions: Eluent: THF, Detection: UV and RI, Calibration: poly(styrene)-standards
From UV: Mw=116159, Mn=68097, U=0.71; from RI: Mw=119581, Mn=71587, U=0.66

Example 33

Cleavage of the Poly(styrene-block-p-tert.-butyl Styrene) From the Silica Gel Surface Dioxane and methanol are distilled. The preparation of toluene is described in Example 13.

250 mg of the polymer coated silica gel from Example 27 is suspended in a mixture of 25 ml toluene, 40 ml dioxane and 40 ml 5N sodium hydroxide and heated under reflux for 48 hours.

After separation from the aqueous phase, the organic phase is concentrated in vacuum. The polymer is then precipitated in methanol. The polymer is dissolved again in toluene and the solution is centrifuged in order to separate any silica gel particles. The remaining solution is carefully extracted, concentrated in vacuum, then the polymer is precipitated in methanol. The polymer is separated and dried at 60° C. in vacuum (10 mbar).

| Yield: | 180 mg poly(styrene-block-p-tert.-butyl styrene) |
|---|---|
| Analysis: | GPC |

Figure 34:
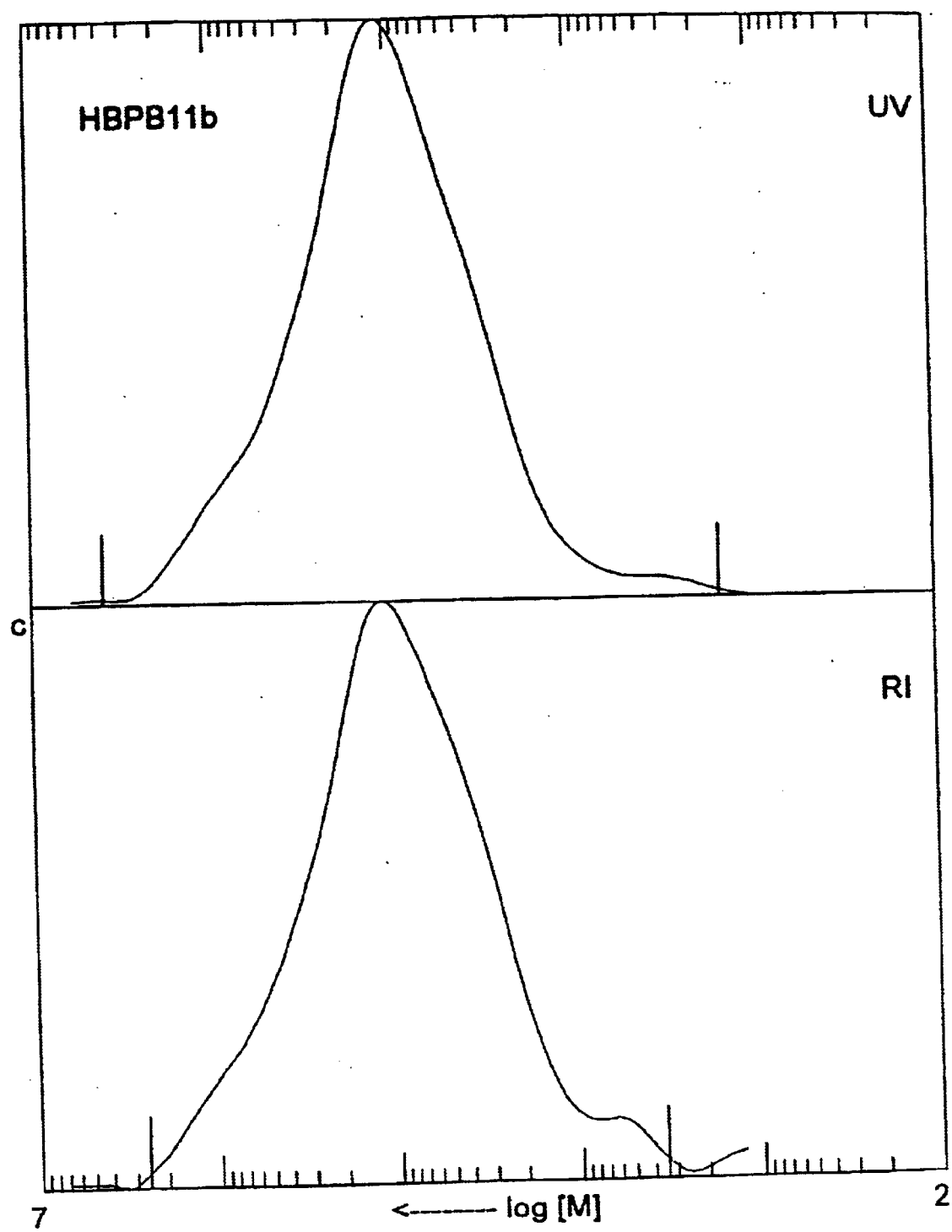
FIG. 34 shows the GPC-chromatogram of the cleaved poly(styrene-block-p-tert.-butylstyrene).

FIG. 34 shows the GPC-chromatogram of the cleaved poly(styrene-block-p-tert.-butyl styrene).
Chromatographic conditions: Eluent: THF, Detection: UV and RI, Calibration: poly(styrene)-standards
From UV: Mw=203767, Mn=55552, U=2.67; from RI: Mw=196492, Mn=54679, U=2.59

What is claimed is:
1. Process for producing (i) layers of polymers and/or oligomers or (ii) layer systems of polymers and/or oligomers on a solid substrate surface, comprising the following steps:

a) providing and optionally preparing a solid substrate surface,
b) bonding to the solid substrate surface an initiator which includes a group I for initiation of a reaction which proceeds according to an ATRP-mechanism,
c) subsequent to step b), carrying out on the solid substrate surface a first ATRP-polymerization initiated by the initiator, with radically polymerizable (a) monomers, (b) macromonomers, or (c) mixtures thereof, so that a first layer of polymers and/or oligomers is formed on the solid substrate surface.

2. Process for producing (i) layers of polymers and/or oligomers or (ii) layer systems of polymers and/or oligomers on a solid substrate surface, wherein an initiator is bonded to the solid substrate surface, which initiator serves as initiation site for ATRP-polymerization, the initiator includes a group I for initiating a reaction which proceeds according to an ATRP-mechanism, and wherein the reaction conditions are so selected, that the polymerization reaction proceeds according to the ATRP-mechanism, and a polymerization reaction initiated by the initiator is carried out with radically polymerizable (a) monomers, (b) macromonomers, or (c) mixtures thereof, wherein the reaction conditions are so selected, that a polymer and/or oligomer layer is formed on the solid substrate surface.

3. Process according to claim 1 or 2, wherein the initiator is bonded to the substrate surface via an anchor group A.

4. Process according to claim 3, wherein the anchor group A and the group I for initiating a reaction which proceeds according to an ATRP-mechanism are linked via a structural element L.

5. Process according to claim 1 or 2, wherein one further ATRP-polymerization is carried out for providing a second polymer and/or oligomer layer, or a series of further ATRP-polymerizations is carried out for providing further polymer and/or oligomer layers on the first layer.

6. Process according to claim 1 or 2, wherein the first polymer and/or oligomer layer, or if present, the further polymer and/or oligomer layers are modified by chemical conversion of functional groups of the polymer chains bonded to the substrate surface, by means of reaction partners while however maintaineng the degree of polymerization.

7. Process according to claim 1 or 2, wherein the produced solid substrate/polymer-layer system is cross-linked into a three-dimensional polymer matrix by a cross-linking reaction.

* * * * *